(12) United States Patent
Shintani

(10) Patent No.: US 8,698,821 B2
(45) Date of Patent: Apr. 15, 2014

(54) IMAGE PROCESSING APPARATUS, IMAGE PROCESSING METHOD, COMPUTER PROGRAM, AND STORAGE MEDIUM

(75) Inventor: Takuya Shintani, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 51 days.

(21) Appl. No.: 12/947,718

(22) Filed: Nov. 16, 2010

(65) Prior Publication Data

US 2011/0060774 A1 Mar. 10, 2011

Related U.S. Application Data

(63) Continuation of application No. 11/393,796, filed on Mar. 31, 2006, now Pat. No. 7,868,895.

(30) Foreign Application Priority Data

Mar. 31, 2005 (JP) ................................ 2005-104801
Mar. 29, 2006 (JP) ................................ 2006-092339

(51) Int. Cl.
*G06T 1/60* (2006.01)
*H04N 5/76* (2006.01)

(52) U.S. Cl.
USPC ........................................ 345/530; 348/231.2

(58) Field of Classification Search
USPC ................................ 345/530; 348/231.2, 294
See application file for complete search history.

(56) References Cited

U.S. PATENT DOCUMENTS

| 5,265,245 | A | 11/1993 | Nordstrom et al. |
| 5,555,388 | A | 9/1996 | Shaughnessy |
| 5,692,178 | A | 11/1997 | Shaughnessy |
| 6,327,594 | B1 | 12/2001 | Van Huben et al. |
| 6,353,892 | B2* | 3/2002 | Schreiber et al. ............... 726/26 |
| 6,496,655 | B1 | 12/2002 | Malloy Desormeaux |
| 6,501,911 | B1 | 12/2002 | Malloy Desormeaux |
| 6,505,003 | B1 | 1/2003 | Malloy Desormeaux |
| 6,850,273 | B1 | 2/2005 | Yoshida et al. |
| 7,076,469 | B2* | 7/2006 | Schreiber et al. ............... 705/57 |
| 7,084,916 | B2* | 8/2006 | Morimoto et al. ....... 348/333.01 |
| 7,103,740 | B1 | 9/2006 | Colgrove et al. |
| 7,522,777 | B2 | 4/2009 | Tsukui |
| 2001/0000359 | A1* | 4/2001 | Schreiber et al. ............. 713/201 |
| 2001/0000541 | A1* | 4/2001 | Schreiber et al. ............. 713/100 |

(Continued)

FOREIGN PATENT DOCUMENTS

| JP | 2125586 A | 5/1990 |
| JP | 5334164 A | 12/1993 |

(Continued)

OTHER PUBLICATIONS

Japanese Office Action dated Sep. 5, 2011 in Japanese Application No. 2006-092339.

*Primary Examiner* — Jacinta M Crawford

(74) *Attorney, Agent, or Firm* — Fitzpatrick, Cella, Harper & Scinto

(57) ABSTRACT

An apparatus has a first attribute setting unit which sets first attribute information of image data, a second attribute setting unit which sets second attribute information of the image data, and an input-output controller which writes and reads out image data to and from an external storage medium. The first attribute information is stored in the image data, and the second attribute information is stored in an area in the external storage medium, which is used to manage the image data to be written in the external storage medium.

13 Claims, 41 Drawing Sheets

(56) References Cited

U.S. PATENT DOCUMENTS

| | | | |
|---|---|---|---|
| 2002/0051065 A1 | 5/2002 | Takahashi | |
| 2003/0011702 A1 | 1/2003 | Ohmura et al. | |
| 2003/0011703 A1 | 1/2003 | Tanaka et al. | |
| 2003/0099456 A1 | 5/2003 | Ohmura et al. | |
| 2003/0156093 A1 | 8/2003 | Niida et al. | |
| 2004/0179122 A1* | 9/2004 | Morimoto et al. | 348/333.01 |
| 2004/0179124 A1* | 9/2004 | Morimoto et al. | 348/333.02 |
| 2004/0205286 A1 | 10/2004 | Bryant et al. | |
| 2005/0007466 A1* | 1/2005 | Tsukui | 348/231.7 |
| 2005/0066219 A1 | 3/2005 | Hoffman et al. | |
| 2005/0108540 A1 | 5/2005 | Kusnoto et al. | |
| 2005/0110879 A1* | 5/2005 | Izume et al. | 348/231.2 |
| 2005/0219637 A1* | 10/2005 | Sasagawa | 358/302 |
| 2005/0280717 A1 | 12/2005 | Sugimoto | |
| 2007/0198546 A1 | 8/2007 | Shintani | |
| 2007/0291836 A1 | 12/2007 | Shi et al. | |
| 2008/0016581 A1 | 1/2008 | Cho et al. | |

FOREIGN PATENT DOCUMENTS

| | | |
|---|---|---|
| JP | 6175904 A | 6/1994 |
| JP | 10124373 A | 5/1998 |
| JP | 11266430 A | 9/1999 |
| JP | 2000295562 A | 10/2000 |
| JP | 2003271437 A | 9/2003 |
| JP | 2003296196 A | 10/2003 |

* cited by examiner

F I G. 13
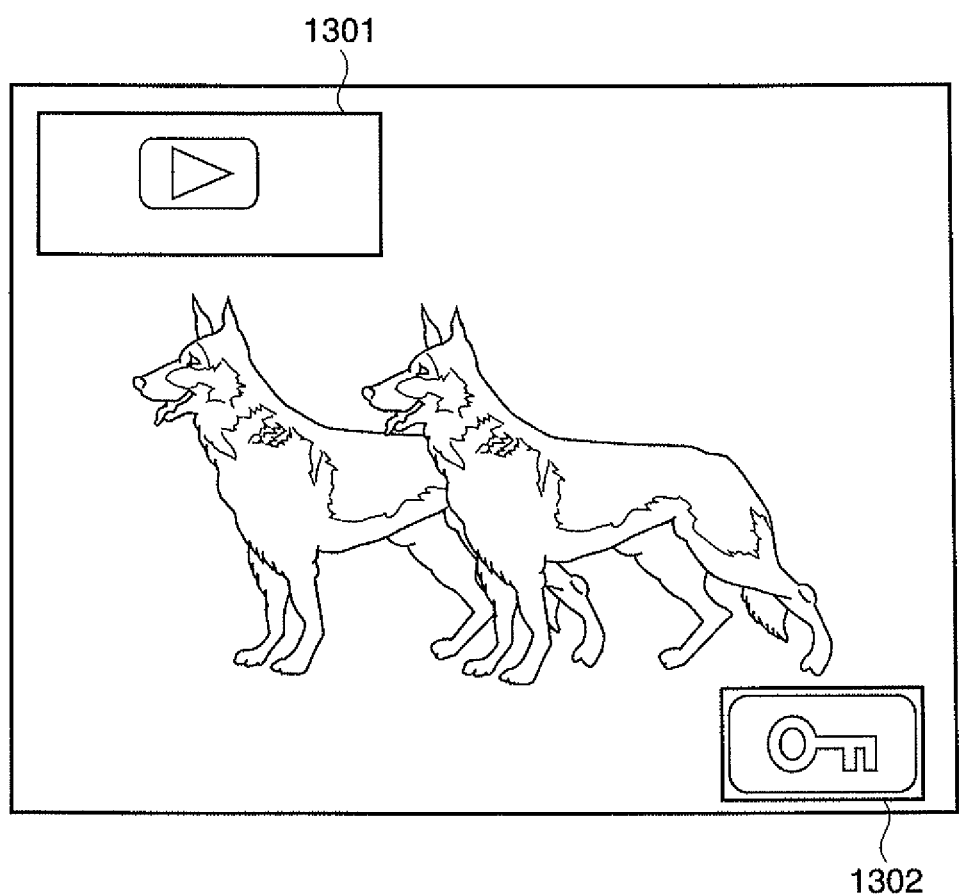

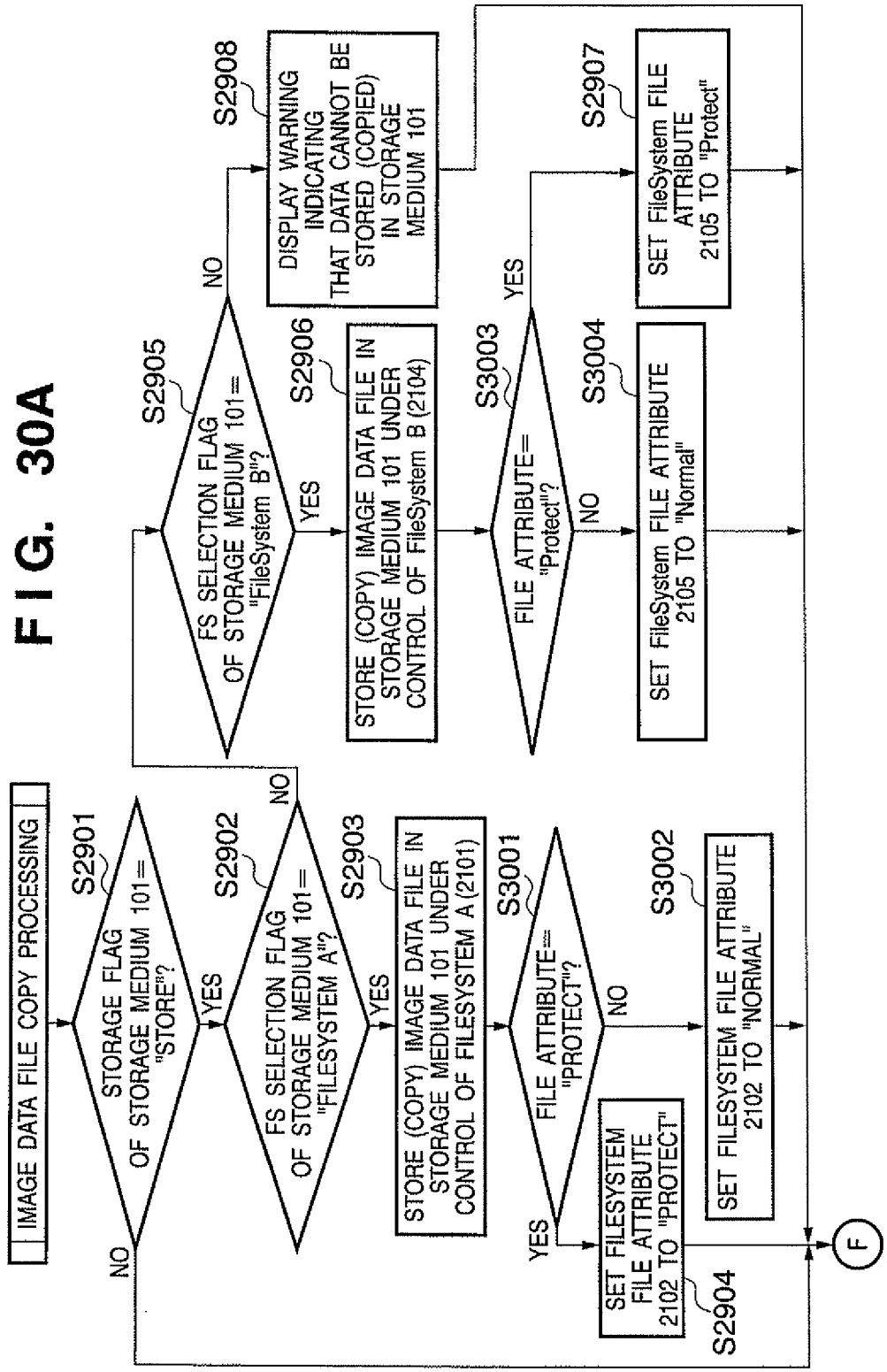

IMAGE PROCESSING APPARATUS, IMAGE PROCESSING METHOD, COMPUTER PROGRAM, AND STORAGE MEDIUM

This application is a continuation of application Ser. No. 11/393,796, filed Mar. 31, 2006, now allowed, the contents of which are incorporated by reference herein.

FIELD OF THE INVENTION

The present invention relates to an image processing apparatus, image processing method, computer program, and storage medium.

BACKGROUND OF THE INVENTION

A conventional, general image shooting/playback apparatus comprises a so-called input-output device which writes data on an external storage medium and reads out data from it so as to store shot images and to play back stored images. Also, the image shooting/playback apparatus comprises a file system used to manage a large number of image data as image data files in the external storage medium. Accesses to check what image data files exist in the external storage medium, and the like are made via the file system. This file system can assign attributes to files so as to manage and limit use of files with respect to access requests from a program (see Japanese Patent Application Laid-Open No. 5-334164). File attributes under the management of such file system will be referred to as file-system file attributes in the present application.

The external storage medium may be connected to another apparatus which comprises an input-output device. When an apparatus such as a PC which comprises an input-output device interprets file management of the file system in the external storage medium and makes accesses, the file-system file attributes are used to manage and limit use of image data files. For example, when the image shooting/playback apparatus alters a file-system file attribute of an image data file stored in the external storage medium from "normal" to "protect", the file-system file attribute when that image data file is accessed by the PC is also recognized as "protect". Conversely, when the file-system file attribute of an image data file in the external storage medium is altered from "protect" to "normal", the file-system file attribute when that image data file is accessed by the PC is also recognized as "normal".

The file-system file attributes of image data files stored in the external storage medium can be assigned to image data files under the management of the file system independently of apparatuses connected.

Attribute information of a target file is saved in, e.g., anther file, and that file is used according to the saved attribute information.

However, image data files which are shot by the image shooting/playback apparatus and are stored in the external storage medium are interpreted in different ways depending on apparatuses connected. For example, when a program on a personal computer accesses an image data file which is stored in the external storage medium from the image shooting/playback apparatus, the structure of that image data file may be destroyed due to misinterpretation of the image data file.

Hence, after the image shooting/playback apparatus stores an image data file in the external storage medium, it alters the file-system file attribute of that image data file to "protect" so as to prevent the image data file from being destroyed when the external storage medium is connected to another connected apparatus. However, even when the image shooting/playback apparatus which will not destroy the image data file accesses that image data file, the image data file is handled as that with "protect". Hence, before write access such as deletion, editing, and the like of the image data file, the user must manually cancel "protect".

SUMMARY OF THE INVENTION

The present invention has been made in consideration of the aforementioned problems and has as its object to prevent an image data file in an external storage medium under the management of the file system from being destroyed by a connected apparatus and to facilitate access control based on attributes.

An example of a preferred embodiment of the present invention is an image processing apparatus comprising, a first attribute setting unit adapted to set first attribute information of image data, a second attribute setting unit adapted to set second attribute information of the image data and an input-output controller adapted to write and read out image data to and from an external storage medium, wherein the first attribute information is stored in the image data, and the second attribute information is stored in an area in the external storage medium, which is used to manage the image data to be written in the external storage medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 shows a display example upon playback display according to the first embodiment of the present invention;

FIGS. 30A and 30B are flowcharts for explaining another example of the image data file copy processing sequence according to the second embodiment of the present invention;

DETAILED DESCRIPTION OF THE PREFERRED EMBODIMENTS

Preferred embodiments of the present invention will now be described in detail in accordance with the accompanying drawings.

First Embodiment

The arrangement of an image processing apparatus according to the first embodiment of the present invention will be described first.

Figure 1:
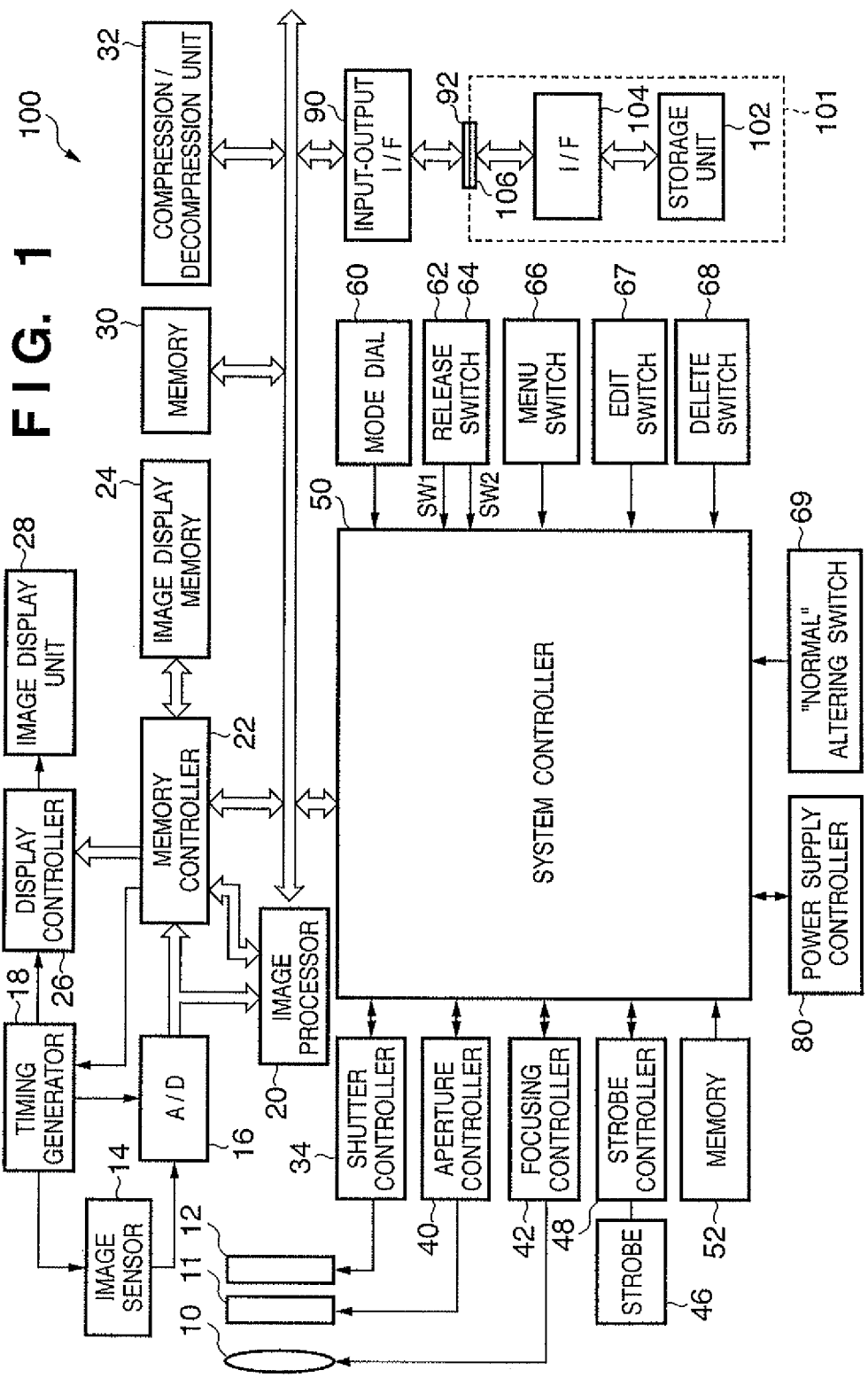
FIG. 1 is a block diagram showing an example of the arrangement of an image processing apparatus according to the first embodiment of the present invention.

Referring to FIG. 1, reference numeral 100 denotes an image processing apparatus according to this embodiment. The image processing apparatus 100 may be any of a digital camera, a digital video camera, and a portable terminal with a camera (including a cellular phone with a camera). This embodiment will explain a case wherein the image processing apparatus 100 is a digital camera.

In the image processing apparatus 100, reference numeral 10 denotes an imaging lens; 11, an aperture; 12, a shutter; 14, an image sensor for converting an optical image into an electrical signal; and 16, an A/D converter for converting an analog signal output of the image sensor 14 into a digital signal.

Reference numeral 18 denotes a timing generator for supplying clocks and control signals to the image sensor 14, the A/D converter 16, and a display controller 26. The timing generator 18 is controlled by a memory controller 22 and system controller 50.

Reference numeral 20 denotes an image processor which applies predetermined pixel interpolation processing and color conversion processing to image data from the A/D converter 16 or that from the memory controller 22 based on processing data appended to the image data. The image processor 20 performs predetermined arithmetic processing using image data output from the A/D converter 16. Then, based on the arithmetic result obtained by the image processor 20, the system controller 50 performs TTL (through-the-lens) auto-focus (AF) processing, auto-exposure (AE) processing, and strobe pre-emission (EF) processing of a shutter controller 34, aperture controller 40, and focusing controller 42. Furthermore, the image processor 20 performs predetermined arithmetic processing using image data output from the A/D converter 16 and executes TTL auto-white balance (AWB) processing based on the obtained arithmetic result.

Reference numeral 22 denotes a memory controller which controls the A/D converter 16, the timing generator 18, the image processor 20, an image display memory 24, the display controller 26, a memory 30, and a compression/decompression unit 32. Image data output from the A/D converter 16 is written in the image display memory 24 or the memory 30 via the image processor 20 and memory controller 22 or via the memory controller 22 alone.

Reference numeral 24 denotes an image display memory; 26, a display controller; and 28, an image display unit which has a TFT LCD (Liquid Crystal Display) or the like. Display image data written in the image display memory 24 is displayed on the image display unit 28 via the image controller 26.

When shot image data are sequentially displayed using the image display unit 28, an electronic viewfinder function can be implemented. Note that the image display unit 28 can arbitrarily turn on/off its display function in accordance with an instruction from the system controller 50. When the display function of the image display unit 28 is turned off, the consumption power of the image processing apparatus 100 can be greatly saved. Also, the image display unit 28 displays information associated with focus, camera shake, shutter speed, aperture value, exposure correction, and the like in accordance with an instruction from the system controller 50.

Reference numeral 30 denotes a memory for storing still images and moving images. The memory 30 has a sufficiently large memory size that can store a predetermined number of still images and a moving image for a predetermined period of time. As a result, in case of continuous-shot shooting or panorama shooting that continuously shoots a plurality of still images, write access of a large number of images can be made on the memory 30 at high speed. In addition, the memory 30 can be used as a work area of the system controller 50. Furthermore, the memory 30 is also used when image data is to be displayed on the image display unit 28 by the display controller 26 by executing processing for reading out image data from a storage medium (to be described later) onto the memory 30 and writing it in the image display memory 24 via the image processor 20 and memory controller 22.

Reference numeral 32 denotes a compression/decompression unit which can compress image data read out from the memory 30 to, e.g., JPEG data in accordance with a predetermined image compression method (e.g., adaptive discrete cosine transformation (ADCT) or the like). Also, the compression/decompression unit 32 has a function of writing compressed image data in the memory 30 and a function of decompressing image data read out from the memory 30 and writing the decompressed image data in the memory 30.

Reference numeral 34 denotes a shutter controller for controlling the shutter 12; and 40, an aperture controller for controlling the aperture 11. Reference numeral 42 denotes a focusing controller for controlling focusing of the imaging lens 10; 46, a strobe; and 48, a strobe controller for controlling light emission of the strobe 46. Reference numeral 50 denotes a system controller for controlling the overall image processing apparatus 100.

Reference numeral 52 denotes a memory such as a ROM storing constants, variables, programs, and the like required to operate the system controller 50. The memory 52 stores a program for executing image shooting processing, that for executing image processing, that for storing generated image file data in a storage medium, and that for reading out image file data from the storage medium. Also, the memory 52 stores various programs shown in the flowcharts of FIGS. 3 to 12 and FIGS. 22 to 30B, and also various programs such as an OS and the like that implements and executes a multi-task configuration of the programs. A message queue is generated for respective programs, and messages are enqueued in the message queue in a FIFO (First In First Out) manner. Respective programs exchange messages, so that they are controlled in collaboration with each other, thus controlling respective functions.

Reference numerals 60, 62, 64, 66, 67, 68, and 69 denote operation units for inputting various operation instructions of the system controller 50. These operation units are constructed by one or a plurality of combinations of a switch, a dial, a touch panel, a pointer using line of sight detection, a speech recognition device, and the like.

Examples of these operation units will be explained below.

Reference numeral 60 denotes a mode dial switch which can selectively set one of various function modes: power ON/OFF, a playback mode, auto shooting mode, programmed shooting mode, shutter speed priority shooting mode, aperture priority shooting mode, manual shooting mode, portrait shooting mode, landscape shooting mode, macro shooting mode, sports shooting mode, nightscape shooting mode, multi-frame playback/delete mode, edit mode, file "protect" altering mode, PC connection mode, and the like.

Reference numeral 62 denotes a release switch SW1, which is turned on during operation of a release button (not shown), and instructs to start the AF (auto-focus) processing, AE (auto-exposure) processing, AWB (auto-white balance) processing, EF (strobe pre-emission) processing, and the like.

Reference numeral 64 denotes a release switch SW2, which is turned on upon completion of operation of the release button (not shown), and instructs to start a series of processes including exposure processing, development processing, and storage processing. Note that the exposure processing is processing for writing a signal read out from the image sensor 14 as image data in the memory 30 via the A/D converter 16 and memory controller 22. The development processing is processing using arithmetic operations in the image processor 20 and memory controller 22. Furthermore, the storage processing is processing for reading out image data from the memory 30, compressing the readout data by the compression/decompression unit 32, and writing the compressed image data in a storage medium 101.

Reference numeral 66 denotes a menu switch, which includes a combination of a menu key, set key, arrow keys, and the like (none of them are shown), and allows the user to change various settings such as the image shooting conditions, development conditions, and the like of the camera via display on the image display unit 28.

Reference numeral 67 denotes an edit switch, which includes a combination of an edit key, set key, arrow keys, and the like (none of them are shown), and allows the user to edit an image data file via display on the image display unit 28.

Reference numeral 68 denotes a delete switch, which includes a combination of a delete key, arrow keys, and the like (none of them are shown), and allows the user to delete an image data file via display on the image display unit 28.

Reference numeral 69 denotes a "protect" altering switch, which includes a combination of a set key, arrow key, and the like (none of them are shown) and allows the user to alter "protect" of an image data file via display on the image display unit 28.

Reference numeral 80 denotes a power supply controller which is comprised of a battery detection circuit, DC-DC converter, switch circuit for switching blocks to be energized, and the like. The power supply controller 80 detects the presence/absence, type, and remaining battery level of a battery attached, controls the DC-DC converter on the basis of such detection results and an instruction from the system controller 50, and supplies a required voltage to the respective units including the storage medium for a required period of time.

Reference numeral 90 denotes an interface with a storage medium such as a memory card, hard disk, or the like; and 92, a connector for connecting a storage medium such as a memory card, hard disk, or the like.

Note that this embodiment has one set of the interface and connector that receive the storage medium. However, the number of sets of interfaces and connectors that receive the storage media is not particularly limited. Also, combinations of interfaces and connectors of different standards may be used.

As the interface and connector, those complying with the standards of a PCMCIA card, CompactFlash® card, and the like may be used. In this case, the interface 90 and connector 92 can connect various communication cards and can exchange image data and associated management information with another computer or a peripheral device such as a printer or the like. The communication cards include a LAN card, modem card, USB card, IEEE1394 card, P1284 card, SCSI card, PHS, and the like.

Reference numeral 101 denotes a storage medium such as a memory card, hard disk, or the like. The storage medium 101 comprises a storage unit 102 including a semiconductor memory, magnetic disk, or the like, an interface 104 with the image processing apparatus 100, and a connector 106 for connecting the image processing apparatus 100.

Figure 2:
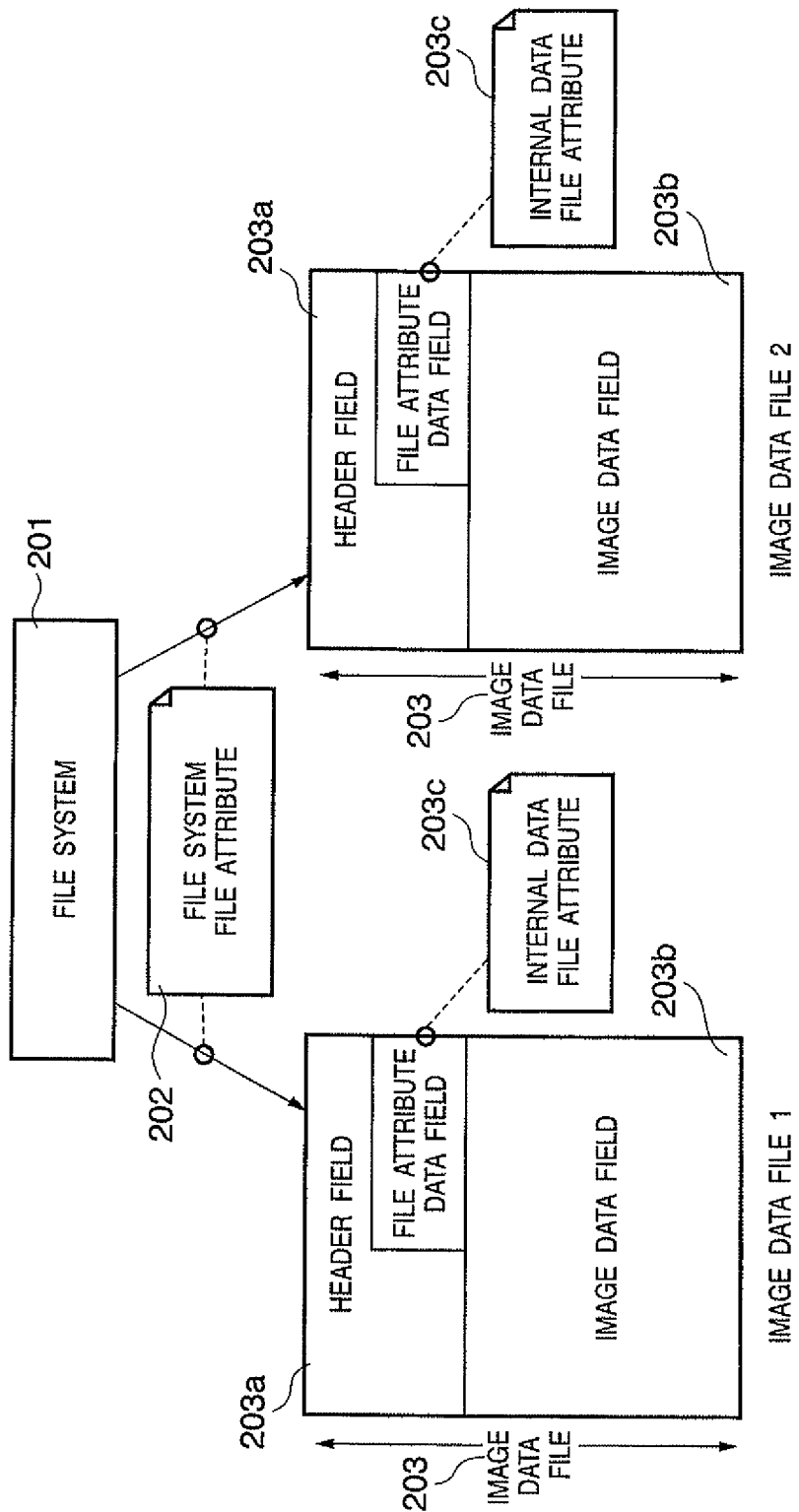
FIG. 2 is a view for explaining the relationship between image data files and a file system according to the first embodiment of the present invention.

FIG. 2 shows the relationship between the file structure and file system upon storing image data, which is generated by the image shooting processing and is stored in the memory 30, in the storage medium 101 as an image data file.

In this embodiment, an image data file 203 is stored in the storage medium 101 under the management of a file system 201. This file system 201 manages write (storage) and read accesses of the image data file 203 to and from the storage medium 101. The file system 201 is implemented by the system controller 50 by acquiring and executing a program stored in the memory 52. Under the management of the file system 201, the file attribute of the image data file 203 is managed on a table assured on a management area of the storage medium 101. In the following description of this embodiment, this file attribute will be referred to as a filesystem file attribute 202.

The image data file 203 stored in the storage medium 101 is divided into a header field 203a and image data field 203b, and an internal data file attribute 203c has its area in the header field 203a. This internal data file attribute 203c includes data which can identify file attributes which are generally used. More specifically, the file attributes include "normal", "archive", "hidden", "protect", "system", "read-out capability", "write-in capability", "execution capability", and the like.

Note that "normal" is an attribute normally provided in the file system, and at least a change in data to which this attribute is assigned is not inhibited. "Archive" indicates that some sort of access has been made to a file to which this attribute is assigned. "Hidden" makes an image data file to which this attribute is assigned a hidden file. "Protect" inhibits any change (including editing and deletion) of an image data file to which this attribute is assigned. "System" is assigned to system files. "Read-out capability" is used to set whether or not an image data file can be read out from the storage medium 101. "Write-in capability" is used to set whether or not write access to an image data file is permitted. "Execution capability" is used to set whether or not the file of interest can be executed.

Figure 19:
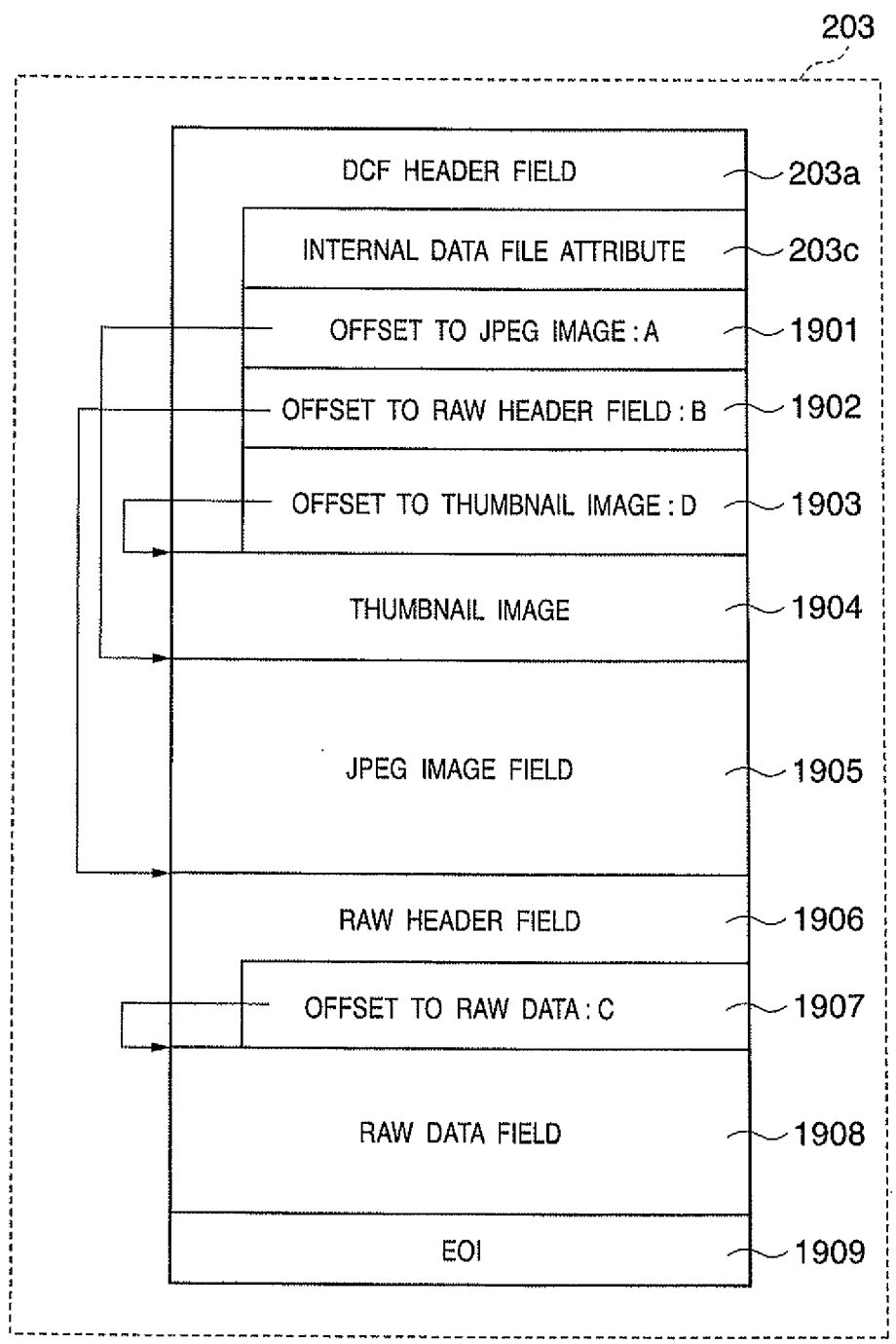
FIG. 19 is a view showing an example of the structure of an image data file 203 according to the first embodiment of the present invention.

Note that details of the structure of the image data file 203 according to this embodiment are as shown in, e.g., FIG. 19. FIG. 19 shows an example of the data structure of the image data file 203 according to this embodiment.

In this embodiment, assume that the image data file 203 has a DCF (Design rule for Camera File System) file format which is generally used in digital cameras. More specifically, the image data file 203 roughly includes a DCF header field 203a, thumbnail image field 1904, JPEG image field 1905, RAW header field 1906, RAW data field 1908, and marker (EOI marker) 1909 indicating the end of JPEG data. Note that RAW data is image data which is output without deteriorating the output from the image sensor. As for the correspondence with FIG. 2, the header field 203a in FIG. 2 corresponds to the DCF header field 203a in FIG. 19, and the image data field 203b in FIG. 2 corresponds to the fields from the thumbnail image field 1904 to the EOI marker 1909 in FIG. 19.

Note that the DCF header field 203a stores DCF header information and is given a predetermined data size in advance. The DCF header information stores the aforementioned internal data file attribute 203c. Also, the DCF header information includes meta data such as image shooting information, parameters, and the like associated with image data stored in the JPEG image field 1905. Furthermore, the DCF header information includes offset value A (1901) to a JPEG image, offset value B (1902) to the RAW header field 1906, and offset value D (1903) to a thumbnail image. These offset values A, B, and D can specify the start positions of each image data and header field, and the divisions of respective data and header fields. The thumbnail image field 1904 stores a thumbnail image which is obtained by decimating and resizing a JPEG image stored in the JPEG image field 1905 so as to use the thumbnail image upon multi-image (index) display on the image display unit 28. The JPEG image field 1905 stores JPEG image data obtained by processing RAW data by the image processor 20 and compressing the processed data.

The RAW header field 1906 stores RAW header information and is given a predetermined header size in advance. The RAW header information includes meta data such as image shooting information, parameters, and the like of RAW data, and also offset value C (1907) to the RAW data. Offset values B and C can specify the position of RAW data in the image data file 203. The RAW data field 1908 stores RAW data as large-size image data before development and compression, which is read out from the image sensor 14. Since the marker (EOI marker) 1909 indicating the end of JPEG data is allocated behind the RAW data, the validity of the DCF format is maintained. Also, information of the RAW header field 1908 indicating the presence/absence or the position of RAW data may be stored in the DCF header field 203a. In this case, offset value B assumes a value indicating an offset to RAW data.

Note that a case has been explained wherein the image data file 203 is generated as a DCF file including RAW data. However, data to be included in the image data file 203 is not limited to RAW data. For example, a case wherein the image data file 203 is generated to include the image processing result of RAW data as bitmap data without any compression is also effective.

Furthermore, the start positions of respective image data and header fields are specified by offset values A, B, and D included in the DCF header information. For example, the RAW (or bitmap) header field 1906 and RAW (or bitmap) data field 1908 may be allocated immediately after the DCF header field 203a or thumbnail image field 1904.

Figure 3:
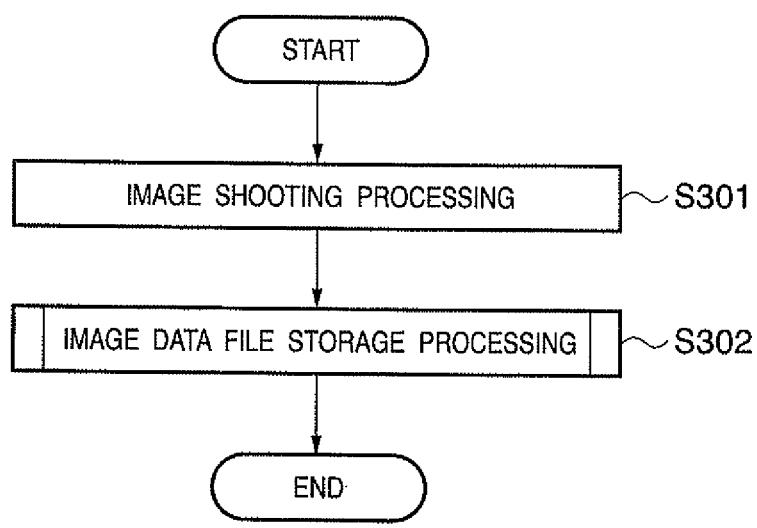
FIG. 3 is a flowchart for explaining an image shooting sequence according to the first embodiment of the present invention.

A sequence from image shooting to storage of an image data file in the storage medium 101 will be described below with reference to FIG. 3. FIG. 3 is a flowchart corresponding to an example of this processing.

Referring to FIG. 3, in step S301 a series of image shooting operations including the AF processing, AE processing, and exposure processing are executed in response to the operations of the switches SW1 (62) and SW2 (64) which form the release button (not shown), as described using FIG. 1 above. Image data obtained by image shooting is temporarily saved in the memory 30 in the format of the image data file 203 described using FIG. 2. In step S302, image data file write processing starts. In this image data file write processing, the image data file is written in the storage medium 101. Details of this processing will be described later with reference to FIG. 8. As described above, a series of image shooting operations are executed.

Figure 4:
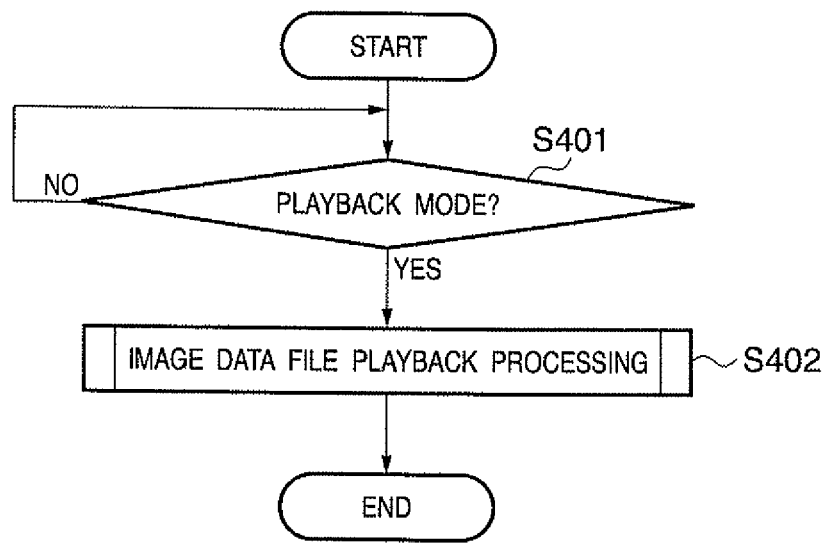
FIG. 4 is a flowchart for explaining a playback display sequence according to the first embodiment of the present invention.

A sequence from when an image data file is read out from the storage medium 101 until the readout image data file is displayed on the image display unit 28 will be described below with reference to FIG. 4. FIG. 4 is a flowchart corresponding to an example of this processing.

Referring to FIG. 4, it is checked in step S401 if the mode dial switch 60 is set in the playback mode. If it is determined that the mode dial switch 60 is set in the playback mode ("YES" in step S401), the flow advances to image data file playback processing in step S402. In this image data file playback processing, processing for reading out an image data file from the storage medium 101 onto the memory 30 is executed. Details of this processing will be described later with reference to FIG. 9.

Figure 5:
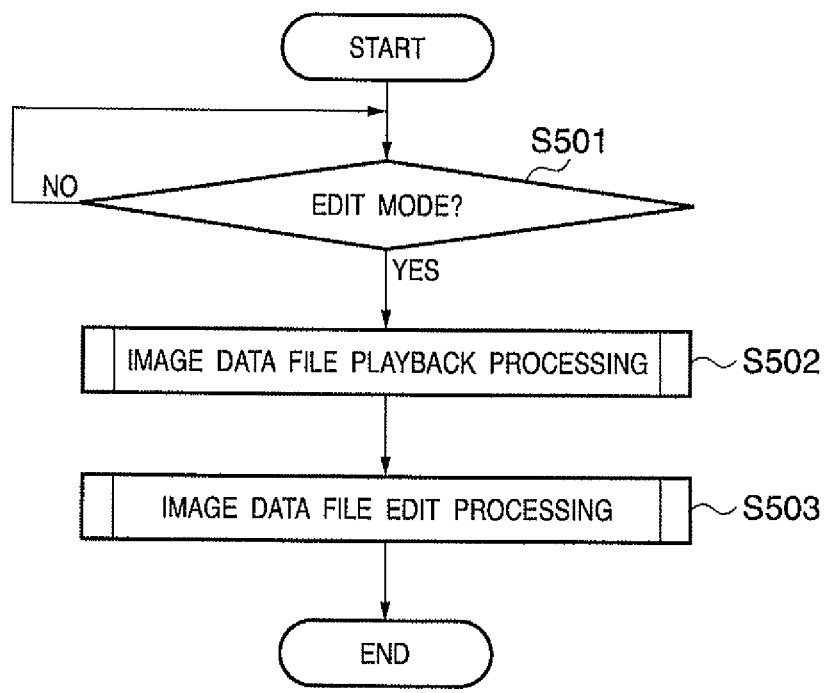
FIG. 5 is a flowchart for explaining an edit sequence according to the first embodiment of the present invention.

A sequence from when an image data file is read out from the storage medium 101 until the readout image data file is displayed on the image display unit 28 and is edited will be described below with reference to FIG. 5. FIG. 5 is a flowchart corresponding to an example of this processing.

Referring to FIG. 5, it is checked in step S501 if the mode dial switch 60 is set in the edit mode. If it is determined that the mode dial switch 60 is set in the edit mode ("YES" in step S501), the flow advances to step S502 to execute image data file playback processing, which will be described later with reference to FIG. 9. In the next image data file edit processing in step S503, processing for editing and saving the image data file, which is read out onto the memory 30 in step S502, is executed. Details of this processing will be described later with reference to FIG. 10.

Figure 6:
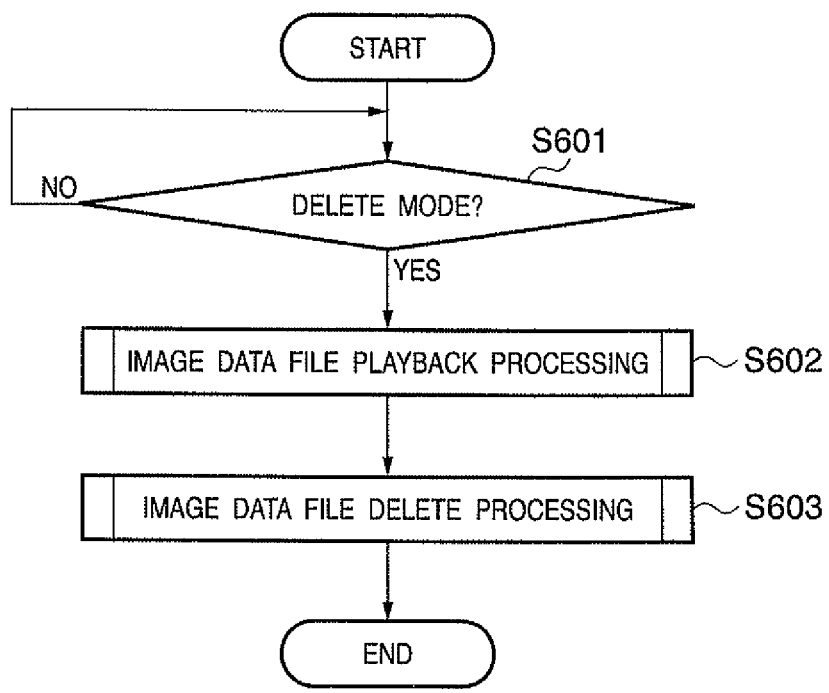
FIG. 6 is a flowchart for explaining a delete sequence according to the first embodiment of the present invention.

A sequence from when an image data file is read out from the storage medium 101 until the readout image data file is displayed on the image display unit 28 and is deleted will be described below with reference to FIG. 6. FIG. 6 is a flowchart corresponding to this processing.

Referring to FIG. 6, it is checked in step S601 if the mode dial switch 60 is set in the delete mode. If it is determined that the mode dial switch 60 is set in the delete mode, the flow advances to step S602 to execute image data file playback processing, which will be described later with reference to FIG. 9. In the next image data file delete processing in step S603, processing for deleting the image data file read out in step S602 from the storage medium 101 is executed. Details of this processing will be described later with reference to FIG. 11.

Figure 7:
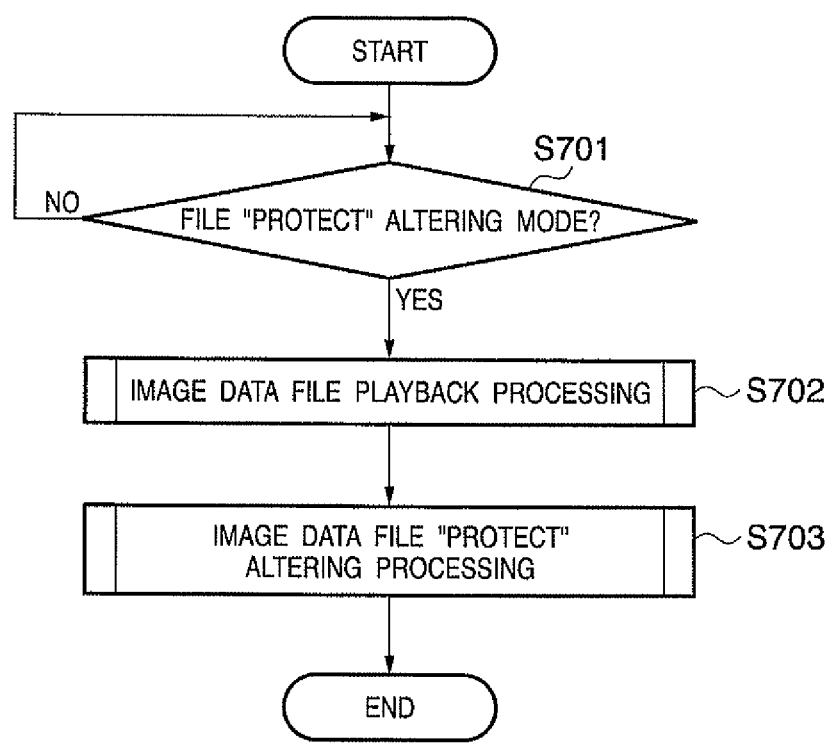
FIG. 7 is a flowchart for explaining a "protect" altering sequence according to the first embodiment of the present invention.

Furthermore, a sequence from when an image data file is read out from the storage medium 101 until the readout image data file is displayed on the image display unit 28 and its "protect" is altered will be described below with reference to FIG. 7. FIG. 7 is a flowchart corresponding to this processing.

Referring to FIG. 7, it is checked in step S701 if the mode dial switch 60 is set in the file "protect" altering mode. If it is determined that the mode dial switch 60 is set in the file "protect" altering mode ("YES" in step S701), the flow advances to step S702 to execute image data file playback processing, which will be described later with reference to FIG. 9. In the next file "protect" altering processing in step S703, processing for altering "protect" of the image data file, which is read out onto the memory 30 in step S702, is executed. Details of this processing will be described later with reference to FIG. 12.

Figure 8:
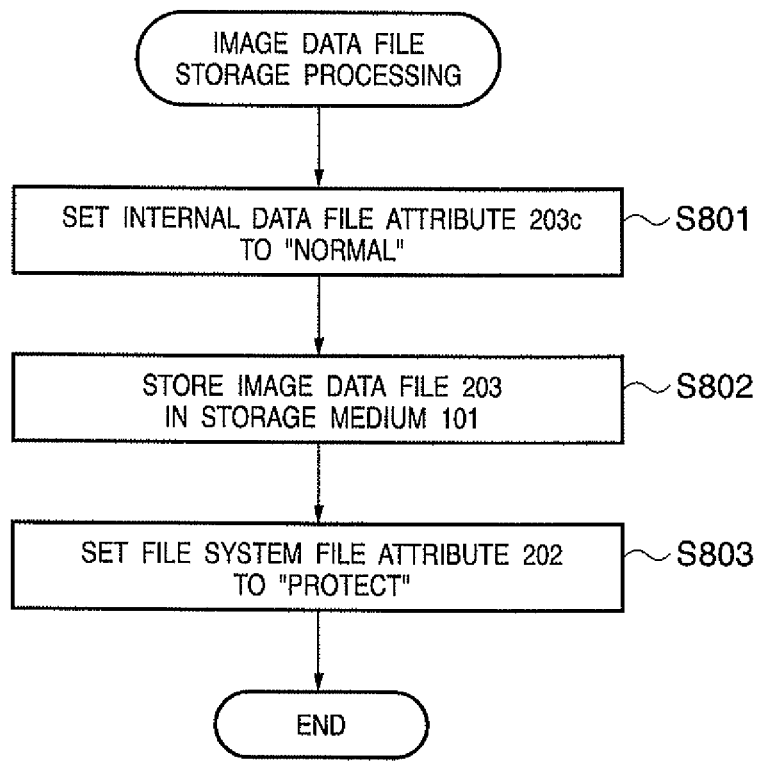
FIG. 8 is a flowchart for explaining an image data file storage processing sequence according to the first embodiment of the present invention.

The image data file storage processing which is executed in step S302 in FIG. 3 to store the image data file 203 in the storage medium 101 will be described below with reference to the flowchart shown in FIG. 8.

In step S801, the internal data file attribute 203c in the image data file 203 temporarily saved in the memory 30 is set to "normal". The flow then advances to step S802 to write the image data file 203 in the storage medium 101. In step S803, the file-system file attribute 202 of the written image data file 203 is set to "protect", thus ending the processing.

In this manner, upon storing the image data file in the storage medium 101, the internal data file attribute 203c is set to "normal", and the file-system file attribute 202 is set to "protect". In this manner, when an image data file is read out from the storage medium 101 by a program from, e.g., a personal computer, it is read out as a "protect" file since the file-system file attribute 202 functions. Hence, since the program on the personal computer cannot apply any edit processing or the like to the image data file 203, file destruction due to misinterpretation of the image data file structure can be prevented.

Note that file destruction due to misinterpretation of the image data file structure occurs when the image data file includes an area which cannot be interpreted by the program on the personal computer. More specifically, when access is made while that area remains uninterpreted, the file structure is destroyed.

Figure 9:
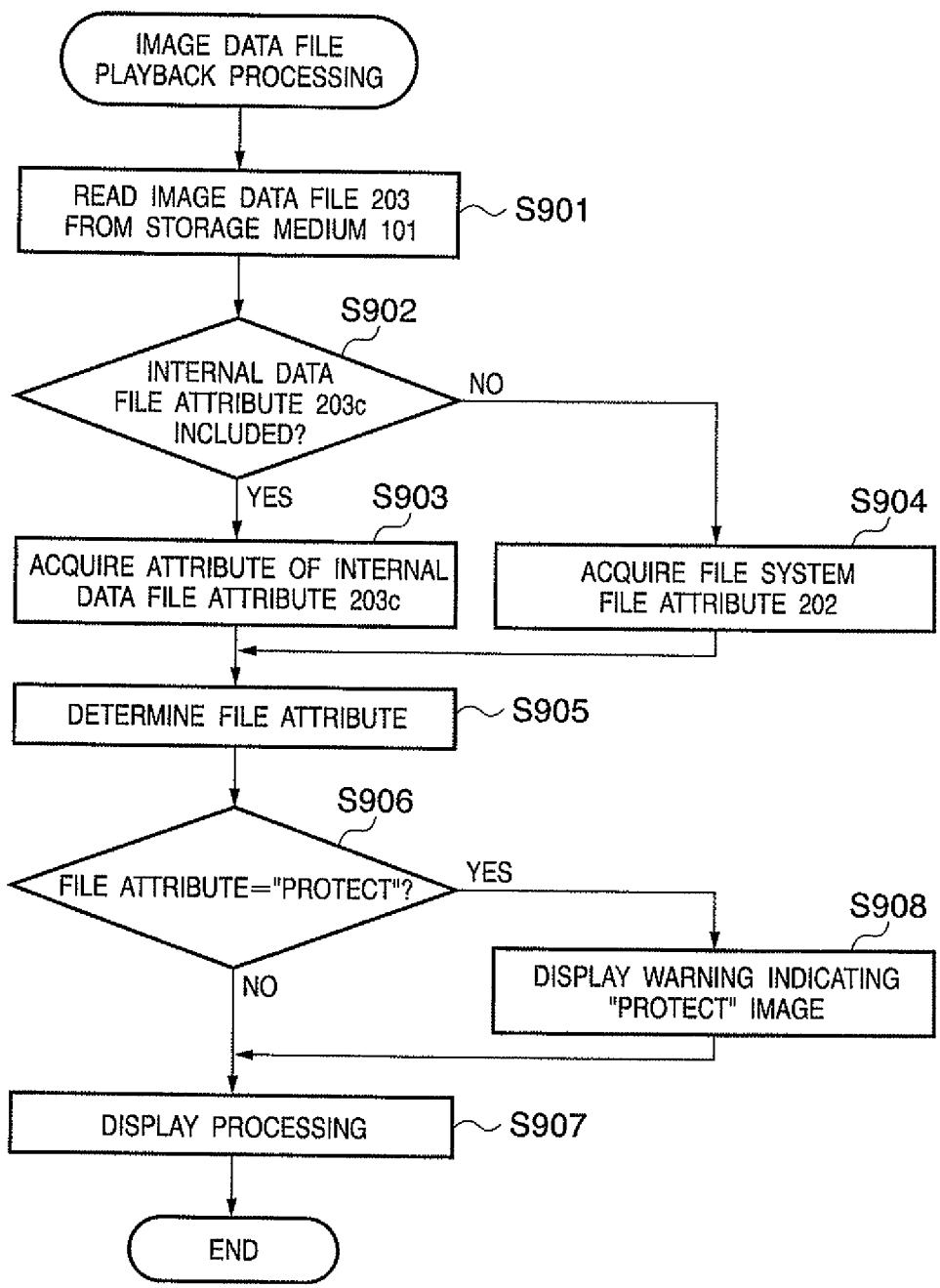
FIG. 9 is a flowchart for explaining an image data file playback processing sequence according to the first embodiment of the present invention.

The image data file playback processing which is executed in step S402 in FIG. 4, and reads out and plays back the image data file 203 from the storage medium 101 will be described below with reference to the flowchart of FIG. 9.

In step S901, the image data file 203 is read out from the storage medium 101 onto the memory 30. It is checked in step S902 if the image data file 203 read out onto the memory 30 includes the internal data file attribute 203c. If it is determined that the image data file 203 includes the internal data file attribute 203c ("YES" in step S902), the flow advances to step S903 to acquire the internal data file attribute 203c. On the other hand, if it is determined that the image data file 203 does not include any internal data file attribute 203c ("NO" in step S902), the file-system file attribute 202 of the image data file 203 is acquired in step S904.

In step S905, the file attribute acquired in step S903 or S904 is temporarily stored in the memory 30 as an attribute of the image data file 203. In step S906, the contents of the image data file attribute temporarily stored in the memory 30 in step S905 are checked. If it is determined that the image data file attribute is not "protect" ("NO" in step S906), the flow advances to step S907 to execute display processing. Since the display processing in this step is known to those who are skilled in the art, a detailed description thereof will be omitted. In brief, processing for displaying the image data file 203 read out onto the memory 30 on the image display unit 28 by the display controller 26 is executed.

On the other hand, if it is determined that the image data file attribute is "protect" ("YES" in step S906), the flow advances to step S908. In step S908, a warning indicating a "protect" image is displayed on the image display unit 28 by the display controller 26. In step S907, the display processing is executed, thus ending the processing.

FIG. 13 shows an example of a display mode with a warning. Referring to FIG. 13, reference numeral 1301 denotes an icon which indicates that the mode dial switch 60 is set in the playback mode. Reference numeral 1302 denotes an icon which indicates the attribute of the image data file temporarily stored in the memory 30 in step S905. Such icon can indicate that the image data file 203 has "protect". If the image data file does not have "protect", the icon 1302 need not be displayed.

By playing back the image data file 203 in this way, even when the file-system file attribute 202 is "protect", the image data file can be displayed not as a "protect" image based on the contents of the internal data file attribute 203c. As for the image data file 203 which does not include any internal data file attribute 203c, display exploiting the file-system file attribute 202 can be made.

Figure 10:
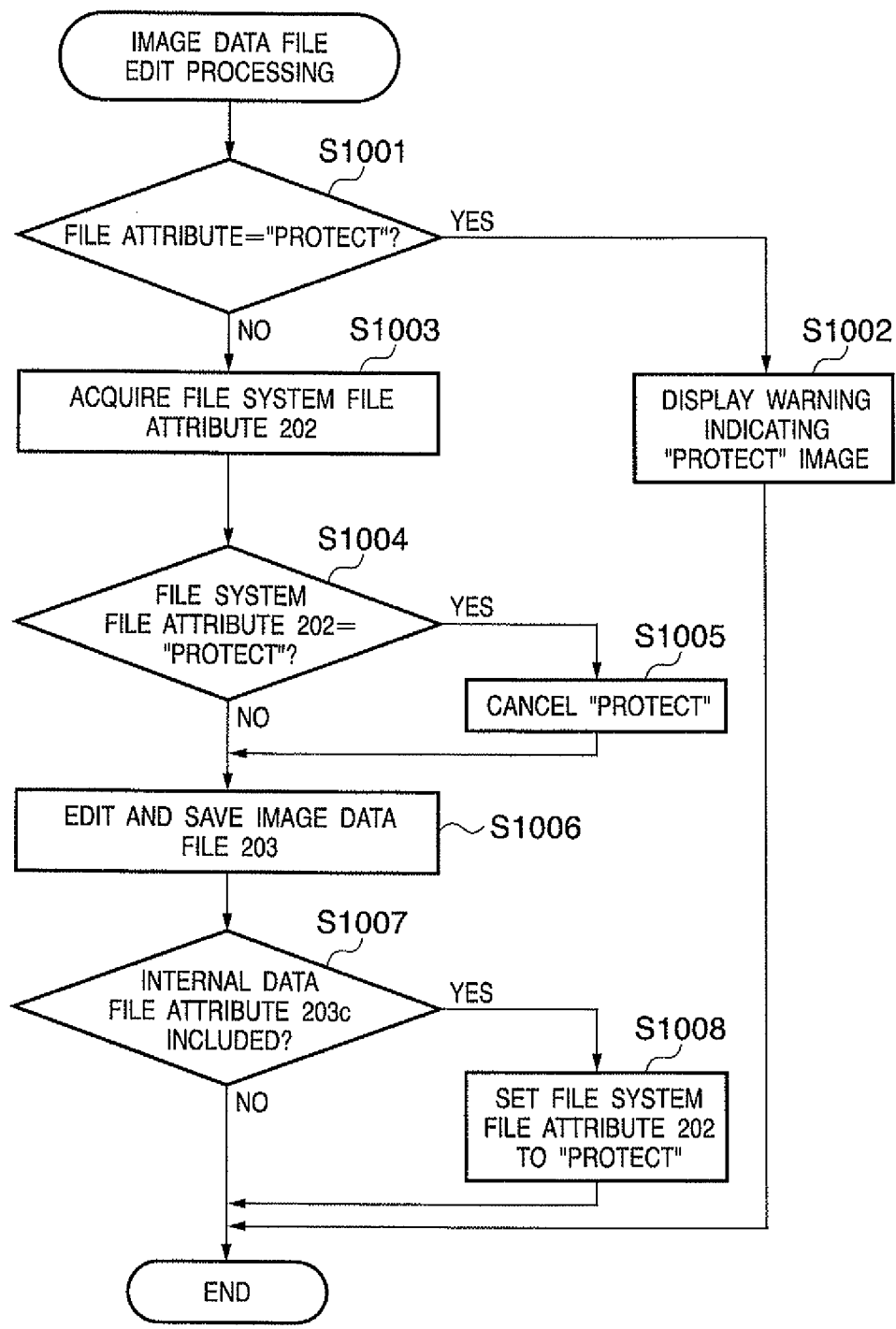
FIG. 10 is a flowchart for explaining an image data file edit processing sequence according to the first embodiment of the present invention.

The image data file edit processing in step S503 in FIG. 5 will be described below with reference to the flowchart of FIG. 10.

In step S1001, the attribute of the image data file 203, which is determined in step S502, is checked. If it is determined that the attribute of the image data file 203 is "protect" ("YES" in step S1001), a warning indicating a "protect" image is displayed on the image display unit 28 by the display controller 26 in step S1002, thus ending the processing.

Figure 14:
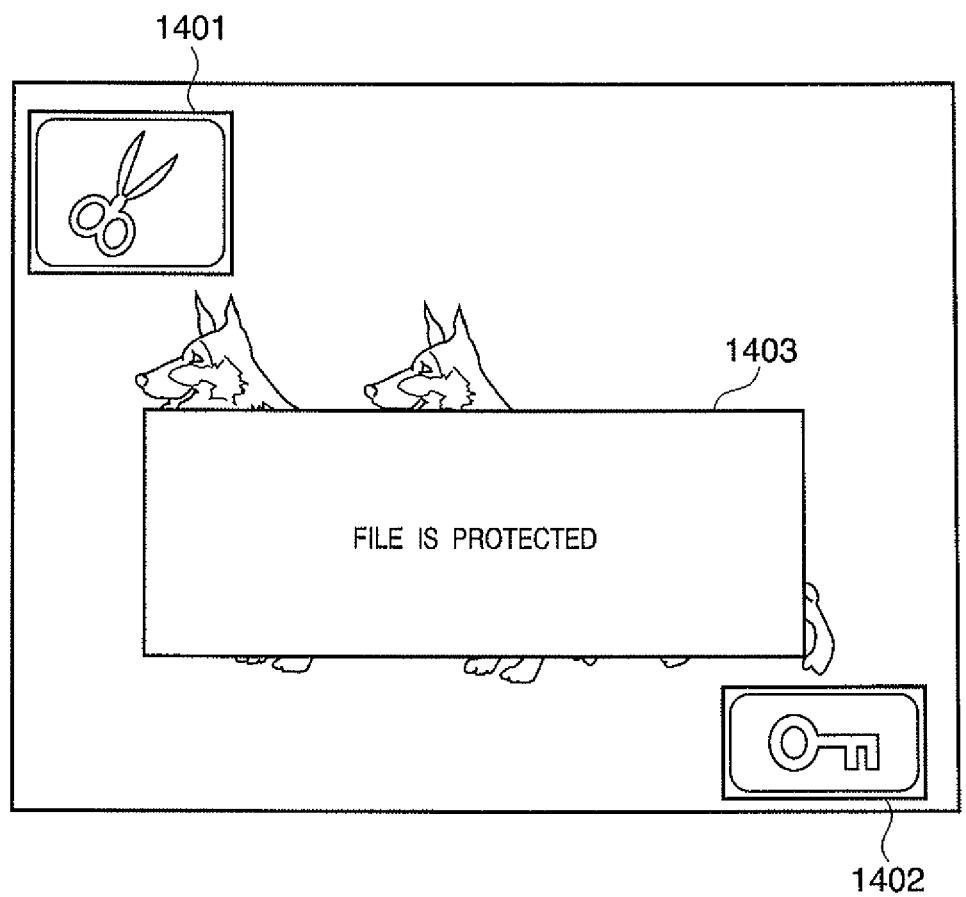
FIG. 14 shows a display example upon edit display according to the first embodiment of the present invention.

FIG. 14 shows an example of display with such warning. Referring to FIG. 14, reference numeral 1401 denotes an icon which indicates that the mode dial switch 60 is set in the edit mode. Reference numeral 1402 denotes an icon which indicates that the image data file 203 is a "protect" image. Reference numeral 1403 denotes a warning message indicating that it is impossible to edit the image data file 203.

On the other hand, if it is determined that the attribute of the image data file 203 is not "protect" ("NO" in step S1001), the flow advances to step S1003 to acquire the file-system file attribute 202 of the image data file 203.

In step S1004, the contents of the file-system file attribute 202 are checked. If it is determined that the contents of the file-system file attribute 202 indicate "protect" ("YES" in step S1004), the flow advances to step S1005. In step S1005, "protect" is canceled by altering the file-system file attribute 202, which is managed on the table in the management area of the storage medium 101, to "normal", and the flow then advances to step S1006. The reason why "protect" is canceled is as follows. That is, if the file-system file attribute 202 remains to be "protect", the image data file 203 cannot be edited and the edit result cannot be saved in the storage medium 101 in step S1006. On the other hand, if it is determined that the file-system file attribute 202 is not "protect" ("NO" in step S1004), the flow directly advances to step S1006.

In step S1006, the edit processing of the image data file 203 is executed. Since the edit processing of the image data file is known to those who are skilled in the art, a description of its method and the like will be omitted. In brief, the image data file in the memory 30 is edited based on the operations of the edit switches of the operation unit 67 in FIG. 1, and the edit result is saved in the storage medium 101.

It is then checked in step S1007 if the image data file 203 read out onto the memory 30 includes the internal data file attribute 203c. If it is determined that the image data file 203 includes the internal data file attribute 203c ("YES" in step S1007), the flow advances to step S1008 to alter the file-system file attribute 202 to "protect", thus ending the processing. Since the file-system file attribute 202 is altered to "protect" in this way, when the corresponding image data file is read out by another apparatus, the image data file 203 after the edit processing can be prevented from being destroyed by misinterpretation of the image data file structure. At the same time, the image generation apparatus according to this embodiment can execute edit processing according to the internal data file attribute 203c. On the other hand, if it is determined that the image data file 203 does not include any internal data file attribute 203c ("NO" in step S1007), the processing ends.

In this manner, in the edit processing of the image data file 203, even when the file-system file attribute 202 is "protect", whether or not the image data file 203 can be edited is determined based on the contents of the internal data file attribute 203c, thus executing the edit processing. As for the image data file 203 which does not include any internal data file attribute 203c, whether or not the image data file can be edited is determined by seeing if the contents of the file-system file attribute 202 indicate "protect", thus executing the edit processing.

Figure 11:
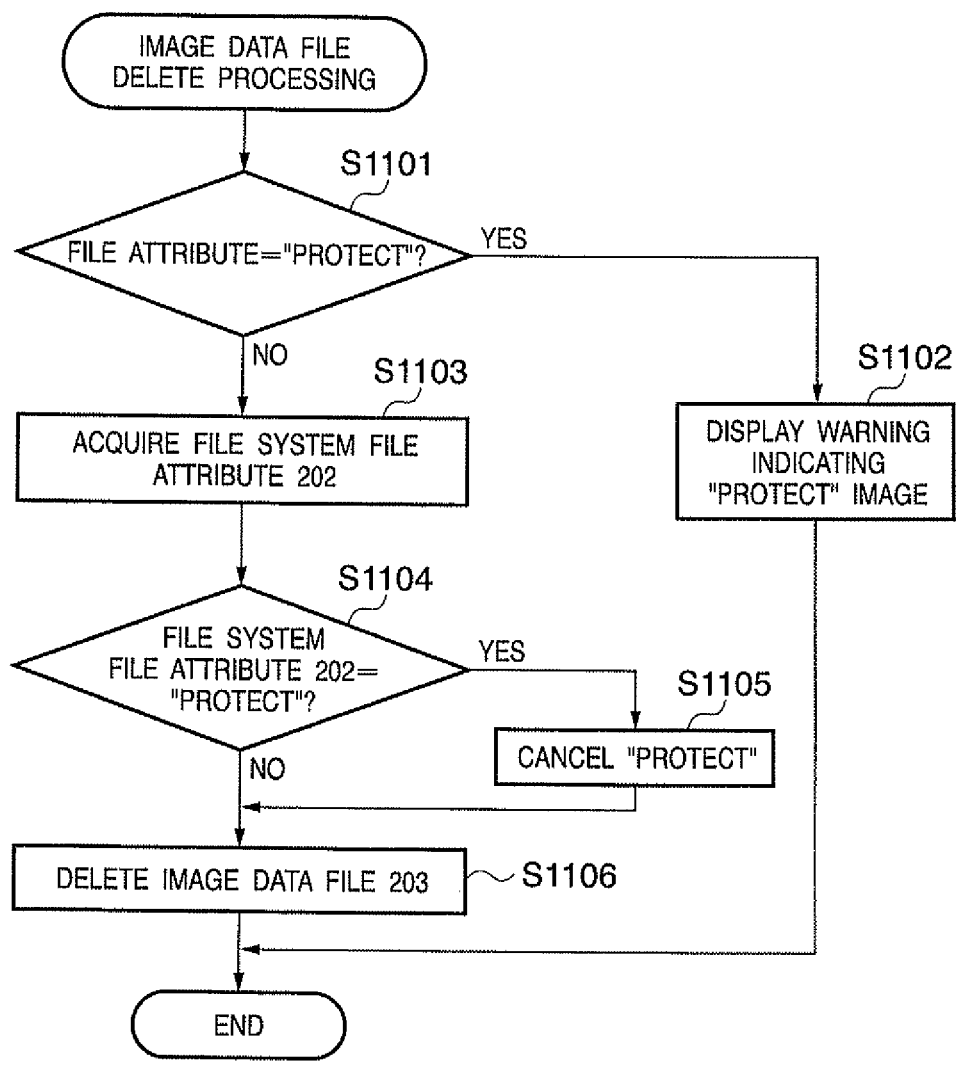
FIG. 11 is a flowchart for explaining an image data file delete processing sequence according to the first embodiment of the present invention.

The image data file delete processing which is executed in step S603 in FIG. 6 and deletes the image data file from the storage medium 101 will be described below with reference to the flowchart of FIG. 11.

In step S1101, the attribute of the image data file 203, which is determined in step S602, is checked. If it is determined that the attribute of the image data file 203 is "protect" ("YES" in step S1101), a warning indicating a "protect" image is displayed on the image display unit 28 by the display controller 26 in step S1102, thus ending the processing.

Figure 15:
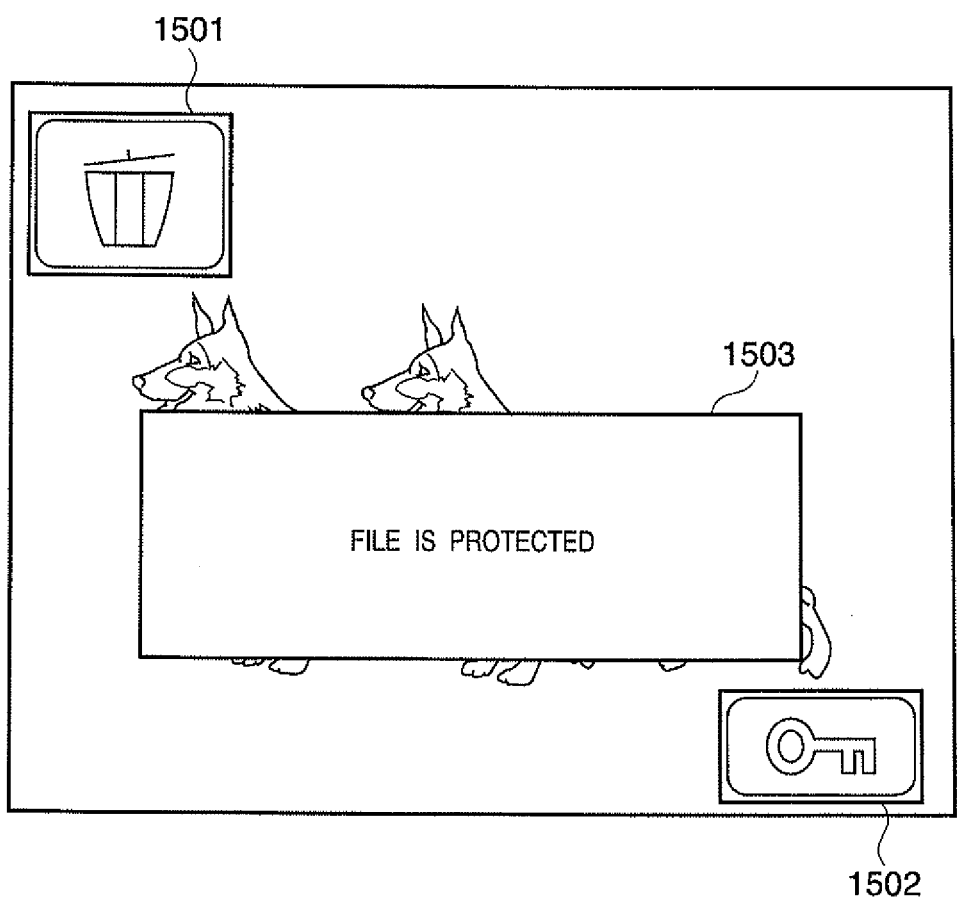
FIG. 15 shows a display example upon delete display according to the first embodiment of the present invention.

FIG. 15 shows an example of display with such warning. Referring to FIG. 15, reference numeral 1501 denotes an icon which indicates that the mode dial switch 60 is set in the delete mode. Reference numeral 1502 denotes an icon which indicates the attribute of the image data file, i.e., indicates that the image data file 203 is a "protect" image. Reference numeral 1503 denotes a warning message indicating that it is impossible to delete the image data file 203.

On the other hand, if it is determined in step S1101 that the attribute of the image data file 203 is not "protect" ("NO" in step S1101), the flow advances to step S1103. In step S1103, the file-system file attribute 202 of the image data file 203 is acquired. In step S1104, the contents of the file-system file attribute 202 are checked. If it is determined that the contents of the file-system file attribute 202 indicate "protect" ("YES" in step S1104), the flow advances to step S1105. In step S1105, "protect" is canceled by altering the file-system file attribute 202, which is managed on the table in the management area of the storage medium 101, to "normal", and the flow then advances to step S1106. The reason why "protect" is canceled is as follows. That is, if the file-system file attribute 202 remains to be "protect", the image data file 203 cannot be deleted from the storage medium 101 in step S1106. On the other hand, if it is determined that the file-system file attribute 202 is not "protect" ("NO" in step S1104), the flow directly advances to step S1106.

In step S1106, the image data file 203 is deleted from the storage medium 101. Since the delete processing of the image data file 203 from the storage medium 101 is known to those who are skilled in the art, a detailed description of its method will be omitted. In brief, the image data file in the memory 30 can be deleted by seeing whether or not a delete execution instruction of the image data file is received using the delete switch of the operation unit 68 in FIG. 1.

Since the image data file delete processing is done in this way, even when the file-system file attribute 202 is "protect", the image data file 203 can be deleted from the storage medium 101 based on the contents of the internal data file attribute 203. As for the image data file 203 which does not include any internal data file attribute 203c, whether or not the image data file can be deleted is determined by seeing if the contents of the file-system file attribute 202 indicate "protect", thus executing the delete processing.

Figure 12:
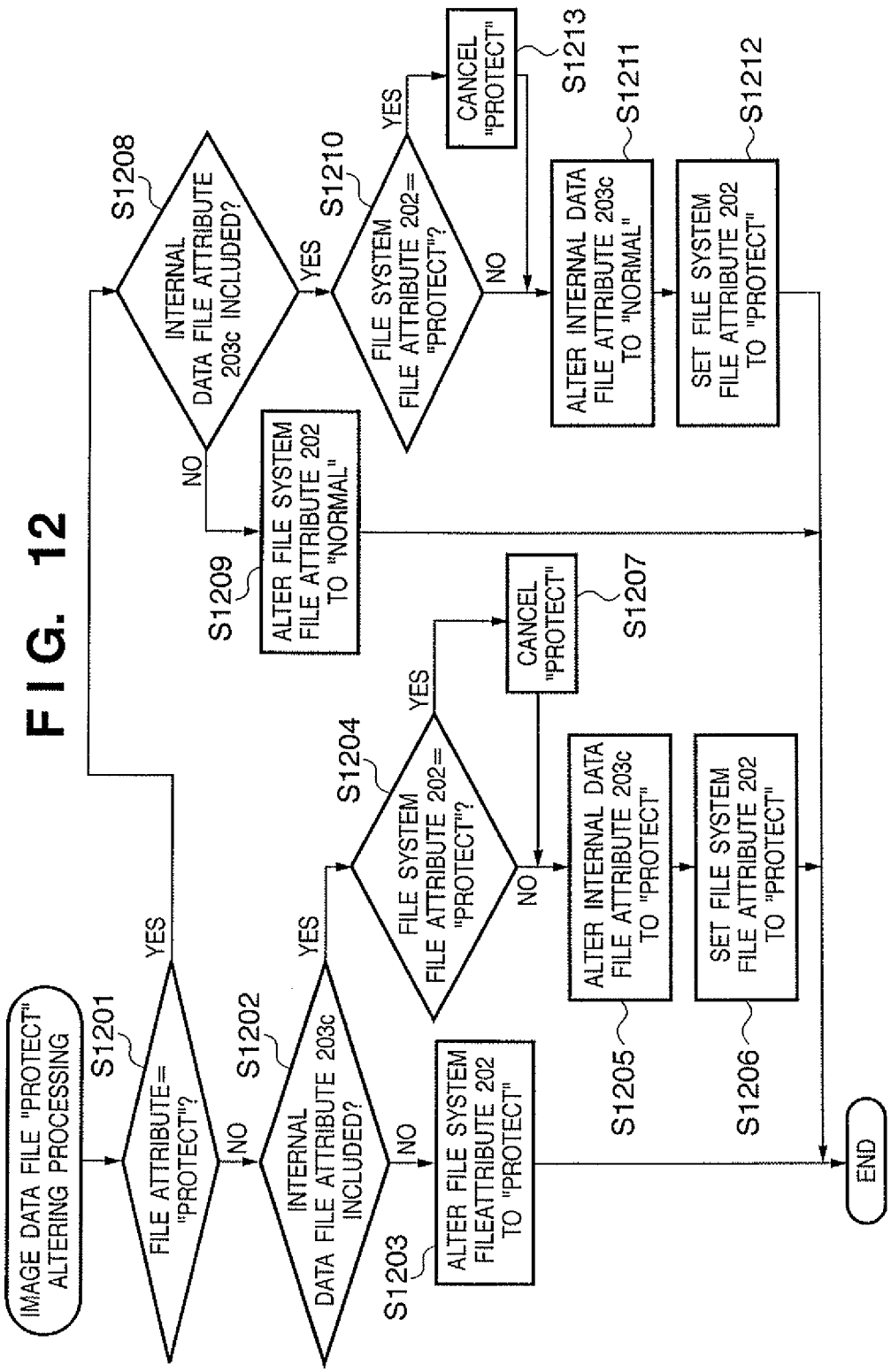
FIG. 12 is a flowchart for explaining an image data file "protect" altering processing sequence according to the first embodiment of the present invention.

The image data file "protect" altering processing in step S703 in FIG. 7 will be described below with reference to the flowchart of FIG. 12.

In step S1201, the attribute of the image data file 203, which is determined in step S702, is checked. If it is determined that the attribute of the image data file 203 is "protect" (YES in step S1201), the flow advances to step S1208 to cancel "protect" of the image data file 203. It is checked in step S1208 if the image data file 203 includes the internal data file attribute 203c.

If it is determined that the image data file 203 does not include any internal data file attribute 203c ("NO" in step S1208), the flow advances to step S1209 to alter the file-system file attribute 202 to "normal", thus ending the processing. On the other hand, if it is determined that the image data file 203 includes the internal data file attribute 203c ("YES" in step S1208), the flow advances to step S1210 to check if the file-system file attribute 202 is "protect". If it is determined that the file-system file attribute 202 is "protect" ("YES" in step S1210), the flow advances to step S1213 to cancel "protect", and the flow advances to step S1211. On the other hand, if it is determined that the file-system file attribute 202 is not "protect" ("NO" in step S1210), the flow directly advances to step S1211.

In step S1211, the internal data file attribute 203c is set to "normal", and the flow advances to step S1212. In step S1212, the file-system file attribute 202 is set to "protect", thus ending the processing.

Figure 16:
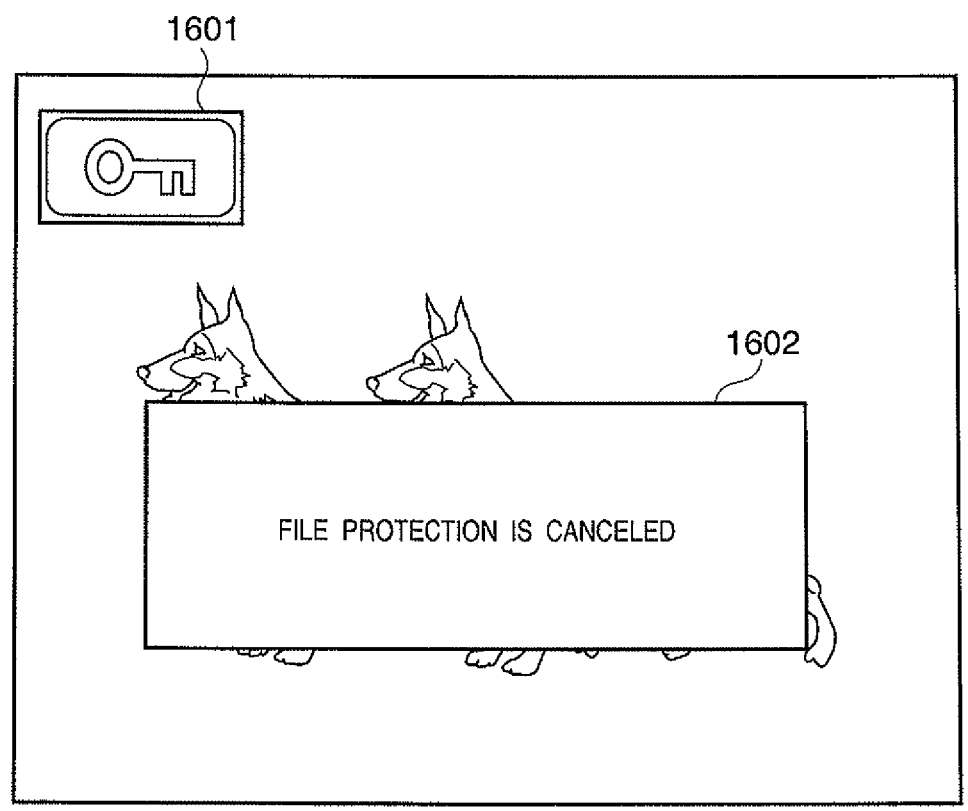
FIG. 16 shows a display example upon protect attribute altering display according to the first embodiment of the present invention.

FIG. 16 shows a display example upon execution of a series of protect attribute cancel operations. Referring to FIG. 16, reference numeral 1601 denotes an icon which indicates that the mode dial switch 60 is set in the file protect attribute altering mode. Reference numeral 1602 denotes a message indicating that "protect" of the image data file is canceled.

Referring back to FIG. 12, if it is determined in step S1201 that the image data file attribute is not "protect" ("NO" in step S1201), the flow advances to step S1202. In step S1202, whether or not the image data file 203 includes the internal data file attribute 203c is checked so as to set "protect" in the image data file 203. If it is determined that the image data file 203 does not include any internal data file attribute 203c ("NO" in step S1202), the flow advances to step S1203 to alter the file-system file attribute 202 to "protect", thus ending the processing.

On the other hand, if it is determined that the image data file 203 includes the internal data file attribute 203c ("YES" in step S1202), it is checked in step S1204 if the file-system file attribute 202 is "protect". If it is determined that the file-system file attribute 202 is "protect" ("YES" in step S1204), the flow advances to step S1207. In step S1207, "protect" is canceled by altering the file-system file attribute 202, which is managed on the table in the management area of the storage medium 101, to "normal", and the flow then advances to step S1205. The reason why "protect" is canceled is as follows. That is, if the file-system file attribute 202 remains to be "protect", the setting of the internal data file attribute 203c of the image data file 203 cannot be altered in step S1205. On the other hand, if it is determined that the file-system file attribute 202 is not "protect" ("NO" in step S1204), the flow advances to step S1205. In step S1205, the internal data file attribute 203c is set to "protect", and the flow advances to step S1206. In step S1206, the file-system file attribute 202 is set to "protect", thus ending the processing.

Figure 17:
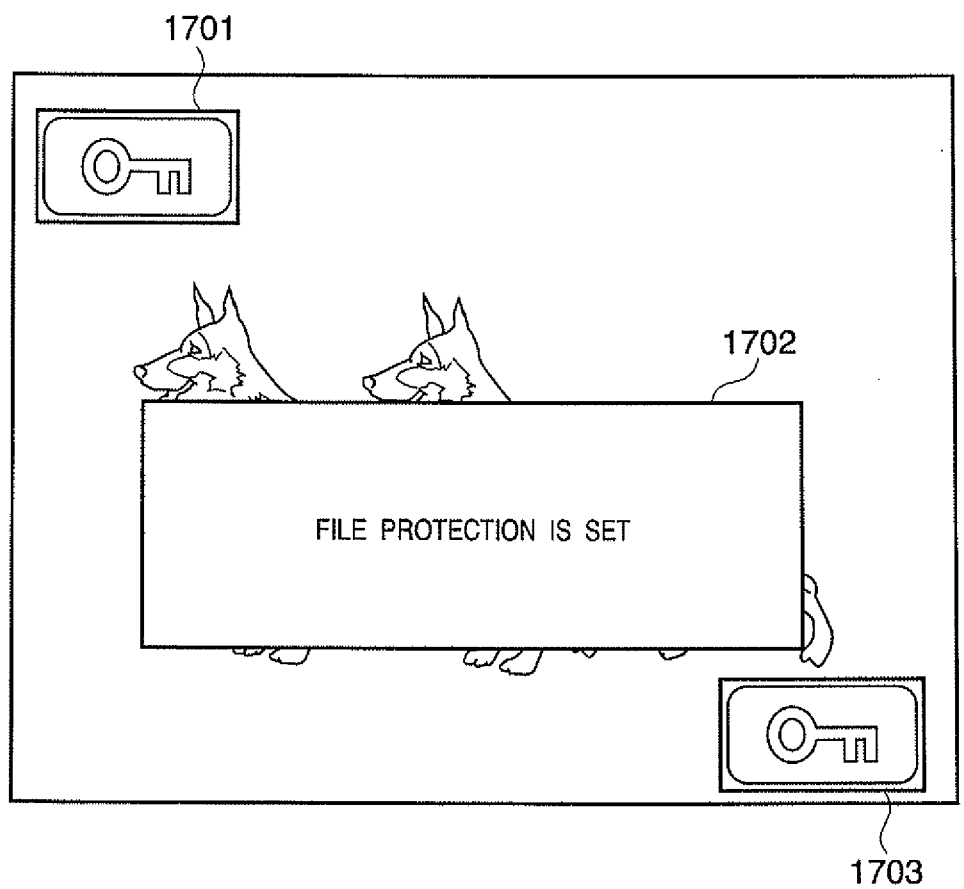
FIG. 17 shows another display example upon protect attribute altering display according to the first embodiment of the present invention.

FIG. 17 shows a display example upon execution of a series of protect attribute cancel operations. Reference numeral 1701 denotes an icon which indicates that the mode dial switch 60 is set in the file protect attribute altering mode. Reference numerals 1702 and 1703 denote a message and icon indicating that the image data file 203 is set to have a protect mode.

By executing the image data file protect attribute altering processing in this way, "protect" of the internal data file attribute 203c can be altered, and the file-system file attribute 202 can always be set to "protect". In this manner, when the image data file 203 is read out from the storage medium 101 by another apparatus (e.g., a personal computer), it is read out as a "protect" file.

As for the image data file 203 which does not include any internal data file attribute 203c, a "protect" image can be set using the file-system file attribute 202. Therefore, in this case as well, when the image data file 203 is read out by another apparatus, it is read out as a "protect" file.

Figure 18:
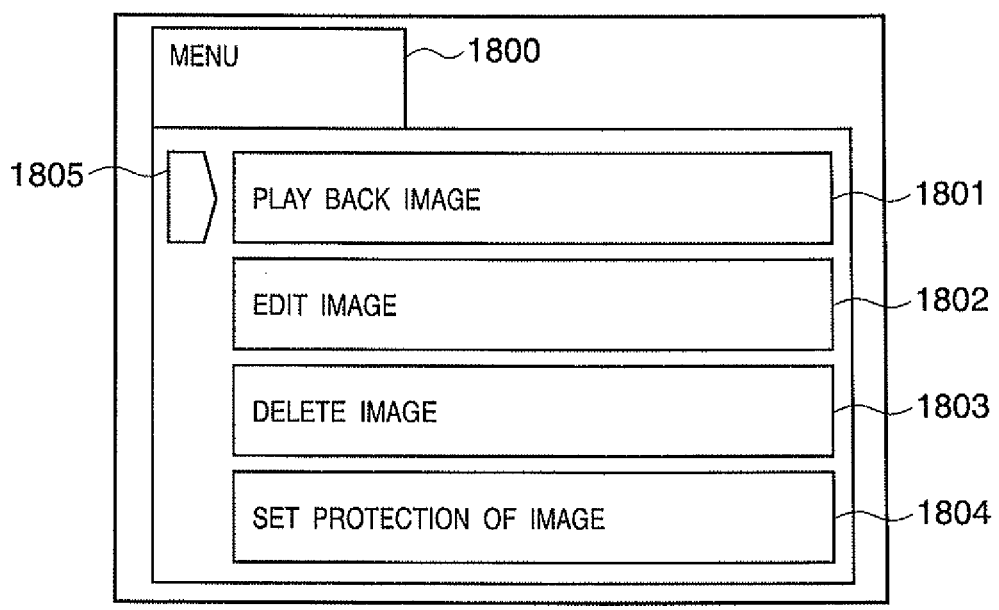
FIG. 18 shows a display example of a menu window according to the first embodiment of the present invention.

FIG. 18 shows an example of a menu window displayed on the image display unit 28 upon operation of the menu switch 66. As has already been described above, various operations and settings of the image data file (e.g., image display, image edit, image deletion, image protect attribute setting altering, and the like) can be done from the mode dial switch 60. Also, from the menu window shown in FIG. 18, the same processing can be done upon operation of the menu switch 66.

Referring to FIG. 18, reference numeral 1800 denotes a title indicating the menu window whose items are displayed as a list. Reference numeral 1801 denotes one of menu items, i.e., "play back image"; 1802, "edit image"; 1803, "delete image"; and 1804, "set protection of image". These items correspond to the modes of the mode dial switch 60. Of course, menu items other than the modes of the mode dial switch 60 may be added to the menu window. Reference numeral 1805 denotes an icon which points out the selected item. This icon 1805 can move within the window in response to the operation of the menu switch 66 to allow selection of an arbitrary item.

In this manner, various operations and settings of the image data file can be easily made from the menu window by operating the menu switch 66 in addition to the mode dial switch 60.

As described above, according to this embodiment, the settings of the internal data file attribute 203c and the file-system file attribute 202 are controlled. With this control, even when the file-system file attribute 202 is "protect", a file can be handled as "normal" file based on the setting contents of the internal data file attribute 203c. Based on this, when the image data file 203 is to be accessed by another apparatus, since the file-system file attribute 202 functions, that file is handled as "protect" file.

In this way, upon making accesses for the purpose of editing, deletion, or the like of the image data file 203, the user will never be forced to perform any troublesome operation, i.e., to manually cancel "protect" of the file-system file attribute 202. At the same time, even when another apparatus accesses the image data file 203, the image data file 203 can be prevented from being destroyed due to misinterpretation of the image data file structure.

In the above embodiment, the storage medium is used as an input-output device. Alternatively, the above embodiment is effective when the input-output device has a communication function to input-output an image data file to/from a remote, large-capacity storage medium.

Second Embodiment

The arrangement of an image processing apparatus according to the second embodiment of the present invention will be described below with reference to FIG. 20. Since a digital camera according to the second embodiment of the present invention has basically the same principal arrangement as that in FIG. 1, a description of the same components will be omitted, and only different components will be described briefly.

Figure 20:
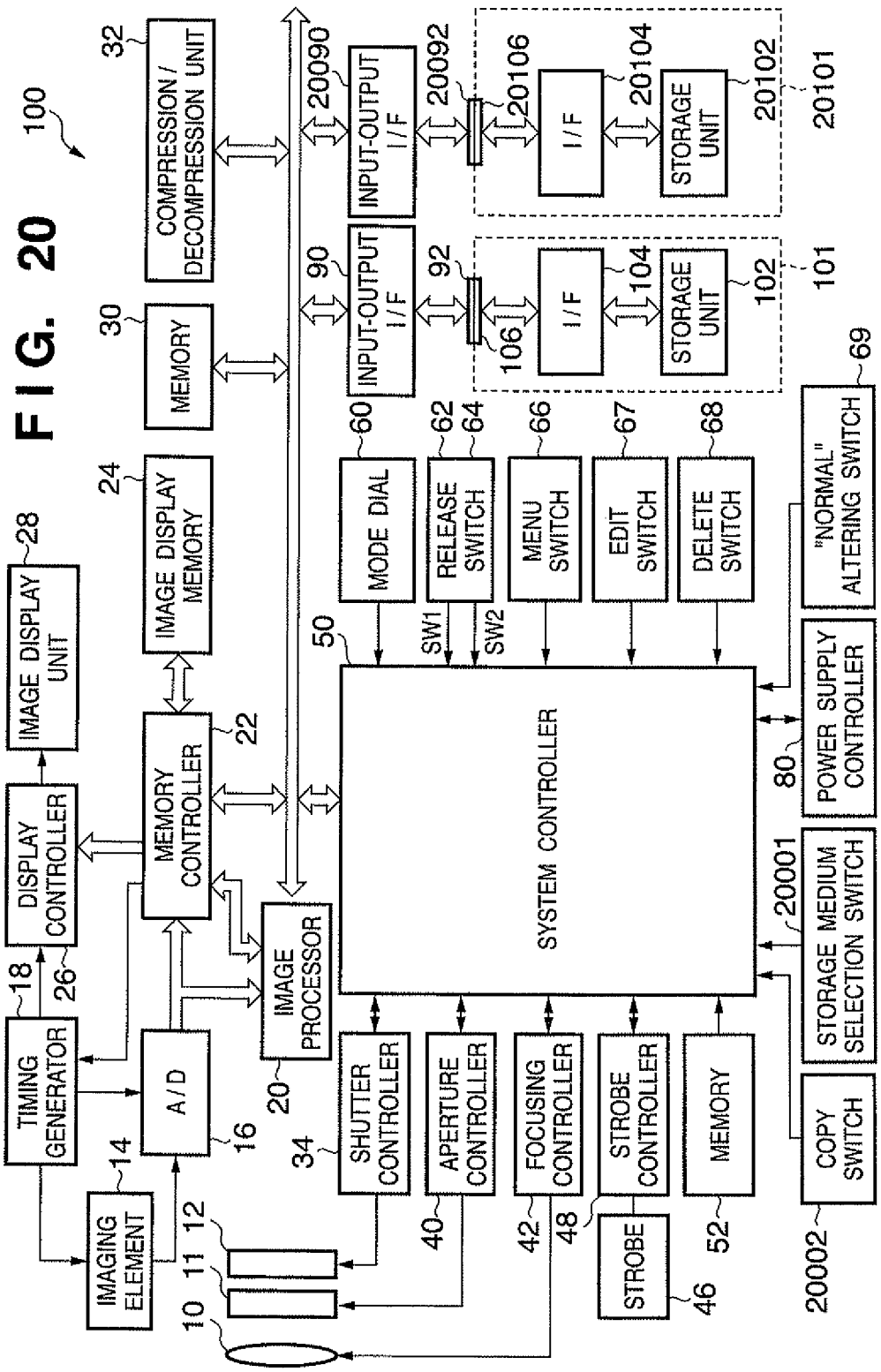
FIG. 20 is a block diagram showing an example of the arrangement of an image processing apparatus according to the second embodiment of the present invention.

Referring to FIG. 20, reference numeral 20090 denotes an interface with a storage medium such as a memory card, hard disk, or the like; and 20092, a connector for connecting a storage medium such as a memory card, hard disk, or the like. The interface 20090 and connector 20092 are different from the arrangement of FIG. 1 since they are added to it. In the description of the first embodiment, "the number of sets of interfaces and connectors that receive the storage media is not particularly limited. Also, combinations of interfaces and connectors of different standards may be used." However, in the following description, since features of the second embodiment are provided by attaching a plurality of storage media, this embodiment has two sets of interfaces and connectors that receive the storage media.

As the interface and connector, those complying with the standards of a PCMCIA card, CompactFlash® card, and the like may be used as in the first embodiment. In this case, by connecting various communication cards to the interface 20090 and connector 20092, image data and associated management information can be exchanged with another computer or a peripheral device such as a printer or the like. The communication cards include a LAN card, modem card, USB card, IEEE1394 card, P1284 card, SCSI card, PHS, and the like.

Reference numeral 20101 denotes a storage medium such as a memory card, hard disk, or the like. The storage medium 20101 comprises a storage unit 20102 including a semiconductor memory, magnetic disk, or the like, an interface 20104 with the image processing apparatus 100, and a connector 20106 for connecting the image processing apparatus 100.

A program for storing the generated image file data in the storage medium, a program for reading out an image file data from the storage medium, and the like, which are stored in the memory 52, are programmed to be able to interpret a plurality of different file systems. This switching and selection are held as a file system (FS) selection flag for respective storage media in the memory 30 which is used as a work area by the system controller 50.

Furthermore, reference numeral 20001 denotes a storage medium selection switch which is different from the arrangement of FIG. 1 since it is added to it. The storage medium selection switch 20001 includes a combination of a set key, arrow keys, and the like (none of them are shown), and allows the user to select a storage destination of shot image data and a storage medium where image data to be played back is stored. This switching and selection are held as a "storage flag" and "playback selection flag" for respective storage media in the memory 30 which is used as a work area by the system controller 50.

Furthermore, reference numeral 20002 denotes a copy switch which is different from the arrangement of FIG. 1 since it is added to it. The copy switch 20002 includes a combination of a set key, arrow keys, and the like (none of them are shown), and allows the user to copy image data from the storage medium 101 to the storage medium 20101 or vice versa via display on the image display unit 28. The copy processing itself can be implemented by reading out image data in the storage medium as a copy source onto the memory 30, displaying it on the image display unit 28, and writing that image data in the storage medium as a copy destination by a combination of the set key, arrow keys, and the like.

The relationship between the file structures and file systems upon storing image data, which is generated by the image shooting processing and is stored in the memory 30, in the storage media 101 and 20101 as an image data file will be described below with reference to FIGS. 21A and 21B.

In this embodiment, an image data file 2103 is stored in the storage medium 101 under the management of FILESYSTEM A (2101). This FILESYSTEM A (2101) manages write (storage) and read accesses of the image data file 2103 to and from the storage medium 101. FILESYSTEM A (2101) is implemented by the system controller 50 by acquiring and executing a program stored in the memory 52. Also, determination as to whether or not the mounted storage medium 101 supports FILESYSTEM A can be implemented by the system controller 50 by acquiring and executing a program stored in the memory 52.

Under the management of FILESYSTEM A (2101), the file attribute of the image data file 2103 is managed on a table assured on a management area of the storage medium 101. In the following description of this embodiment, this file attribute will be referred to as a FILESYSTEM file attribute 2102.

On the other hand, since this embodiment has two sets of interfaces and connectors which receive the storage media and can interpret a plurality of file systems, the image data file 2103 can also be stored in the storage medium 20101 under the management of filesystem B (2104). This filesystem B (2104) manages write (storage) and read accesses of the image data file 2103 to and from the storage medium 20101. Filesystem B (2104) is implemented by the system controller 50 by acquiring and executing a program stored in the memory 52. Also, determination as to whether or not the mounted storage medium 20101 supports filesystem B can be implemented by the system controller 50 by acquiring and executing a program stored in the memory 52.

Under the management of filesystem B (2104), the file attribute of the image data file 2103 is managed on a table assured on a management area of the storage medium 20101. In the following description of this embodiment, this file attribute will be referred to as a filesystem file attribute 2105.

FILESYSTEM A and filesystem B are different ones, and may be interpreted in different ways. That is, although it is no wonder that these two file systems have similar file attributes, since these file systems are fundamentally different, their file attributes themselves are different. In this embodiment, in order to distinguish file attributes in different file systems, the file attributes of FILESYSTEM A are described in capital letters like "NORMAL", "PROTECT", and "HIDDEN". Also, the file attributes of filesystem B are described in small letters like "normal", "protect", and "hidden".

The configuration of the image data file 2103 stored in the storage medium 101 or 20101 is divided into a header field 2103a and image data field 2103b, and the header field 2103a has a field for storing an internal data file attribute 2103c. In this way, the image data file configuration remains the same even when file systems are different.

This internal data file attribute 2103c includes data which can identify file attributes which are generally used. More specifically, the file attributes include "normal", "archive", "hidden", "protect", "system", "read-out capability", "write-in capability", "execution capability", and the like. The data which can identify these file attributes remain the same irrespective of FILESYSTEM A and filesystem B. Since a description of these attributes are the same as the contents described in association with FIG. 2 in the first embodiment, it will be omitted. Also, since the image data file structure is the same as that in the first embodiment, a description thereof will be omitted.

Figure 21A:
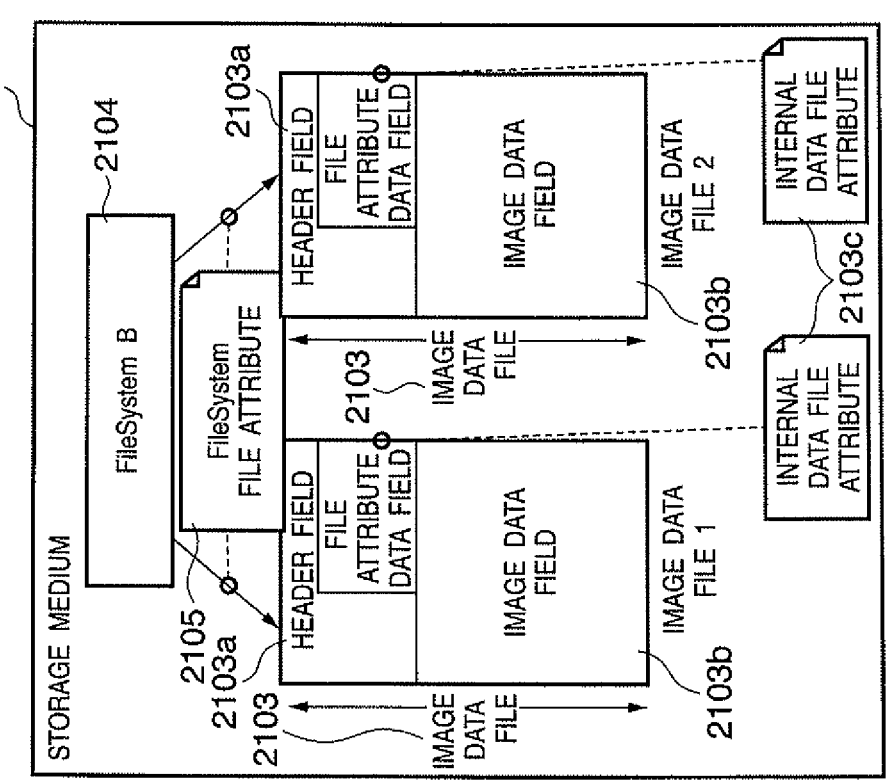
FIGS. 21A and 21B are views for explaining the relationship between image data files and file systems according to the second embodiment of the present invention.
Figure 21B:
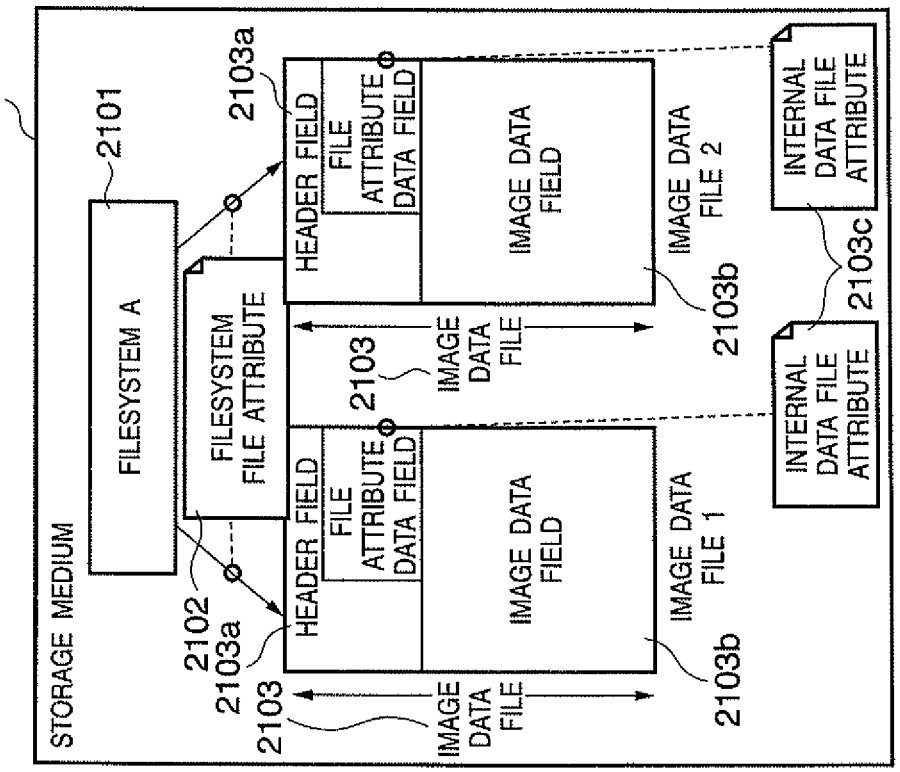

Note that FIGS. 21A and 21B describe cases wherein the storage medium 101 corresponds to FILESYSTEM A, and the storage medium 20101 corresponds to filesystem B. However, the correspondence between the storage media and file systems may be reversed. Hence, the following description will be given under the assumption that respective storage media correspond to both the file systems.

Figure 22:
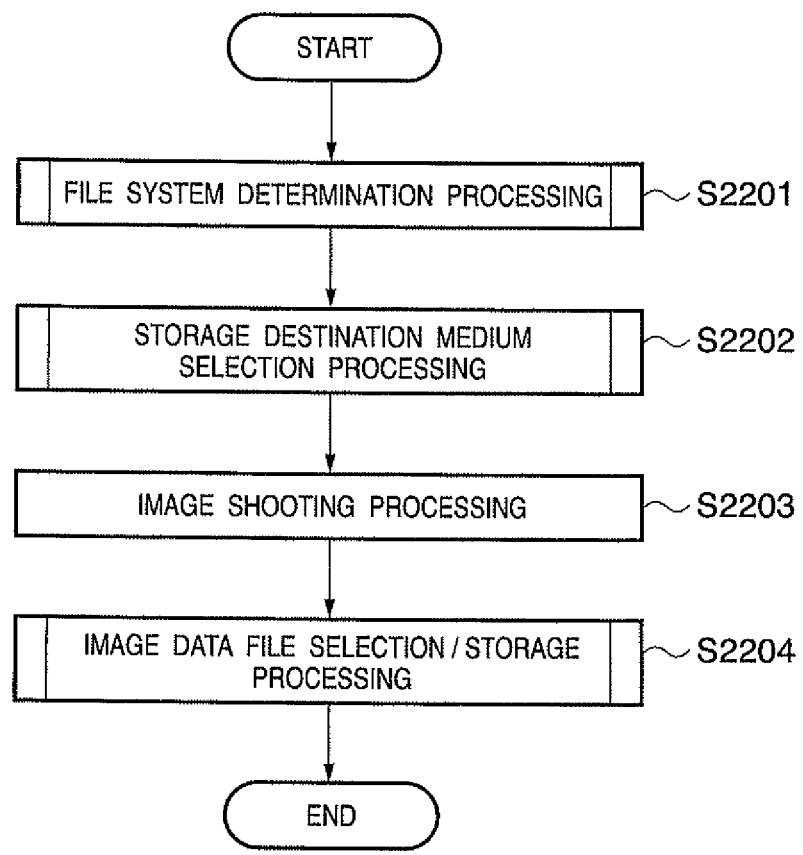
FIG. 22 is a flowchart for explaining an image shooting sequence according to the second embodiment of the present invention.

A sequence from image shooting to storage of an image data file in the storage medium 101 or 20101 will be described below with reference to FIG. 22. FIG. 22 is a flowchart corresponding to an example of this processing.

Referring to FIG. 22, in step S2201 file systems which control the storage media 101 and 20101 are determined. Determination of the file systems will be described later with reference to FIG. 24. Next, in step S2202 processing for selecting a storage medium to be used in storage, which is selected by the storage medium selection switch 20001, is executed. Details of this processing will be described later with reference to FIG. 25.

In step S2203, a series of image shooting operations including the AF processing, AE processing, and exposure processing are executed in response to the operations of the switches SW1 (62) and SW2 (64) which form the release button (not shown), as described using FIG. 1 above. Image data obtained by image shooting is temporarily saved in the memory 30 in the format of the image data file 2103 described using FIGS. 21A and 21B. In step S2204, image data file write processing starts. In this image data file write processing, the image data file is stored in the storage media 101 and 20101. Details of this processing will be described later with reference to FIGS. 26A and 26B. As described above, a series of image shooting operations are executed.

Figure 23:
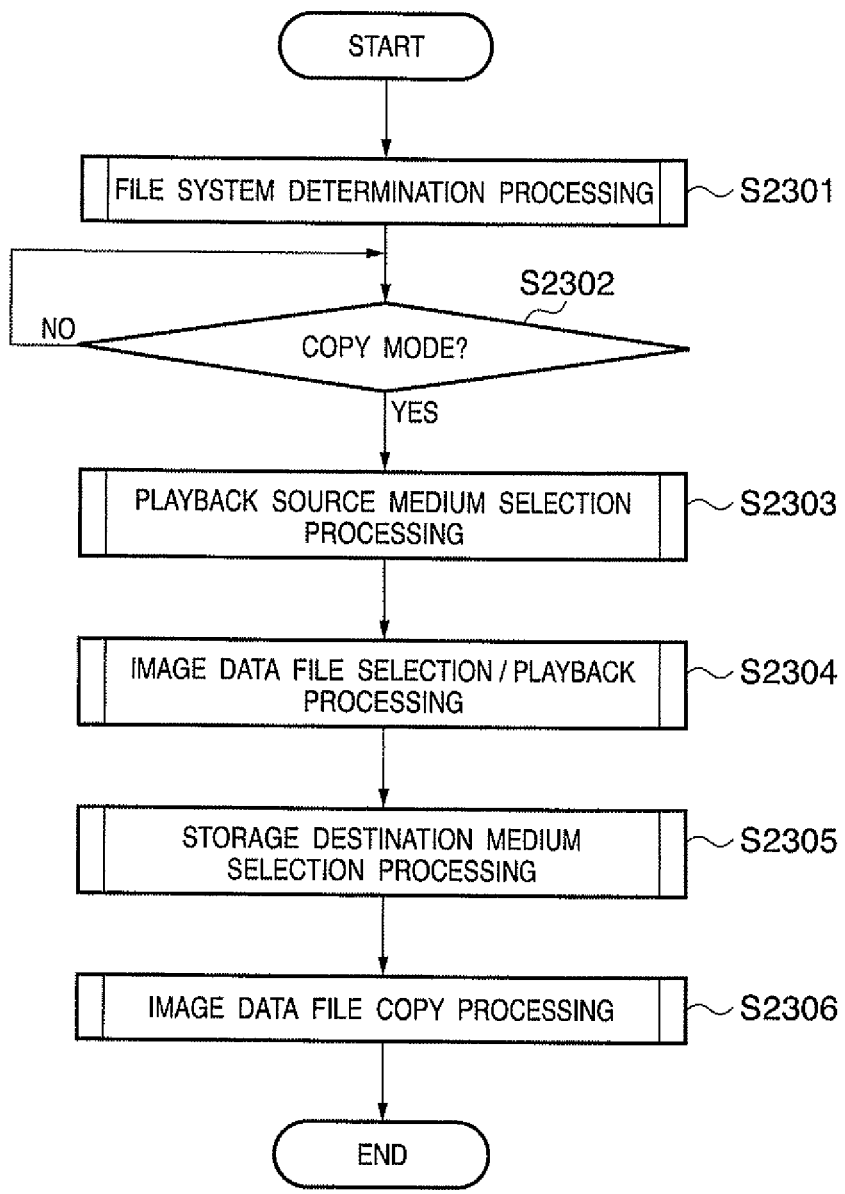
FIG. 23 is a flowchart for explaining a copy sequence according to the second embodiment of the present invention.

A sequence from when an image data file is read out from the storage media 101 and 20101 until the readout image data file is displayed on the image display unit 28 and is coped to the storage media 101 and 20101 will be described below with reference to FIG. 23. FIG. 23 is a flowchart corresponding to an example of this processing.

Referring to FIG. 23, in step S2301 the file systems that control the recording media 101 and 20101 are determined. Determination of the file systems will be described later with reference to FIG. 24. It is then checked in step S2302 if a copy mode (not shown) is set by the copy switch 20002. If it is determined that the copy mode is set ("YES" in step S2302), processing for selecting a storage medium as a playback source in step S2303 starts. In this playback source medium selection processing, a storage medium from which an image data file is to be read is selected and determined. Details of this processing will be described later with reference to FIG. 27.

Next, the flow advances to image data file selection/playback processing in step S2304 to read out an image data file from the storage medium selected in step S2303 and to execute its playback processing. Details of this processing will be described later with reference to FIGS. 28A and 28B. The flow then advances to step S2305 to execute storage destination medium selection processing for selecting a storage medium in which the readout image data file is to be stored (copied). Details of this processing will be described later with reference to FIG. 25. The flow advances to step S2306 to execute image data file copy processing for storing (copying) image data in the storage medium selected in step S2303. Details of this processing will be described later with reference to FIGS. 29A and 29B.

Figure 24:
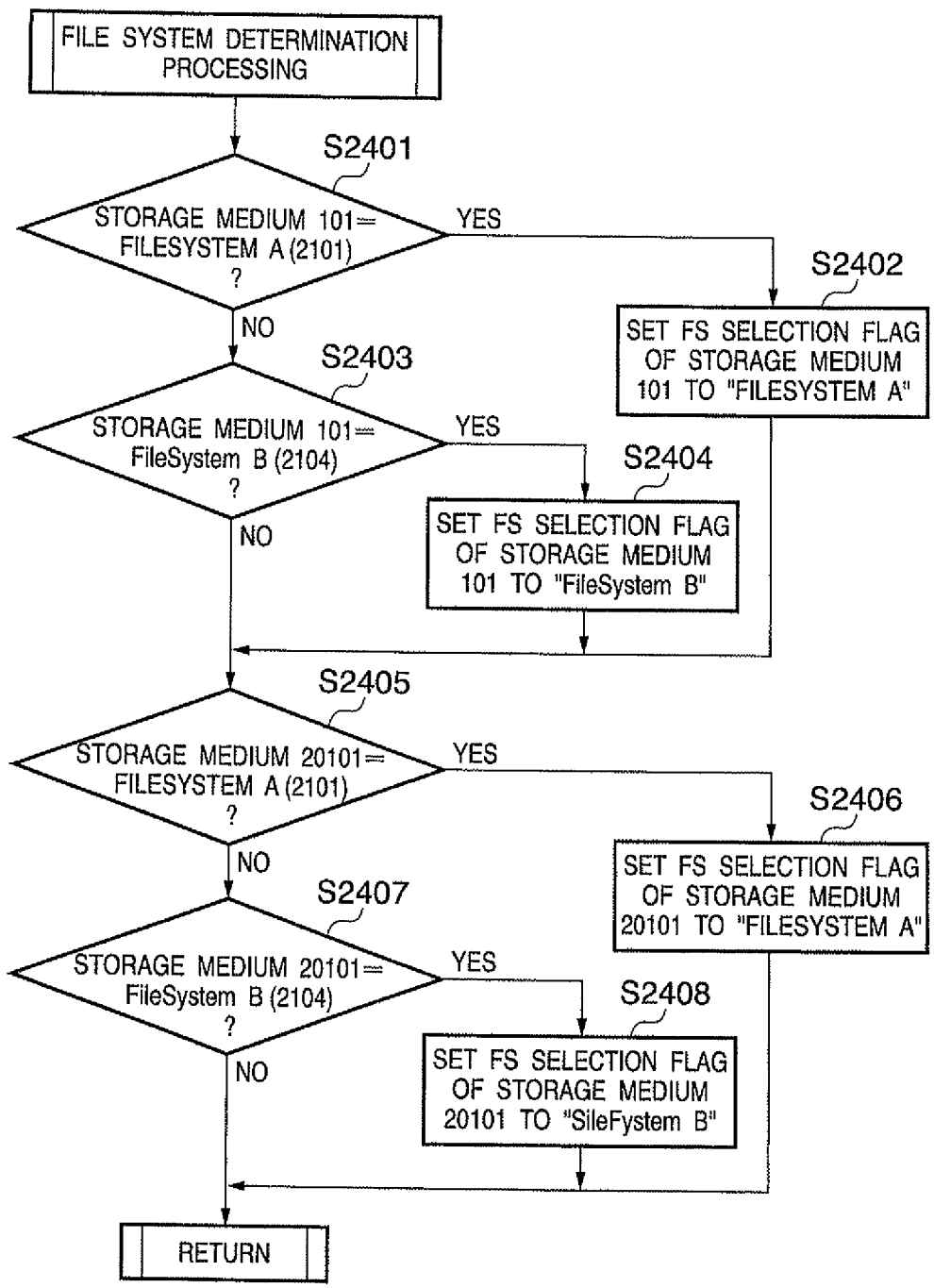
FIG. 24 is a flowchart for explaining a file system determination processing sequence according to the second embodiment of the present invention.

The file system determination processing which is executed in step S2201 in FIG. 22 and step S2301 in FIG. 23 and determines the file systems that control the storage media will be described below with reference to the flowchart of FIG. 24.

It is checked in step S2401 if the file system used to control the storage medium 101 is FILESYSTEM A (2101). Since the determination method is known to those who are skilled in the art, a detailed description thereof will be omitted. In brief, determination is made by accessing a given area of the storage unit 102 via the I/F 106. If it is determined that the file system used to control the storage medium 101 is FILESYSTEM A (2101) ("YES" in step S2401), the flow advances to step S2402. In step S2402, a file system selection flag of the storage medium 101 in the memory 30, which is used as a work area of the system controller 50, is set to "FILESYSTEM A", and the flow advances to step S2405.

If it is determined that the file system used to control the storage medium 101 is not FILESYSTEM A (2101), the flow advances to step S2403. It is checked in step S2403 if the file system used to control the storage medium 101 is filesystem B (2104). If it is determined that the file system used to control the storage medium 101 is filesystem B (2104) ("YES" in step S2403), the flow advances to step S2404. In step S2404, a file system selection flag of the storage medium 101 in the memory 30, which is used as a work area of the system controller 50, is set to "filesystem B", and the flow advances to step S2405.

It is checked in step S2405 if the file system used to control the storage medium 20101 is FILESYSTEM A (2101). Since the determination method is known to those who are skilled in the art, a detailed description will be omitted. In brief, determination is made by accessing a given area of the storage unit 20102 via the I/F 20106. If it is determined that the file system used to control the storage medium 20101 is FILESYSTEM A (2101) ("YES" in step S2405), the flow advances to step S2406. In step S2406, a file system selection flag of the storage medium 20101 in the memory 30, which is used as a work area of the system controller 50, is set to "FILESYSTEM A", thus ending the processing.

If it is determined that the file system used to control the storage medium 20101 is not FILESYSTEM A (2101), the flow advances to step S2407. It is checked in step S2407 if the file system used to control the storage medium 20101 is filesystem B (2104). If it is determined that the file system used to control the storage medium 20101 is filesystem B (2104) ("YES" in step S2407), the flow advances to step S2408. In step S2408, a file system selection flag of the storage medium 20101 in the memory 30, which is used as a work area of the system controller 50, is set to "filesystem B", thus ending the processing. In this way, the file systems used to control respective storage media are determined.

Figure 25:
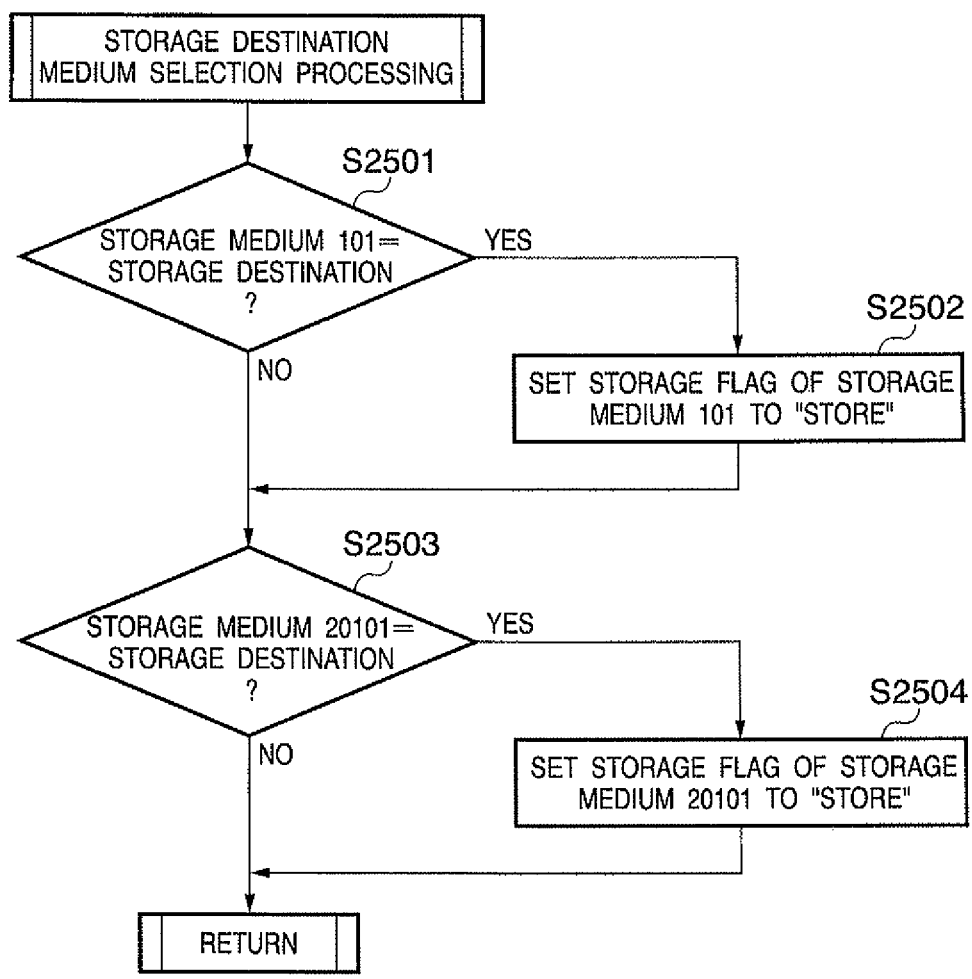
FIG. 25 is a flowchart for explaining a storage destination medium selection processing sequence according to the second embodiment of the present invention.

The storage destination medium selection processing which is executed in step S2202 in FIG. 22 and step S2305 in FIG. 23, and selects and determines a storage medium to be used in storage will be described below with reference to the flowchart of FIG. 25.

It is checked in step S2501 based on the setting of the storage medium selection switch 20001 if the storage medium 101 is set as that of the storage destination. If it is determined that the storage medium 101 is set as that of the storage destination ("YES" in step S2501), a storage flag of the storage medium 101 in the memory 30, which is used as a work area of the system controller 50, is set to "store", and the flow advances to step S2503. On the other hand, if it is determined that the storage medium 101 is not set as that of the storage destination ("NO" in step S2501), the flow advances to step S2503.

It is checked in step S2503 based on the setting of the storage medium selection switch 20001 if the storage medium 20101 is set as that of the storage destination. If it is determined that the storage medium 20101 is set as that of the storage destination ("YES" in step S2503), a storage flag of the storage medium 20101 in the memory 30, which is used as a work area of the system controller 50, is set to "store", and the processing ends. On the other hand, if it is determined that the storage medium 20101 is not set as that of the storage destination ("NO" in step S2503), the processing ends without any processing.

Figure 26A:
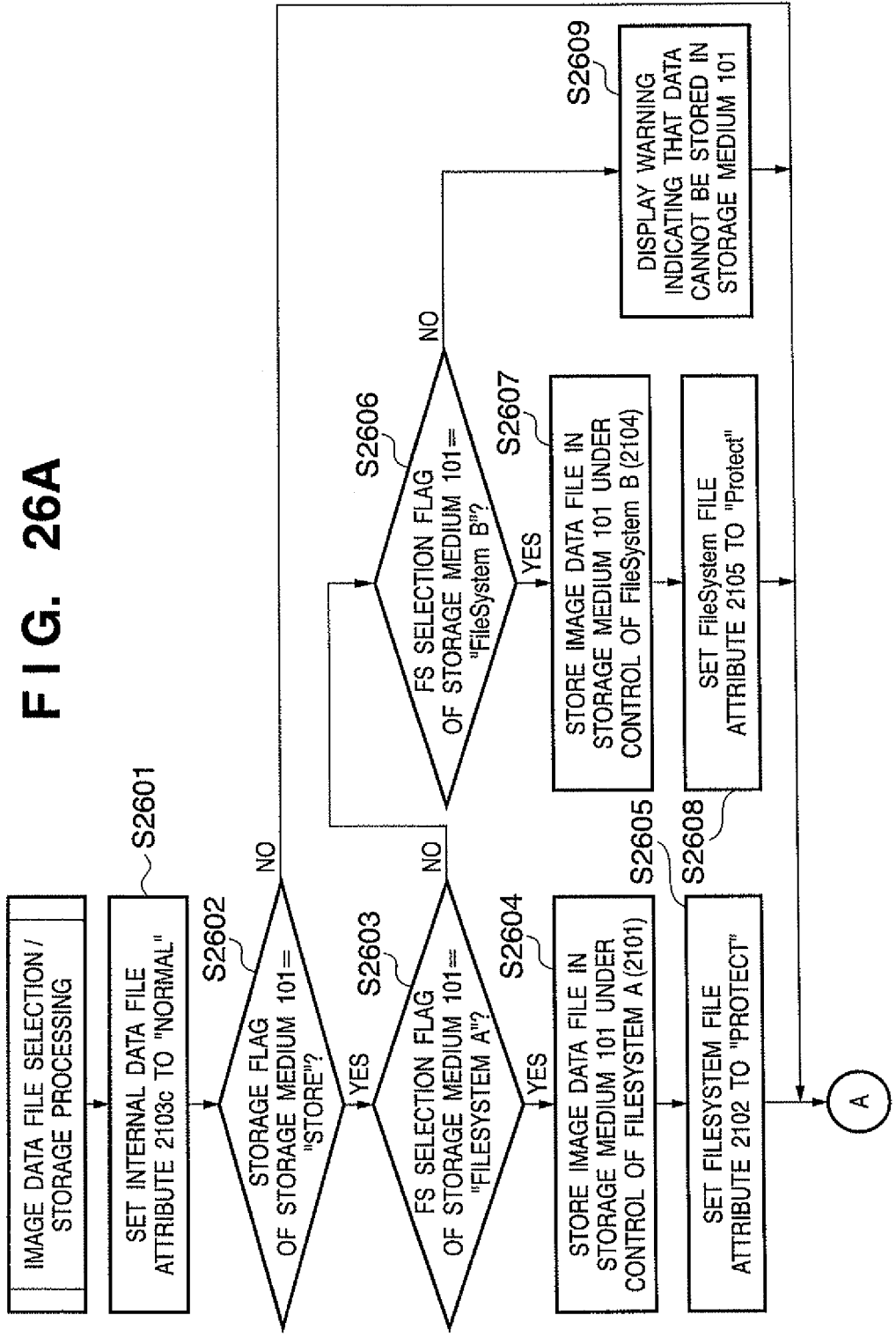
FIGS. 26A and 26B are flowcharts for explaining an image data file selection/storage sequence according to the second embodiment of the present invention.
Figure 26B:
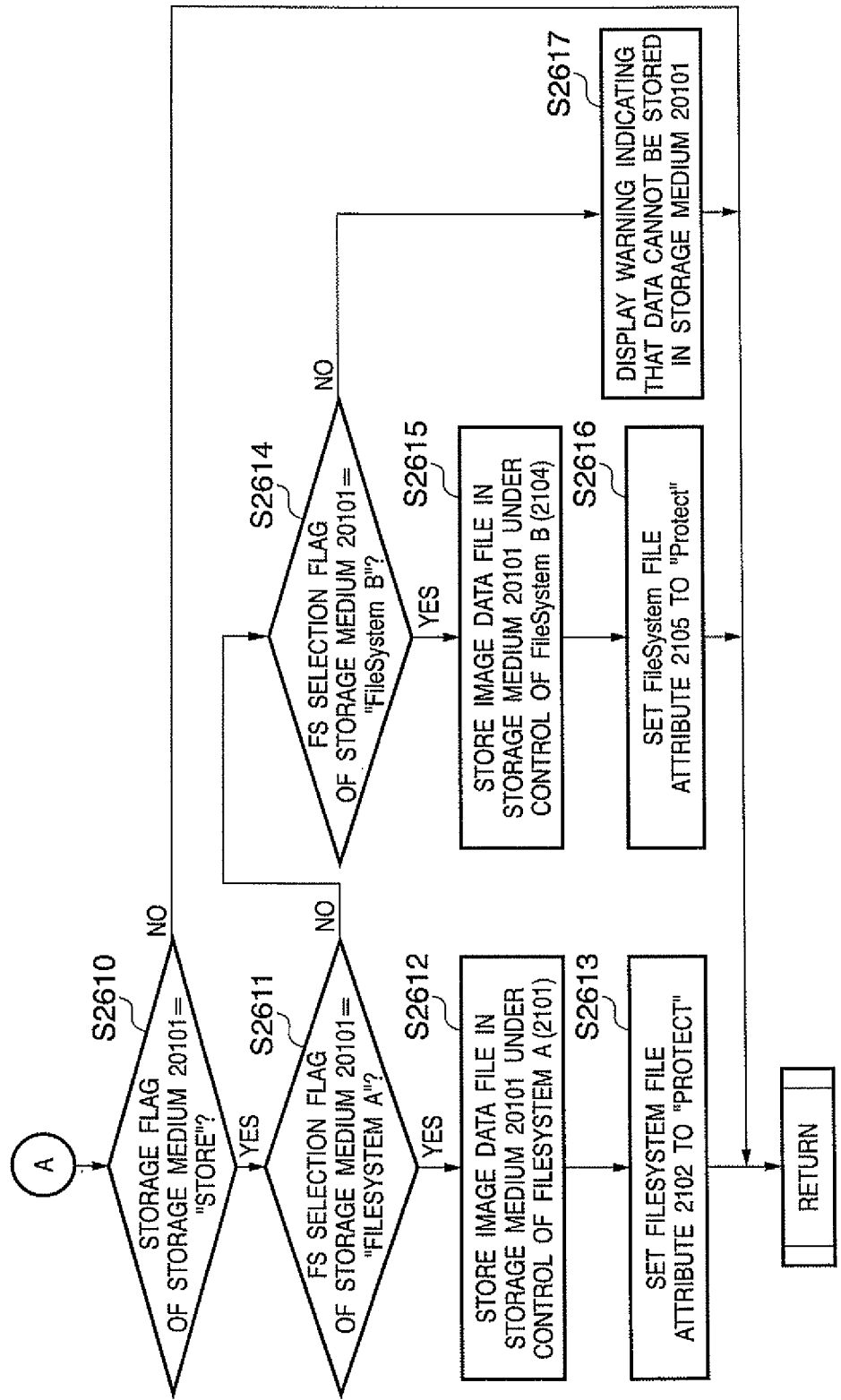

The image data file selection/storage processing which is executed in step S2204 in FIG. 22 and stores the image data file in the storage media 101 and 20101 will be described below with reference to the flowchart of FIGS. 26A and 26B.

In step S2601, the internal data file attribute 2103c in the image data file 2103 temporarily saved in the memory 30 is set to "normal". Note that this internal data file attribute is data to be equally handled independently of the file system used to control the storage medium (i.e., FILESYSTEM A (2101) or filesystem B (2104)).

The flow advances to step S2602 to check if the storage flag of the storage medium 101 in the memory 30, which is used as a work area of the system controller 50, is "store". If it is determined that the storage flag is not "store" ("NO" in step S2602), the flow jumps to step S2610 without storing any data in the storage medium 101.

If it is determined that the storage flag is "store" ("YES" in step S2602), the flow advances to step S2603. It is checked in step S2603 if the file system selection flag of the storage medium 101 in the memory 30, which is used as a work area of the system controller 50, is "FILESYSTEM A". If it is determined that the file system selection flag is "FILESYSTEM A" ("YES" in step S2603), the flow advances to step S2604. In step S2604, the image data file 2103 is stored in the storage medium 101 using the control method of FILESYSTEM A (2101).

In step S2605, the FILESYSTEM file attribute 2102 of the stored image data file 2103 is set to "PROTECT", and the flow advances to step S2610. If it is determined in step S2603 that the file system selection flag is not "FILESYSTEM A" ("NO" in step S2603), the flow advances to step S2606. It is checked in step S2606 if the file system selection flag of the storage medium 101 in the memory 30, which is used as a work area of the system controller 50, is "filesystem B". If it is determined that the file system selection flag is "filesystem B" ("YES" in step S2606), the flow advances to step S2607.

In step S2607, the image data file 2103 is stored in the storage medium 101 using the control method of filesystem B (2104). In step S2608, the filesystem file attribute 2105 of the stored image data file 2103 is set to "protect", and the flow advances to step S2610. If it is determined in step S2606 that the file system selection flag is not "filesystem B" ("NO" in step S2606), the flow advances to step S2609. In step S2609, a warning message indicating that the image data file cannot be stored in the storage medium 101 is displayed, and the flow advances to step S2610.

It is checked in step S2610 if the storage flag of the storage medium 20101 in the memory 30, which is used as a work area of the system controller 50, is "store". If it is determined that the storage flag is not "store" ("NO" in step S2610), the processing ends without storing any data in the storage medium 20101. If it is determined that the storage flag is "store" ("YES" in step S2610), the flow advances to step S2611. It is checked in step S2611 if the file system selection flag of the storage medium 20101 in the memory 30, which is used as a work area of the system controller 50, is "FILESYSTEM A".

If it is determined that the file system selection flag is "FILESYSTEM A" ("YES" in step S2611), the flow advances to step S2612. In step S2612, the image data file 2103 is stored in the storage medium 20101 using the control method of FILESYSTEM A (2101). In step S2613, the FILESYSTEM file attribute 2102 of the stored image data file 2103 is set to "PROTECT", thus ending the processing. If it is determined in step S2611 that the file system selection flag is not "FILESYSTEM A" ("NO" in step S2611), the flow advances to step S2614. It is checked in step S2614 if the file system selection flag of the storage medium 20101 in the memory 30, which is used as a work area of the system controller 50, is "filesystem B".

If it is determined that the file system selection flag is "filesystem B" ("YES" in step S2614), the flow advances to step S2615. In step S2615, the image data file 2103 is stored in the storage medium 20101 using the control method of filesystem B (2104). In step S2616, the filesystem file attribute 2105 of the stored image data file 2103 is set to "protect", thus ending the processing. If it is determined in step S2614 that the file system selection flag is not "filesystem B" ("NO" in step S2614), the flow advances to step S2617. In step S2617, a warning message indicating that the image data file cannot be stored in the storage medium 20101 is displayed, and the processing ends.

In this manner, even when the apparatus has two sets of interfaces and connectors that receive the storage media, and uses different file systems used to control the storage media, when an image data file is to be stored in the storage medium 101 or 20101, the internal data file attribute 203c is set to "normal" independently of the file system. Furthermore, the FILESYSTEM file attribute 2102 is set to "PROTECT", and the filesystem file attribute 2105 is set to "protect". In this manner, when an image data file is read out from the storage medium 101 by a program from, e.g., a personal computer, it is read out as a "protect" file since the FILESYSTEM file attribute 2102 functions. Hence, since the program on the personal computer cannot apply any edit processing or the like to the image data file 2103, file destruction due to misinterpretation of the image data file structure can be prevented.

Likewise, when an image data file is read out from the storage medium 20101 by a program from, e.g., a personal computer, it is read out as a "protect" file since the filesystem file attribute 2105 functions. Hence, since the program on the personal computer cannot apply any edit processing or the like to the image data file 2103, file destruction due to misinterpretation of the image data file structure can be prevented.

That is, even when the storage media 101 and 20101 are controlled by different file systems, the internal data file attribute is equally handled (data), and the FILESYSTEM or filesystem file attribute can be stored as a file attribute corresponding to each file system.

Note that file destruction due to misinterpretation of the image data file structure occurs when the image data file includes an area which cannot be interpreted by the program on the personal computer. More specifically, when access is made while that area remains uninterpreted, the file structure is destroyed.

Figure 27:
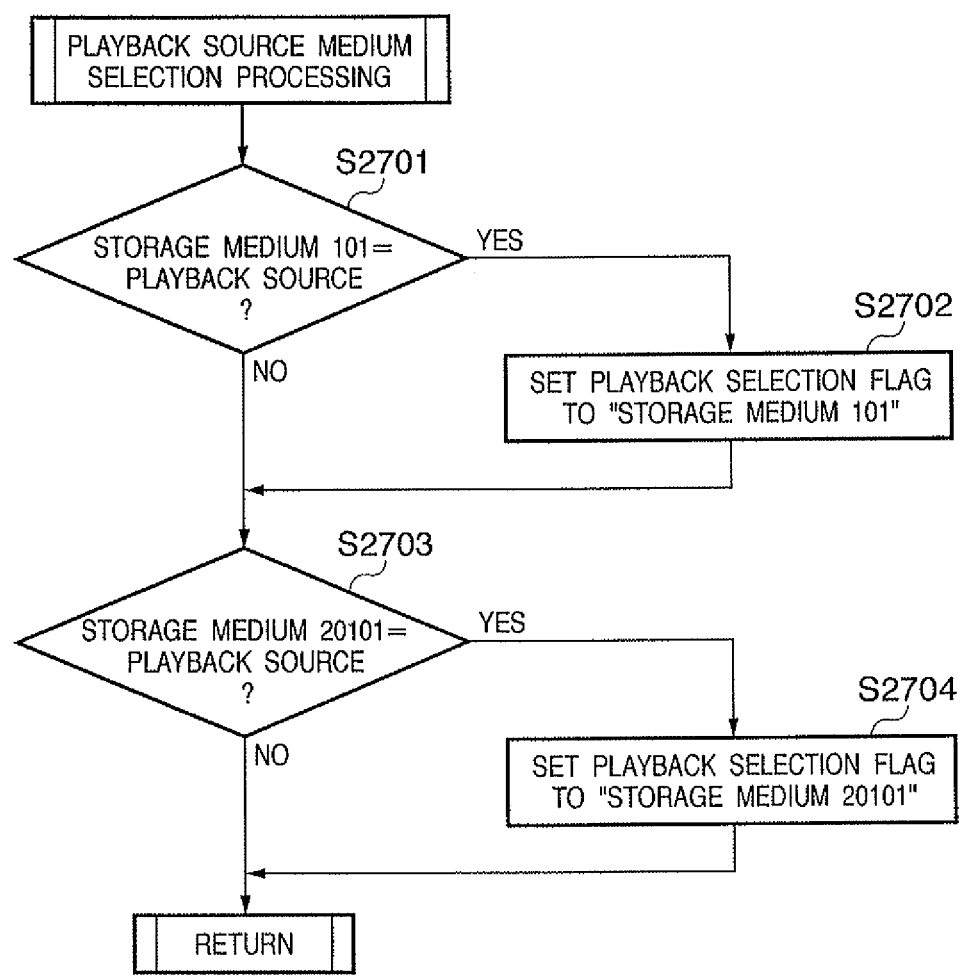
FIG. 27 is a flowchart for explaining a playback source medium selection processing sequence according to the second embodiment of the present invention.

The playback source medium selection processing which is executed in step S2303 in FIG. 23, and selects and determines a storage medium from which an image data file is to be read out will be described below with reference to the flowchart of FIG. 27.

It is checked in step S2701 based on the setting of the storage medium selection switch 20001 if the storage medium 101 is set as that of the playback source. If it is determined that the storage medium 101 is set as that of the playback source ("YES" in step S2701), a playback selection flag of the storage medium 101 in the memory 30, which is used as a work area of the system controller 50, is set to "storage medium 101", and the flow advances to step S2703. On the other hand, if it is determined that the storage medium 101 is not set as that of the playback source ("NO" in step S2701), the flow advances to step S2703.

It is checked in step S2703 based on the setting of the storage medium selection switch 20001 if the storage medium 20101 is set as that of the playback source. If it is determined that the storage medium 20101 is set as that of the playback source ("YES" in step S2703), a playback selection flag of the storage medium 20101 in the memory 30, which is used as a work area of the system controller 50, is set to "storage medium 20101", and the processing ends. On the other hand, if it is determined that the storage medium 20101 is not set as that of the playback source ("NO" in step S2703), the processing ends without any processing.

In this embodiment, since the setting method of a storage medium as the playback source by the storage medium selection switch 2001 is exclusively done, either one of the storage media is set as the playback selection flag.

Figure 28A:
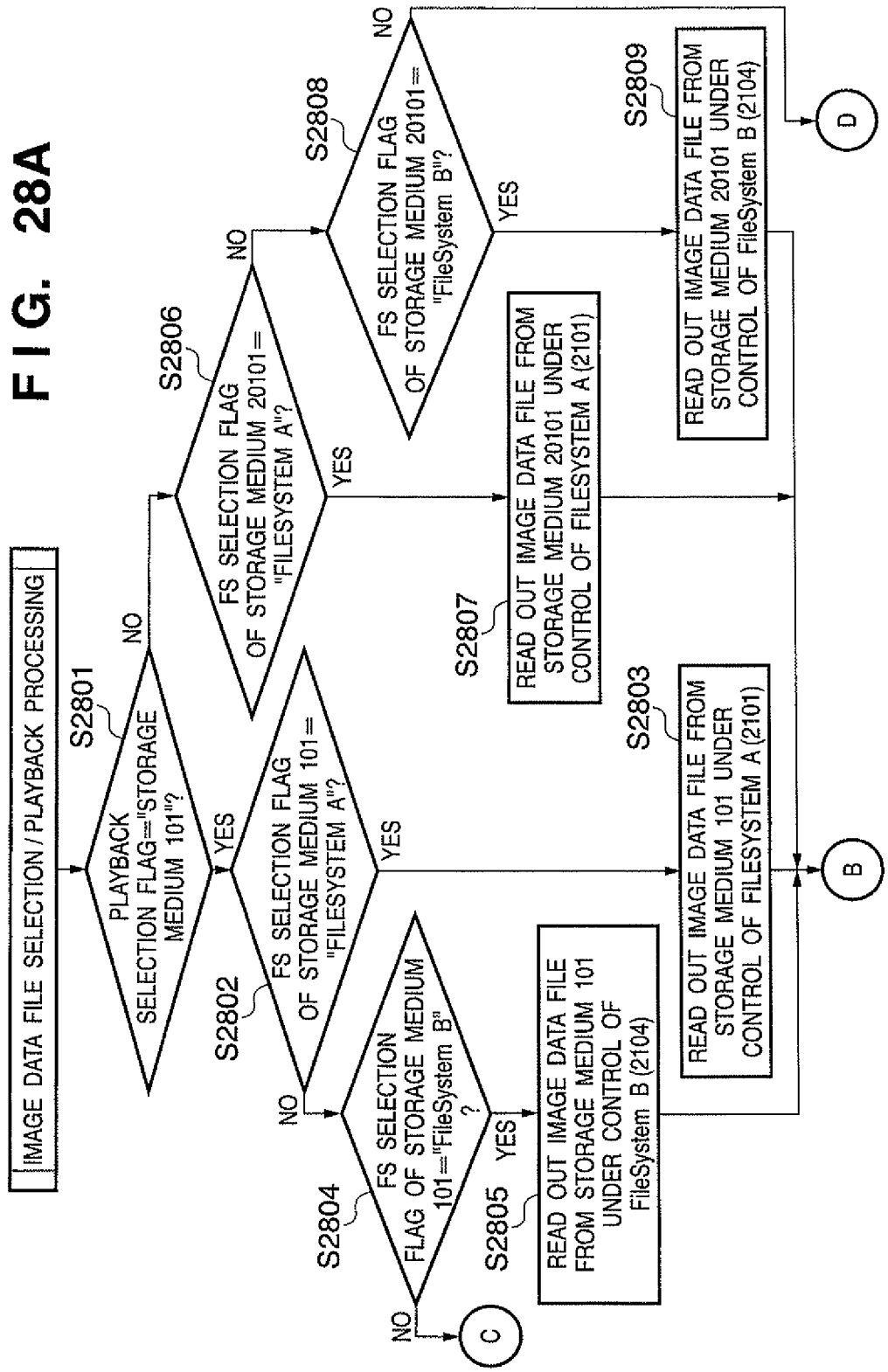
FIGS. 28A and 28B are flowcharts for explaining an image data file selection/playback processing sequence according to the second embodiment of the present invention.
Figure 28B:
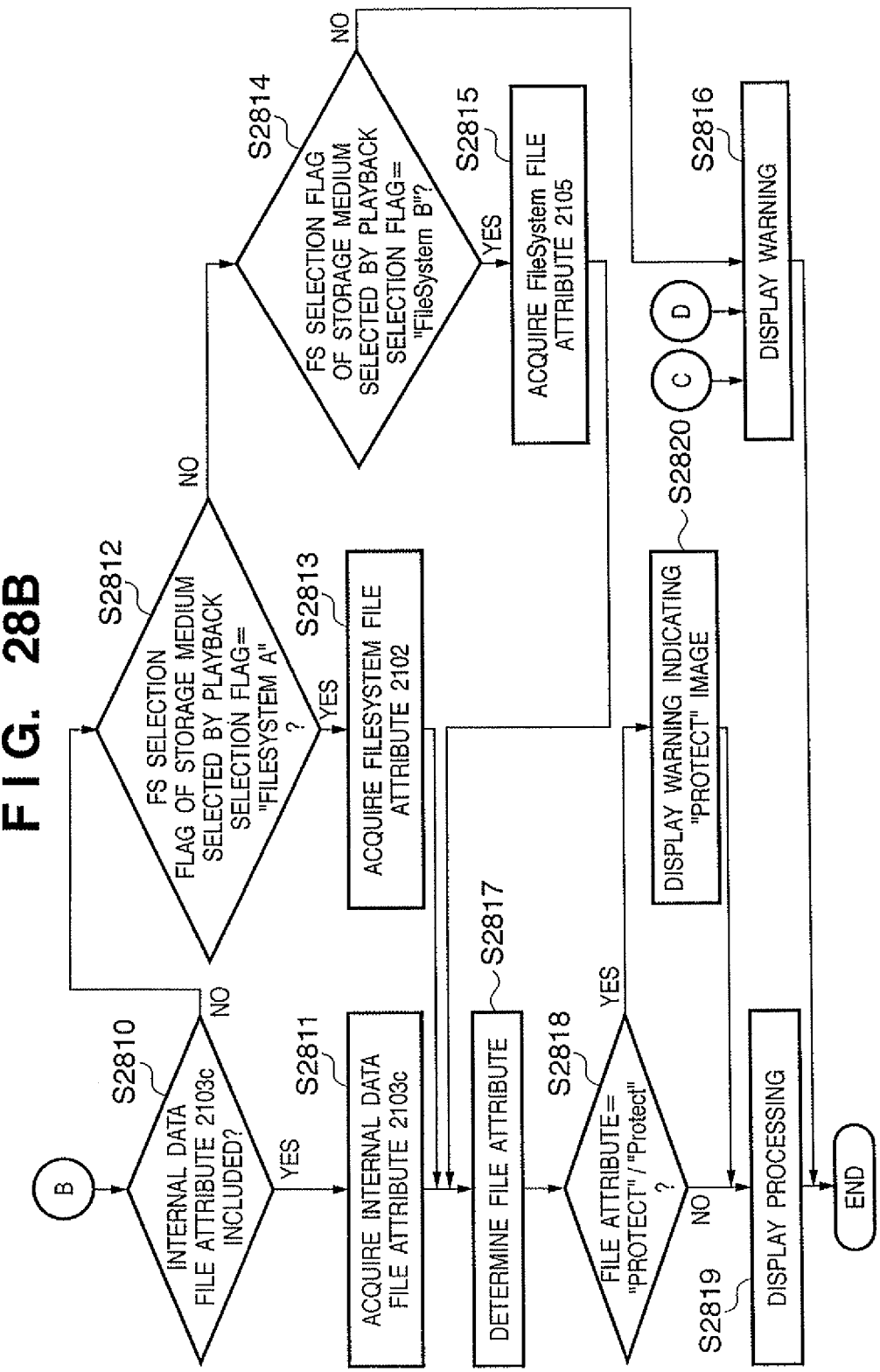

The image data file selection/playback processing which is executed in step S2304 in FIG. 23, and reads out and plays back an image data file from the selected storage medium will be described below with reference to the flowchart of FIGS. 28A and 28B.

It is checked in step S2801 if the playback selection flag in the memory 30, which is used as a work area of the system controller 50, is "storage medium 101". If it is determined that the playback selection flag is "storage medium 101" ("YES" in step S2801), the flow advances to step S2802. It is checked in step S2802 if the file system selection flag of the storage medium 101 in the memory 30, which is used as a work area of the system controller 50, is "FILESYSTEM A". If it is determined that the file system selection flag is "FILESYSTEM A" ("YES" in step S2802), the flow advances to step S2803. In step S2803, the image data file 2103 is read out from the storage medium 101 under the control of FILESYSTEM A (2101), and the flow advances to step S2810.

If it is determined in step S2802 that the file system selection flag is not "FILESYSTEM A" ("NO" in step S2802), the flow advances to step S2804. It is checked in step S2804 if the file system selection flag of the storage medium 101 in the memory 30, which is used as a work area of the system controller 50, is "filesystem B". If it is determined that the file system selection flag is not "filesystem B" ("NO" in step S2804), the flow advances to step S2816 to display a warning message indicating that the image data file cannot be played back, thus ending the processing. If it is determined that the file system selection flag is "filesystem B" ("YES" in step S2804), the flow advances to step S2805. In step S2805, the image data file 2103 is read out from the storage medium 101 under the control of filesystem B (2104), and the flow advances to step S2810.

On the other hand, if it is determined in step S2801 that the playback selection flag is not "storage medium 101" ("NO" in step S2801), the flow advances to step S2806. It is checked in step S2806 if the file system selection flag of the storage medium 20101 in the memory 30, which is used as a work area of the system controller 50, is "FILESYSTEM A". If it is determined that the file system selection flag is "FILESYSTEM A" ("YES" in step S2806), the flow advances to step S2807. In step S2807, the image data file 2103 is read out from the storage medium 20101 under the control of FILESYSTEM A (2101), and the flow advances to step S2810.

If it is determined in step S2806 that the file system selection flag is not "FILESYSTEM A" ("NO" in step S2806), the flow advances to step S2808. It is checked in step S2808 if the file system selection flag of the storage medium 20101 in the memory 30, which is used as a work area of the system controller 50, is "filesystem B". If it is determined that the file system selection flag is not "filesystem B" ("NO" in step S2808), the flow advances to step S2816 to display a warning message indicating that the image data file cannot be played back, thus ending the processing. If it is determined that the file system selection flag is "filesystem B" ("YES" in step S2808), the flow advances to step S2809. In step S2809, the image data file 2103 is read out from the storage medium 20101 under the control of filesystem B (2104), and the flow advances to step S2810.

It is checked in step S2810 if the image data file 2103 read out onto the memory 30 includes the internal data file attribute 2103$c$. If it is determined that the image data file 2103 includes the internal data file attribute 2103$c$ ("YES" in step S2810), the flow advances to step S2811 to acquire the internal data file attribute 2103$c$. On the other hand, if it is determined that the image data file 2103 does not include any internal data file attribute 2103$c$ ("NO" in step S2810), the flow advances to step S2812. It is checked in step S2812 if the file system selection flag of the storage medium selected by the playback selection flag is "FILESYSTEM A".

If it is determined that the file system selection flag is "FILESYSTEM A" ("YES" in step S2812), the flow advances to step S2813 to acquire the FILESYSTEM file attribute 2102. If it is determined that the file system selection flag is not "FILESYSTEM A" ("NO" in step S2812), the flow advances to step S2814. It is checked in step S2814 if the file system selection flag of the storage medium selected by the playback selection flag is "filesystem B". If it is determined that the file system selection flag is "filesystem B" ("YES" in step S2814), the flow advances to step S2815 to acquire the filesystem file attribute 2105. If it is determined that the file system selection flag is not "filesystem B" ("NO" in step S2814), the flow advances to step S2816 to display a warning message indicating that the file attribute cannot be acquired, thus ending the processing.

In step S2817, the file attribute acquired in step S2811, S2813, or S2815 is temporarily stored in the memory 30 as the attribute of the image data file 2103. In step S2818, the contents of the image data file attribute temporarily stored in the memory 30 in step S2817 are checked. If it is determined that the image data file attribute is neither "PROTECT" nor "protect" ("NO" in step S2818), the flow advances to step S2819 to execute display processing. Since the display processing in this step is known to those who are skilled in the art, a detailed description thereof will be omitted. In brief, processing for displaying the image data file 2103 read out onto the memory 30 on the image display unit 28 by the display controller 26 is executed.

On the other hand, if it is determined that the image data file attribute is "PROTECT" or "protect" ("YES" in step S2818), the flow advances to step S2820. In step S2820, a warning indicating a "protect" image is displayed on the image display unit 28 by the display controller 26. In step S2819, the display processing is executed, thus ending the processing.

The image data file copy processing which is executed in step S2306 in FIG. 23 and stores (copies) image data in the selected storage medium will be described below with reference to the flowchart of FIGS. 29A and 29B.

It is checked in step S2901 if the storage flag of the storage medium 101 in the memory 30, which is used as a work area of the system controller 50, is "store". If it is determined that the storage flag is not "store" ("NO" in step S2901), the flow jumps to step S2909 without storing (copying) any data in the storage medium 101.

If it is determined that the storage flag is "store" ("YES" in step S2901), the flow advances to step S2902. It is checked in step S2902 if the file system selection flag of the storage medium 101 in the memory 30, which is used as a work area of the system controller 50, is "FILESYSTEM A". If it is determined that the file system selection flag is "FILESYSTEM A" ("YES" in step S2902), the flow advances to step S2903. In step S2903, the image data file 2103 read out onto the memory 30 is stored (copied) in the storage medium 101 using the control method of FILESYSTEM A (2101).

At this time, the image data file 2103 to be stored includes the internal data file attribute 2103c. Hence, the file attribute of the internal data file attribute 2103c is inherited and stored independently of whether the image data file 2103 is read out from either the storage medium 101 or 20101 under the control of either "FILESYSTEM A" or "filesystem B" in step S2304 in FIG. 23.

In step S2904, the FILESYSTEM file attribute 2102 of the stored (copied) image data file 2103 is set to "PROTECT", and the flow advances to step S2909. If it is determined in step S2902 that the file system selection flag is not "FILESYSTEM A" ("NO" in step S2902), the flow advances to step S2905. It is checked in step S2905 if the file system selection flag of the storage medium 101 in the memory 30, which is used as a work area of the system controller 50, is "filesystem B".

If it is determined that the file system selection flag is "filesystem B" ("YES" in step S2905), the flow advances to step S2906. In step S2906, the image data file 2103 is stored (copied) in the storage medium 101 using the control method of filesystem B (2104). In step S2907, the filesystem file attribute 2105 of the stored (copied) image data file 2103 is set to "protect", and the flow advances to step S2909. If it is determined in step S2905 that the file system selection flag is not "filesystem B" ("NO" in step S2905), the flow advances to step S2908. In step S2908, a warning message indicating that the image data file cannot be stored (copied) in the storage medium 101 is displayed, and the flow advances to step S2909.

It is checked in step S2909 if the storage flag of the storage medium 20101 in the memory 30, which is used as a work area of the system controller 50, is "store". If it is determined that the storage flag is not "store" ("NO" in step S2909), the processing ends without storing any data in the storage medium 20101. If it is determined that the storage flag is "store" ("YES" in step S2909), the flow advances to step S2910. It is checked in step S2910 if the file system selection flag of the storage medium 20101 in the memory 30, which is used as a work area of the system controller 50, is "FILESYSTEM A".

If it is determined that the file system selection flag is "FILESYSTEM A" ("YES" in step S2910), the flow advances to step S2911. In step S2911, the image data file 2103 is stored (copied) in the storage medium 20101 using the control method of FILESYSTEM A (2101). In step S2912, the FILESYSTEM file attribute 2102 of the stored (copied) image data file 2103 is set to "PROTECT", thus ending the processing.

If it is determined in step S2910 that the file system selection flag is not "FILESYSTEM A" ("NO" in step S2910), the flow advances to step S2913. It is checked in step S2913 if the file system selection flag of the storage medium 20101 in the memory 30, which is used as a work area of the system controller 50, is "filesystem B". If it is determined that the file system selection flag is "filesystem B", the flow advances to step S2914. In step S2914, the image data file 2103 is stored (copied) in the storage medium 20101 using the control method of filesystem B (2104).

At this time, the image data file 2103 to be stored includes the internal data file attribute 2103c. Hence, the file attribute of the internal data file attribute 2103c is inherited and stored independently of whether the image data file 2103 is read out from either the storage medium 101 or 20101 under the control of either "FILESYSTEM A" or "filesystem B" in step S2304 in FIG. 23.

In step S2915, the filesystem file attribute 2105 of the stored (copied) image data file 2103 is set to "protect", thus ending the processing. If it is determined in step S2913 that the file system selection flag is not "filesystem B" ("NO" in step S2913), the flow advances to step S2916. In step S2916, a warning message indicating that the image data file cannot be stored (copied) in the storage medium 20101 is displayed, and the processing ends.

In this manner, since the apparatus has the two sets of interfaces and connectors that receive the storage media, when an image data file is to be copied to the storage medium 101 or 20101 controlled by the different file systems, the internal data file attribute 2103c can be inherited independently of the type of file system.

At this time, the FILESYSTEM file attribute 2102 is set to "PROTECT", and the filesystem file attribute 2105 is set to "protect". In this manner, when an image data file is read out from the storage medium 101 or 20101 by a program from, e.g., a personal computer, it is read out as a "protect" file since the FILESYSTEM or filesystem file attribute functions. Hence, since the program on the personal computer cannot apply any edit processing or the like to the image data file 2103, file destruction due to misinterpretation of the image data file structure can be prevented.

Furthermore, upon playing back an image data file, since the apparatus has the two sets of interfaces and connectors that receive the storage media, even when the FILESYSTEM file attribute 2102 or filesystem file attribute 2105 of the image data file 203 is a PROTECT or protect attribute with respect to the storage medium 101 or 20101 controlled by different file systems, the image data file can be displayed not as a "protect" image based on the contents of the internal data file attribute 2103c. As for the image data file 2103 which does not include any internal data file attribute 2103c, display exploiting the FILESYSTEM or filesystem file attribute 2102 or 2105 can be made.

Note that the FILESYSTEM or filesystem file attribute 2102 or 2105 may be set in accordance with the contents of the internal data file attribute 2103c and the like. Hence, another example of the image data file copy processing which is executed in step S2306 in FIG. 23 and stores (copies) image data in the selected storage medium will be described below with reference to the flowchart of FIGS. 30A and 30B.

Figure 29A:
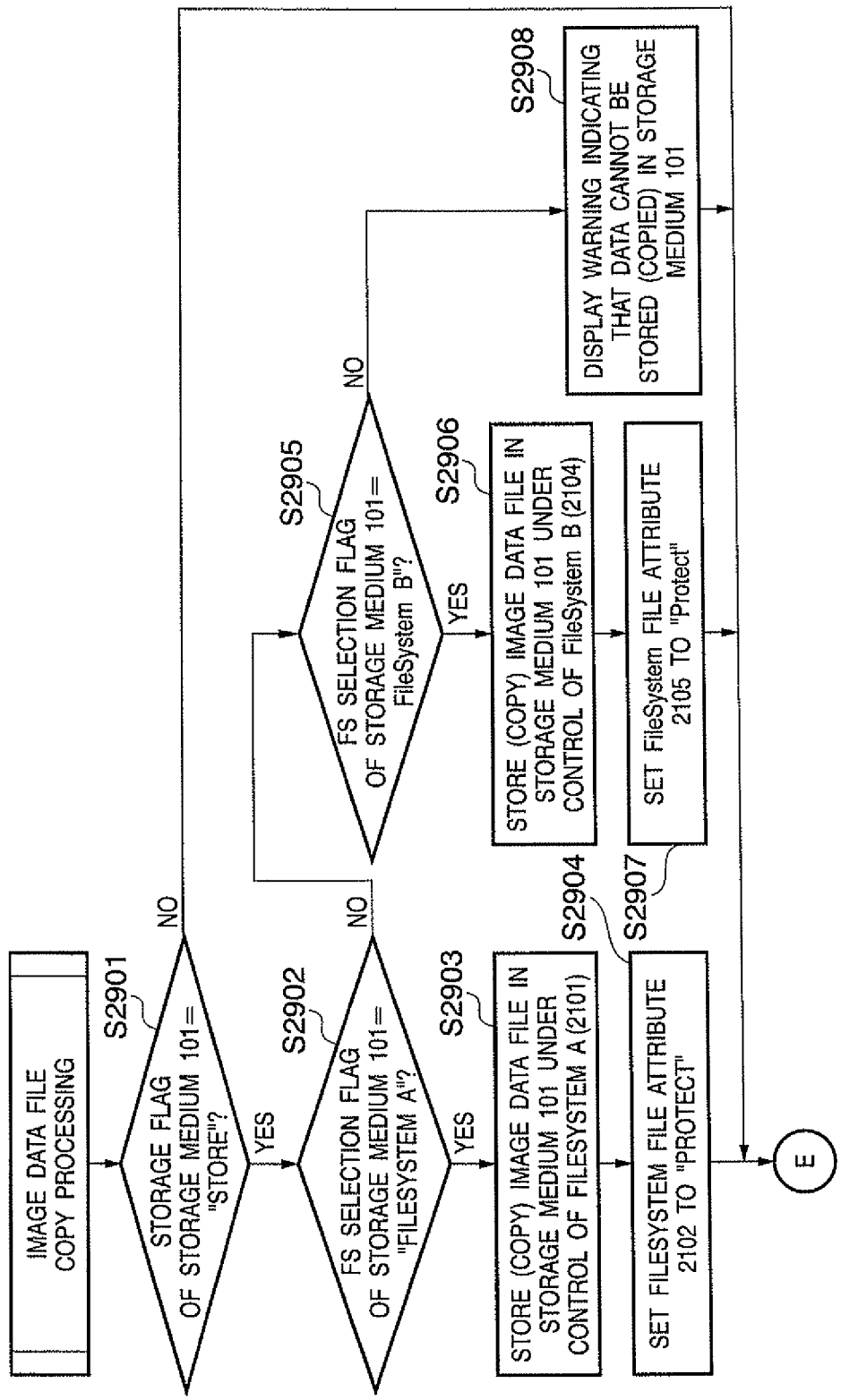
FIGS. 29A and 29B are flowcharts for explaining an image data file copy processing sequence according to the second embodiment of the present invention.
Figure 29B:
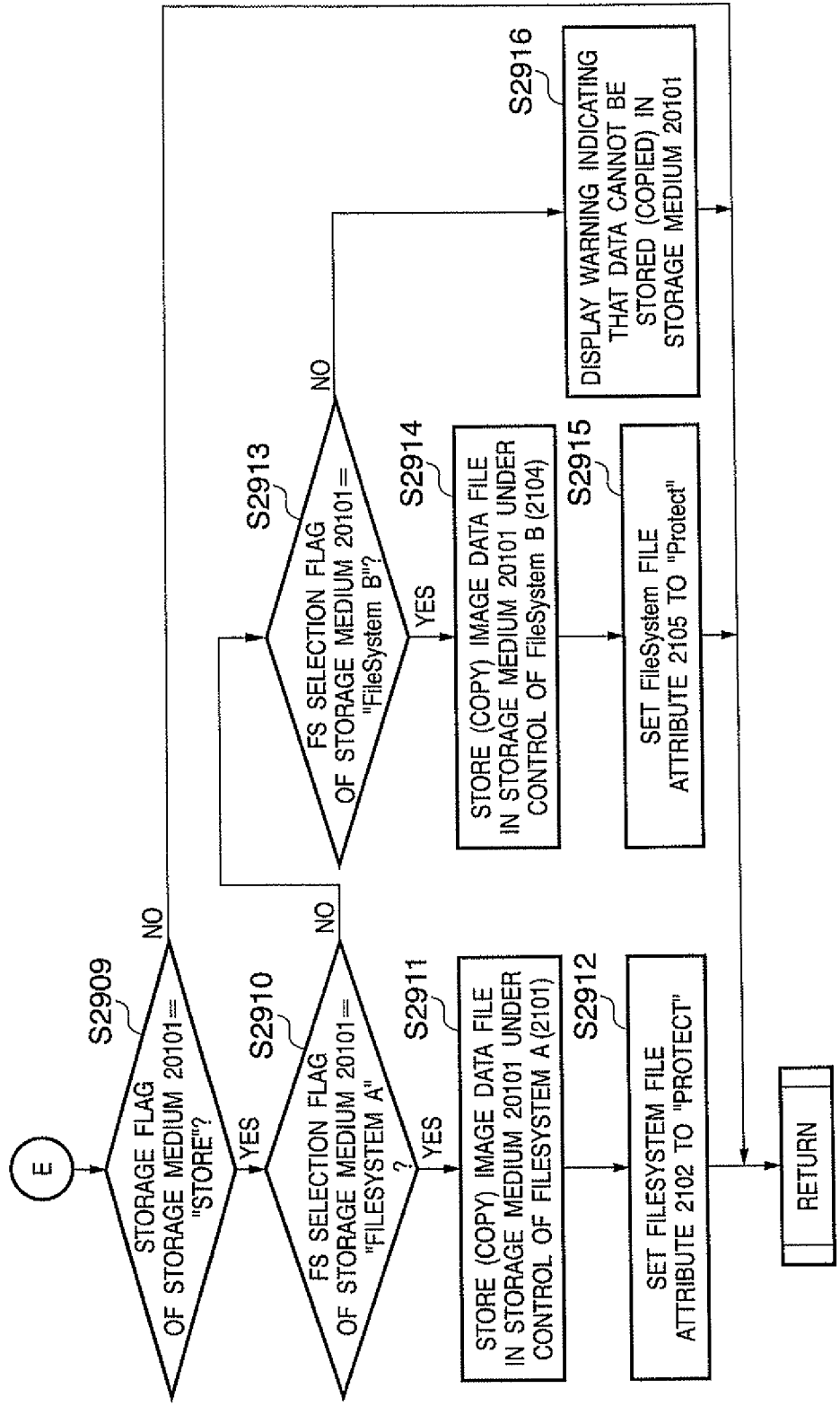
Figure 30B:
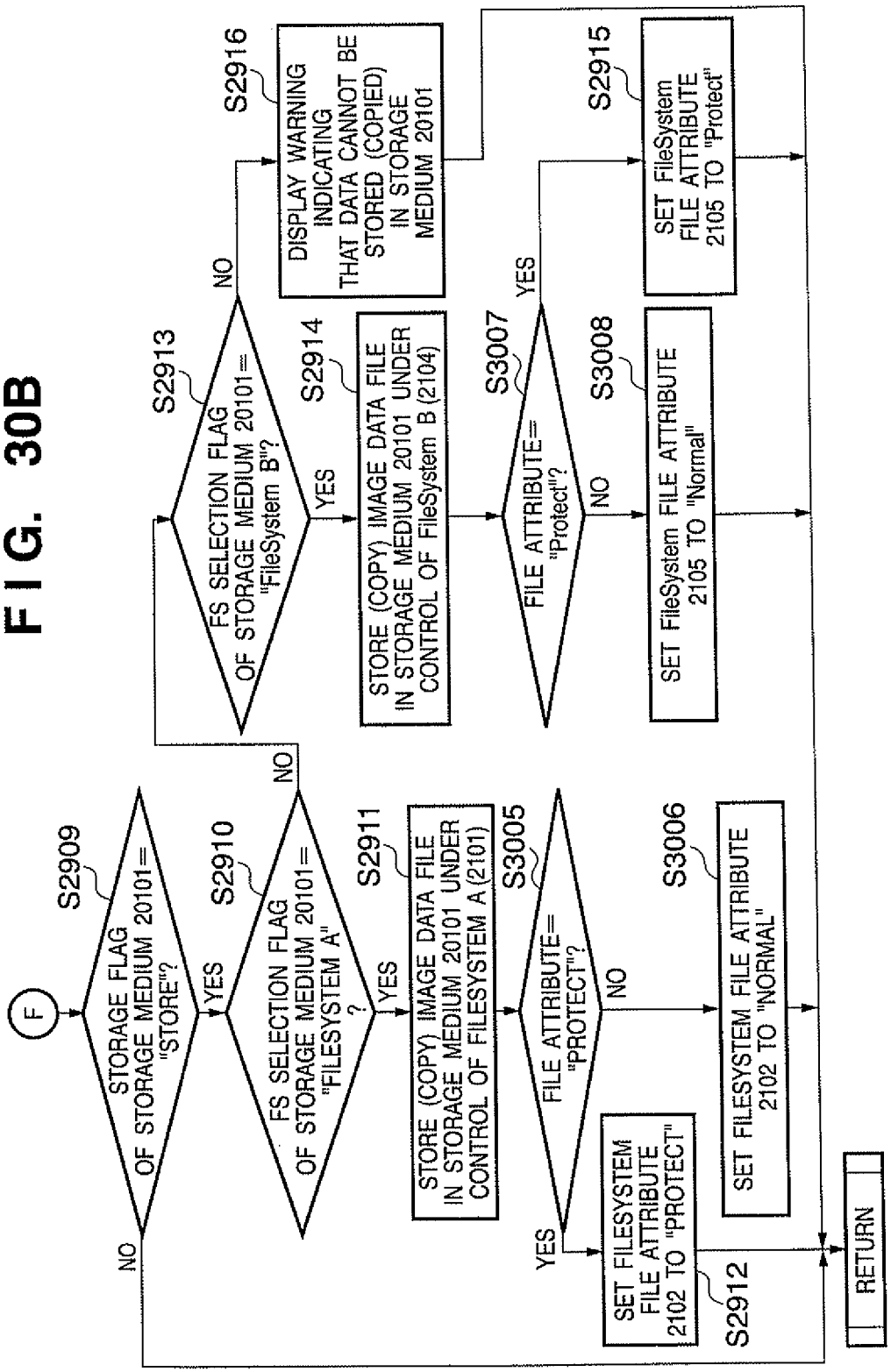

FIGS. 30A and 30B are basically the same as the flowcharts of FIGS. 29A and 29B. Hence, the same step numbers denote the same processing steps as those in FIGS. 29A and 29B. New processing steps added in FIGS. 30A and 30B will be described below.

After the image data file 2103 read out onto the memory 30 is stored (copied) in the storage medium 101 using the control method of FILESYSTEM A (2101) in step S2903, the flow advances to step S3001. It is checked in step S3001 if the file attribute determined in step S2817 in FIG. 28B is "PROTECT".

If it is determined that the determined file attribute is "PROTECT" ("YES" in step S3001), the flow advances to step S2904. In step S2904, the FILESYSTEM file attribute 2102 of the stored (copied) image data file 2103 is set to "PROTECT", and the flow advances to step S2909.

On the other hand, if it is determined that the determined file attribute is not "PROTECT" ("NO" in step S3001), the flow advances to step S3002. In step S3002, the FILESYSTEM file attribute 2102 of the stored (copied) image data file 2103 is set to "NORMAL", and the flow advances to step S2909.

Next, after the image data file 2103 is stored (copied) in the storage medium 101 using the control method of filesystem B (2104) in step S2906, the flow advances to step S3003. It is checked in step S3003 if the file attribute determined in step S2817 in FIG. 28B is "protect".

If it is determined that the determined file attribute is "protect" ("YES" in step S3003), the flow advances to step S2907. In step S2907, the filesystem file attribute 2105 of the stored (copied) image data file 2103 is set to "protect", and the flow advances to step S2909.

On the other hand, if it is determined that the determined file attribute is not "protect" ("NO" in step S3003), the flow advances to step S3004. In step S3004, the filesystem file attribute 2105 of the stored (copied) image data file 2103 is set to "normal", and the flow advances to step S2909.

Furthermore, after the image data file 2103 read out onto the memory 30 is stored (copied) in the storage medium 20101 using the control method of FILESYSTEM A (2101) in step S2911, the flow advances to step S3005. It is checked in step S3005 if the file attribute determined in step S2817 in FIG. 28B is "PROTECT".

If it is determined that the determined file attribute is "PROTECT" ("YES" in step S3005), the flow advances to step S2912. In step S2912, the FILESYSTEM file attribute 2102 of the stored (copied) image data file 2103 is set to "PROTECT", thus ending the processing.

On the other hand, if it is determined that the determined file attribute is not "PROTECT" ("NO" in step S3005), the flow advances to step S3006. In step S3006, the FILESYSTEM file attribute 2102 of the stored (copied) image data file 2103 is set to "NORMAL", thus ending the processing.

Next, after the image data file 2103 is stored (copied) in the storage medium 20101 using the control method of filesystem B (2104) in step S2913, the flow advances to step S3007. It is checked in step S3007 if the file attribute determined in step S2817 in FIG. 28B is "protect".

If it is determined that the determined file attribute is "protect" ("YES" in step S3007), the flow advances to step S2915. In step S2915, the filesystem file attribute 2105 of the stored (copied) image data file 2103 is set to "protect", thus ending the processing.

On the other hand, if it is determined that the determined file attribute is not "protect" ("NO" in step S3007), the flow advances to step S3008. In step S3008, the filesystem file attribute 2105 of the stored (copied) image data file 2103 is set to "normal", thus ending the processing.

As described above, in the embodiment corresponding to FIGS. 30A and 30B, when the image data file includes the internal data file attribute 2103c, the FILESYSTEM or filesystem file attribute 2102 or 2105 can be set according to its contents. Hence, when an image data file is read out from the storage medium 101 or 20101 by a program from, e.g., a personal computer, it is read out as a "protect" file since the FILESYSTEM or filesystem file attribute functions. Hence, since the program on the personal computer cannot apply any edit processing or the like to the image data file 2103, file destruction due to misinterpretation of the image data file structure can be prevented.

Third Embodiment

Figure 31:
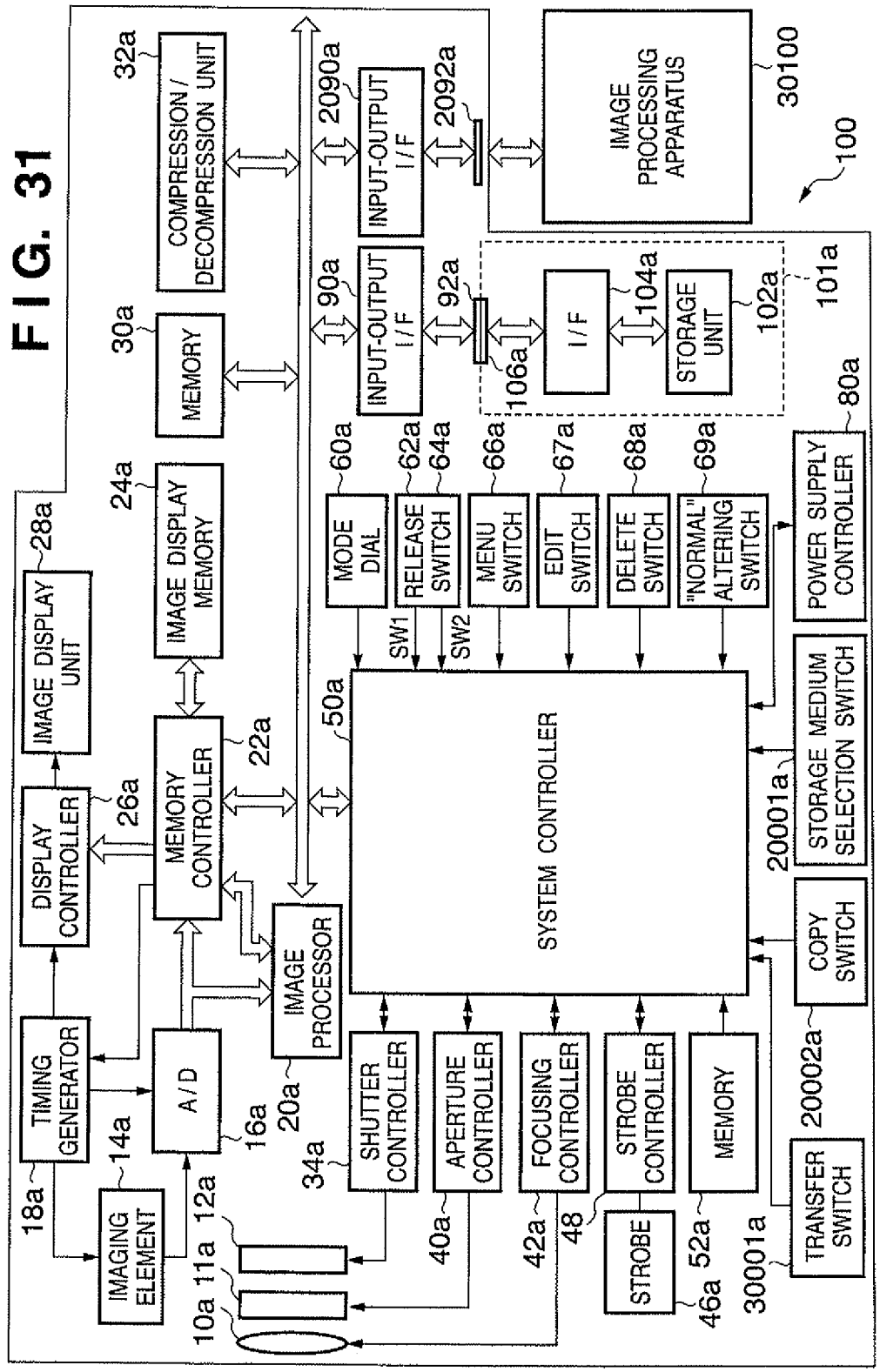
FIG. 31 is a block diagram showing an example of the arrangement of an image processing apparatus according to the third embodiment of the present invention.

The arrangement of an image processing apparatus according to the third embodiment of the present invention will be described below with reference to FIG. 31. The arrangement of principal part of the image processing apparatus according to the third embodiment of the present invention is substantially the same as in FIG. 20.

In the description of the second embodiment, the two sets of interfaces and connectors used to receive storage media, and a plurality of storage media are connected using the interfaces and the like to read and write information from and in the respective storage media in the image processing apparatus. By contrast, the third embodiment is characterized in that an external connection apparatus other than the storage medium is connected to an interface and connector to exchange image data and its associated management information with that external connection apparatus. In this embodiment, this external connection apparatus is implemented as an image processing apparatus 30100 having the same arrangement as that in FIG. 20, and different apparatuses can independently read and write data from and in respective storage media. FIG. 31 includes components different from those in the arrangement of FIG. 20 based on the characteristic feature of this embodiment.

As the interface and connector, those complying with the standards of a PCMCIA card, CompactFlash® card, and the like may be used as in the second embodiment. Therefore, an interface 20090a and connector 20092a comprise those which comply with the standards of the PCMCIA card, CF card, and the like, and can connect various communication cards such as a LAN card, modem card, USB card, IEEE1394 card, P1284 card, SCSI card, PHS, and the like. In this way, image data and associated management information can be exchanged with another computer other than the image processing apparatus having the same arrangement and a peripheral device such as a printer or the like.

Note that the management information includes a file attribute of image data to be transferred. In this embodiment, a file attribute included in this management information is especially called "T-file attribute" to distinguish file attributes by inserting a prefix "T-" into prior and existing file attributes like "T-protect". Note that a description of the transfer method will be omitted since it is known to those who are skilled in the art. In brief, the transfer method is implemented by a system controller 50a by acquiring and executing a program stored in a memory 52a of the image processing apparatus 100.

Reference numeral 30100 denotes an image processing apparatus. This image processing apparatus 30100 has the same arrangement as that of the image processing apparatus 100. In order to distinguish components of the image processing apparatuses 100 and 30100, "a" is appended after reference numerals of the components of the image processing apparatus 100, and "b" is appended after reference numerals of the components of the image processing apparatus 30100. For example, an interface 20090a is that of the image processing apparatus 100, and an interface 20090b can be distinguished as that of the image processing apparatus 30100.

In this embodiment, a program used to store a generated image data file in a storage medium, a program used to read out an image data file from a storage medium, and the like, which are stored in the memory 52a of the image processing apparatus 100, are programmed to be able to interpret FILESYSTEM A. On the other hand, a program used to store a generated image data file in a storage medium, a program used to read out an image data file from a storage medium, and the like, which are stored in a memory 52b of the image processing apparatus 30100, are programmed to be able to interpret filesystem B. In this embodiment, image data files controlled under the different file systems in the respective image processing apparatuses are exchanged.

Furthermore, reference numeral 30001a denotes a transfer switch, which is different from the arrangement in FIG. 20 since it is added to it. The transfer switch 30001a includes a combination of a set key, arrow keys, and the like (none of them are shown). With this transfer switch, a transfer setting of image data stored in a storage medium 101a can be made. With this transfer switch 30001a (30001b), one of operations "transmit", "not transmit", "receive", and "not receive" of image data can be set. The setting contents of the transfer switch 30001a (30001b) are stored as "transfer flag" in a memory 30a which is used as a work area of the system controller.

The relationship among the image processing apparatus 100, the storage medium 101a connected, a file structure of stored image data files, and the file system will be described below with reference to FIGS. 32A and 32B. Also, the relationship among the image processing apparatus 30100, a storage medium 101b connected, a file structure of stored image data files, and the file system will be described below.

Figure 32A:
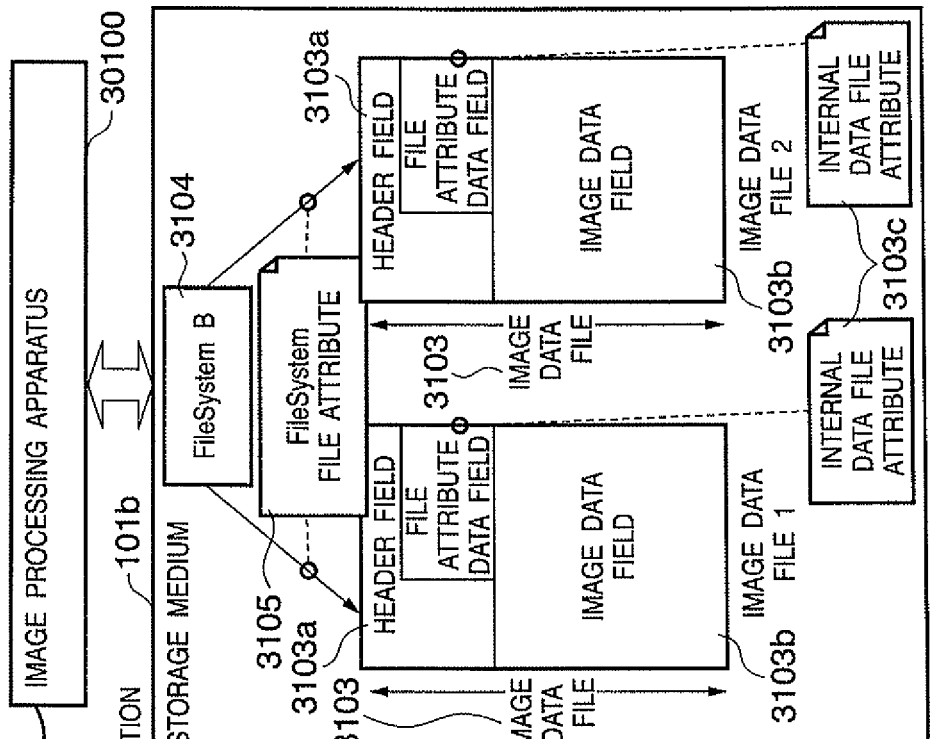
FIGS. 32A and 32B are views for explaining the relationship between image data files and file systems according to the third embodiment of the present invention.
Figure 32B:
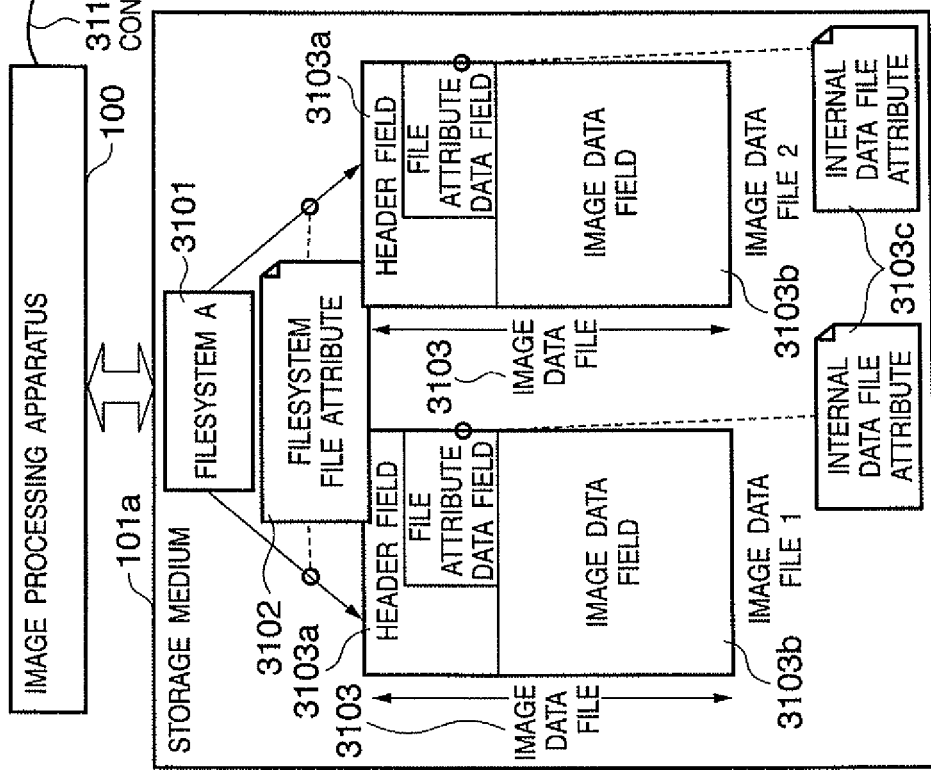

As shown in FIGS. 32A and 32B, in this embodiment, the image processing apparatuses 100 and 30100 can be connected via a connection 3110. As this connection 3110, a wired or wireless connection can be applied as long as it allows the image processing apparatuses to exchange image data between them. For example, connection modes that adopt communication protocols such as USB, IEEE1394, IEEE802.11, and the like may be used.

In this embodiment, image data files 3103 generated by the image processing apparatus 100 are stored in the storage medium 101a under the management of FILESYSTEM A 3101. Details of this file system are substantially the same as those described in the second embodiment, and a detailed description thereof will be omitted. On the other hand, image data files 3103 generated by the image processing apparatus 30100 are stored in the storage medium 101b under the management of filesystem B 3104. Details of this file system are substantially the same as those described in the second embodiment, and a detailed description thereof will be omitted. The relationship between these FILESYSTEM A and filesystem B is the same as that in the second embodiment, and a detailed description thereof will be omitted. Also, a description of attributes will be omitted, since they are the same as those in the first and second embodiments. Furthermore, a description of the structure example of the image data files will be omitted since they are the same as those in the first and second embodiments.

Figure 33:
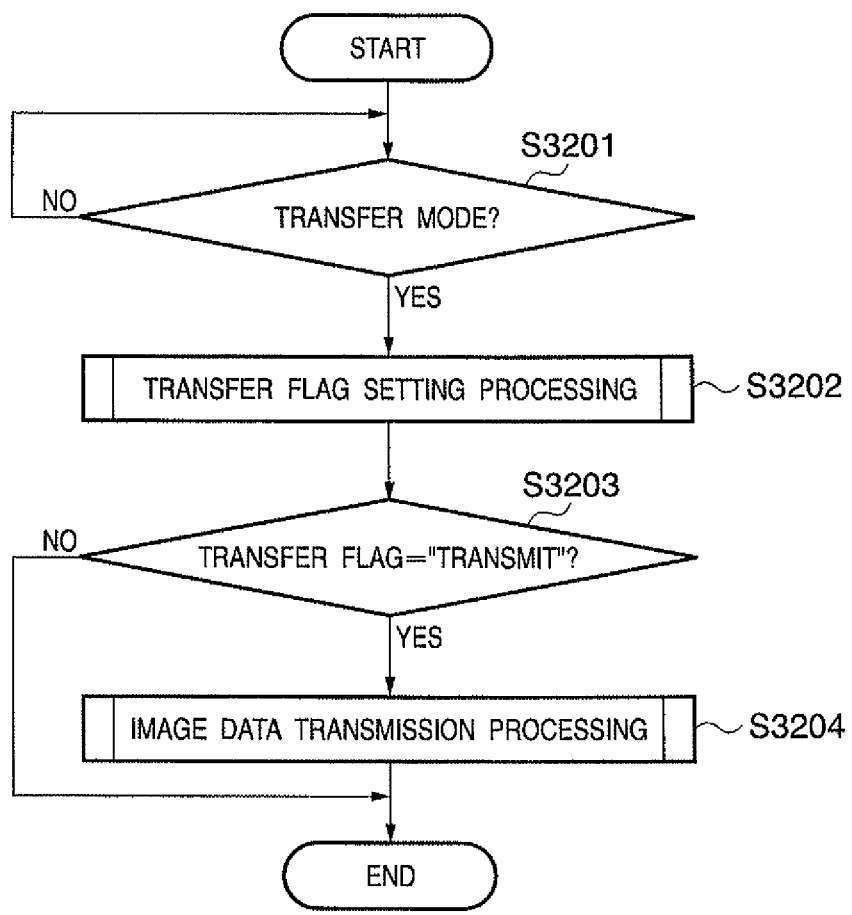
FIG. 33 is a flowchart for explaining an image data file transmission processing sequence according to the third embodiment of the present invention.

An image data file transmission processing sequence until an image data file is transmitted from the storage medium 101a of the image processing apparatus 100 to the storage medium 101b of the image processing apparatus 30100 will be described below with reference to FIG. 33. FIG. 33 shows the processing until an image data file is transmitted to the image processing apparatus 30100. Of course, the transmitted image data file is stored as an image data file 3103 in the storage medium 101b of the image processing apparatus 30100. Such storage sequence will be described as a reception sequence later since it is the same as the sequence when the image processing apparatus 100 receives image data from the image processing apparatus 30100 and stores it in the storage medium 101a (only the file system is different).

Referring to FIG. 33, it is checked in step S3201 if a transfer mode (not shown) is set by the transfer switch 30001a. If it is determined that the transfer mode is set ("YES" in step S3201), the flow advances to transfer flag setting processing in step S3202. In this processing, a transfer flag is set according to the setting of the transfer switch 30001a. Details of this processing will be described later with reference to FIG. 35.

In step S3203, the contents of the transfer flag in a memory 30a are checked based on the result of the transfer flag setting processing. If the transfer flag is "transmit" ("YES" in step S3203), the flow advances to image data transmission processing in step S3204. In this image data transmission processing, an image data file 3103 is transmitted to the image processing apparatus 30100 connected. Details of this processing will be described later with reference to FIG. 36. On the other hand, if it is determined that the transfer flag is not "transmit" ("NO" in step S3203), the processing ends. In this manner, a series of image data file transmission operations are executed.

An image data file reception and storage sequence until the image processing apparatus 100 receives an image data file from the image processing apparatus 30100 and stores it in the storage medium 101a will be described below with reference to FIG. 34.

Figure 34:
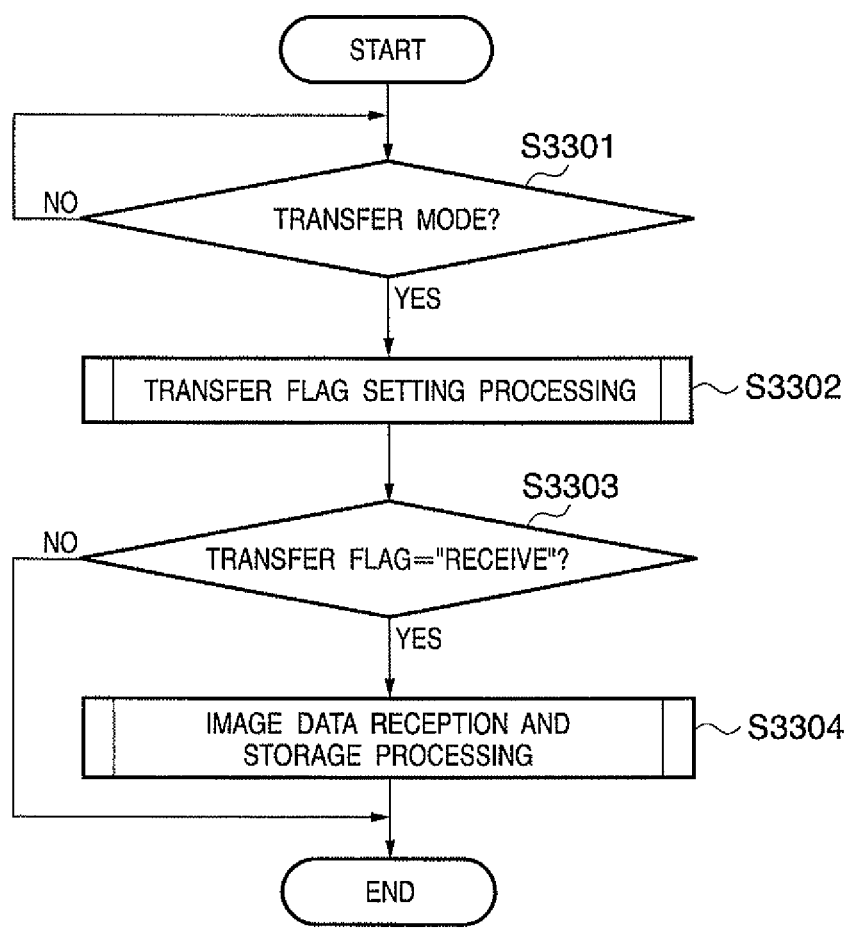
FIG. 34 is a flowchart for explaining an image data file reception processing sequence according to the third embodiment of the present invention.

Referring to FIG. 34, it is checked in step S3301 if a transfer mode (not shown) is set by the transfer switch 30001a. If it is determined that the transfer mode is set ("YES" in step S3301), the flow advances to transfer flag setting processing in step S3302. In this processing, a transfer flag is set according to the setting of the transfer switch 30001a. Details of this processing will be described later with reference to FIG. 35.

In step S3303, the contents of the transfer flag in the memory 30a are checked based on the result of the transfer flag setting processing. If the transfer flag is "receive" ("YES" in step S3303), the flow advances to image data reception and storage processing in step S3304. In this image data reception and storage processing, a transmitted image data file 3103 is received and is stored in the storage medium 101a connected. Details of this processing will be described later with reference to FIG. 37. On the other hand, if it is determined that the transfer flag is not "receive" ("NO" in step S3303), the processing ends. In this manner, a series of image data file reception and storage operations are executed.

Figure 35:
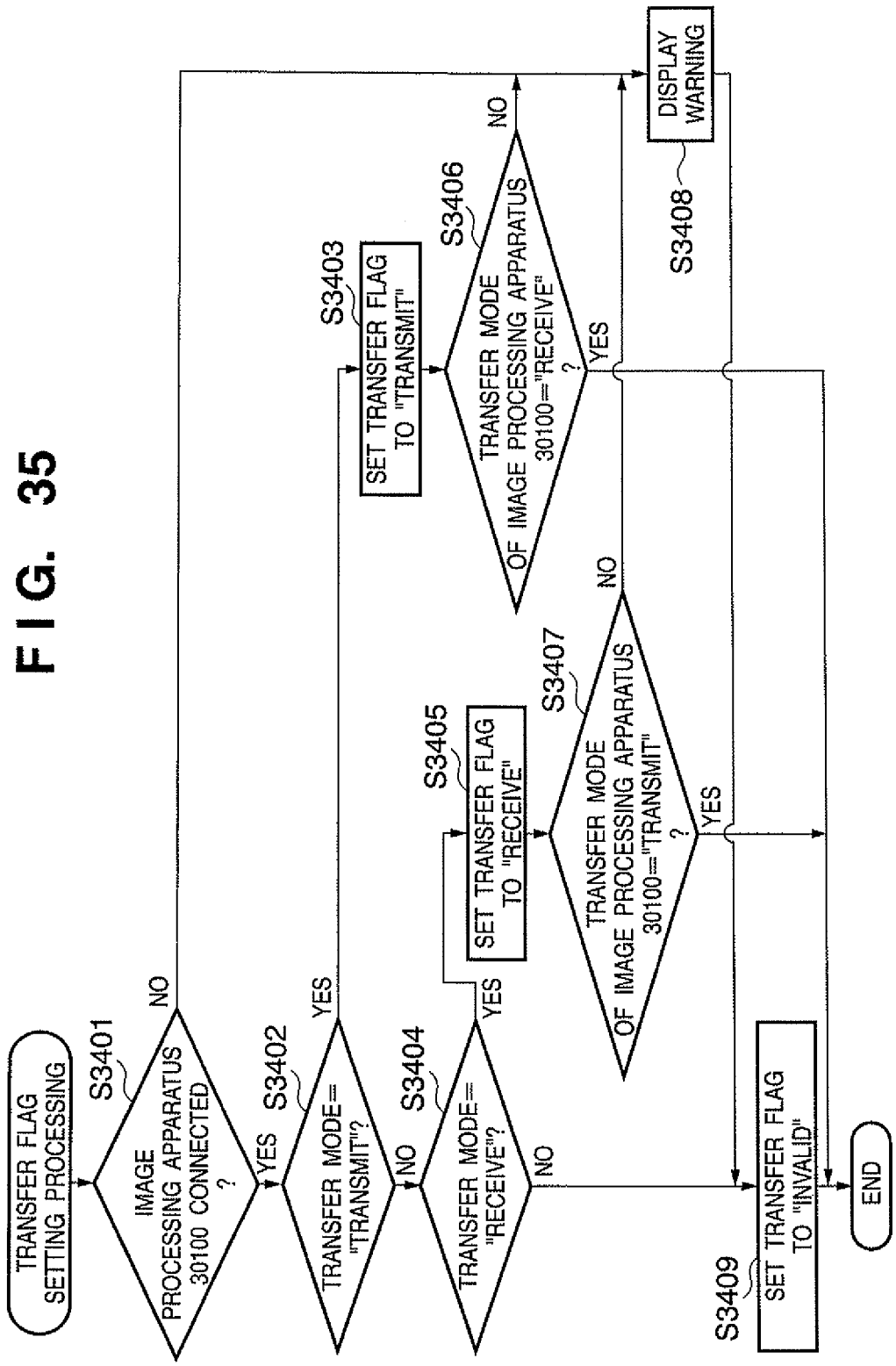
FIG. 35 is a flowchart for explaining a transfer flag setting processing sequence according to the third embodiment of the present invention.

The transfer flag setting processing, which is executed in step S3202 in FIG. 33 and in step S3302 in FIG. 34, will be described below with reference to the flowchart of FIG. 35.

It is determined in step S3401 if the image processing apparatus 30100 is connected via the interface 20092a. A description of this determination method will be omitted since it is known to those who are skilled in the art. In brief, the determination method is implemented by the system controller 50a by acquiring and executing a program stored in the memory 52a of the image processing apparatus 100. If it is determined that the image processing apparatus 30100 is connected ("YES" in step S3401), the flow advances to step S3402. On the other hand, if it is determined in step S3401 that no image processing apparatus 30100 is connected ("NO" in step S3401), the flow advances to step S3408. In step S3408, a warning indicating that a transfer setting cannot be made is displayed, and the flow advances to step S3409. In step S3409, the transfer flag in the memory 30a which is used as a work area of the system controller is set to "invalid", thus ending the processing.

It is determined in step S3402 if the transfer mode of the image processing apparatus 100 is set to "transmit". If it is determined that the transfer mode is set to "transmit" ("YES" in step S3402), the flow advances to step S3403 to set the transfer flag in the memory 30a which is used as a work area of the system controller to "transmit", and the flow then advances to step S3406.

On the other hand, if it is determined in step S3402 that the transfer mode is not set to "transmit" ("NO" in step S3402), the flow advances to step S3404 to determine if the transfer mode is set to "receive". If it is determined that the transfer mode is set to "receive" ("YES" in step S3404), the flow advances to step S3405 to set the transfer flag in the memory 30a which is used as a work area of the system controller to "receive", and the flow then advances to step S3407.

It is determined in step S3406 if the transfer mode of the image processing apparatus 30100 is set to "receive". If it is determined that the transfer mode is set to "receive" ("YES" in step S3406), the processing ends without any processing.

On the other hand, if it is determined that the transfer mode is not set to "receive" ("NO" in step S3406), the flow advances to step S3408. In step S3408, since the image processing apparatus 30100 as a connection destination is not ready to receive, a warning indicating that a transfer setting cannot be made is displayed, and the flow advances to step S3409. The processing in step S3409 is as described above.

It is determined in step S3407 if the transfer mode of the image processing apparatus 30100 is set to "transmit". If it is determined that the transfer mode is set to "transmit" ("YES" in step S3407), the processing ends without any processing. On the other hand, if it is determined that the transfer mode is not set to "transmit" ("NO" in step S3407), the flow advances to step S3408. In step S3408, since the image processing apparatus 30100 as a connection destination is not ready to transmit, a warning indicating that a transfer setting cannot be made is displayed, and the flow advances to step S3409. The processing in step S3409 is as described above.

In this way, whether or not an image data file is to be transmitted or received is determined to set the transfer flag.

Figure 36:
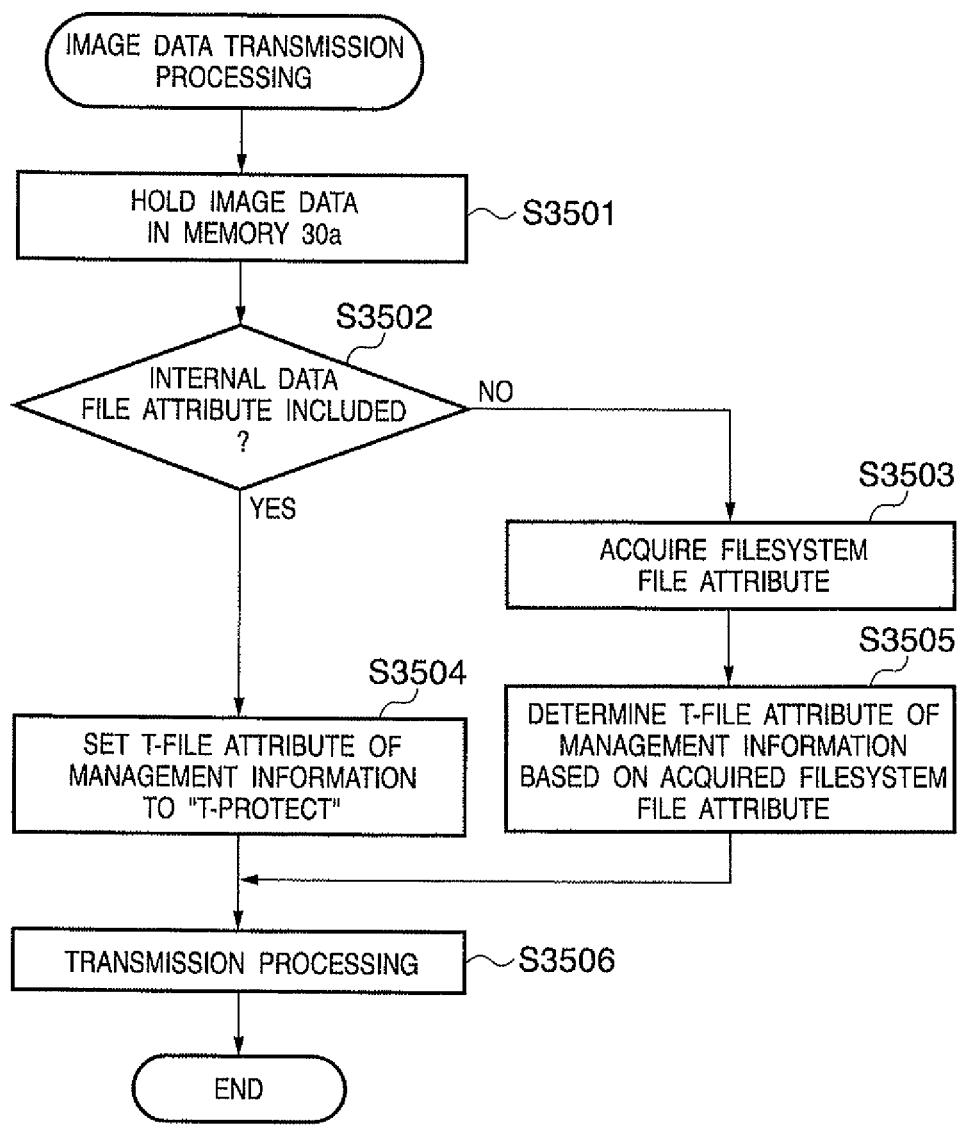
FIG. 36 is a flowchart for explaining an image data transmission processing sequence according to the third embodiment of the present invention.

The image data transmission processing for transmitting image data to the image processing apparatus 30100, which is executed in step S3204 in FIG. 33, will be described below with reference to the flowchart of FIG. 36.

In step S3501, an image data file is held on the memory 30a. In this step, there are two cases, i.e., a case in which an image data file 3103 stored in the storage medium 101a is read out and held using the control method of FILESYSTEM A, and a case in which image data generated by image shooting processing is held. Since these processes have already been explained previously, a detailed description thereof will be omitted. Upon executing the same processing on the image processing apparatus 30100 side, an image data file 3103 stored in the storage medium 101b is read out and held using the control method of filesystem B.

It is determined in step S3502 if the held image data file includes an internal data file attribute 3103c. If it is determined that the image data file includes the internal data file attribute 3103c ("YES" in step S3502), the flow advances to step S3504. In step S3504, the T-file attribute of management information appended to the image data file to be transmitted is set to "T-PROTECT", and the flow advances to step S3506. The management information in this case is information for transfer, which is temporarily stored in the memory 30a.

If it is determined that the image data file does not include any internal data file attribute 3103c ("NO" in step S3502), the flow advances to step S3503. In step S3503, a FILESYSTEM file attribute 3102 is acquired. Note that the FILESYSTEM file attribute 3102 is acquired only when the image data file is read out from the storage medium 101a. Hence, the image data file generated by the image processing apparatus 100 as a result of the image shooting processing indispensably includes the internal data file attribute 3103c. Upon executing the same processing on the image processing apparatus 30100 side, a filesystem file attribute 3105 is acquired.

In step S3505, the T-file attribute of management information to be appended to the corresponding image data file is determined and set based on the acquired FILESYSTEM file attribute 3102, and the flow advances to step S3506. The management information in this case is information for transfer, which is temporarily stored in the memory 30a. Upon executing the same processing on the image processing apparatus 30100 side, the T-file attribute to be appended to corresponding image data to be transferred is determined and set based on the acquired filesystem file attribute 3105.

In step S3506, transmission processing is executed. This transmission processing is implemented by the system controller 50a according to a protocol determined in advance by acquiring and executing a program stored in the memory 52a of the image processing apparatus 100. That is, the image data held in the memory 30a and the management information appended to the image data file to be transmitted are transmitted to the connected image processing apparatus 30100. Since this transmission processing has contents which are known to those who are skilled in the art, no more explanation will be particularly given.

Figure 37:
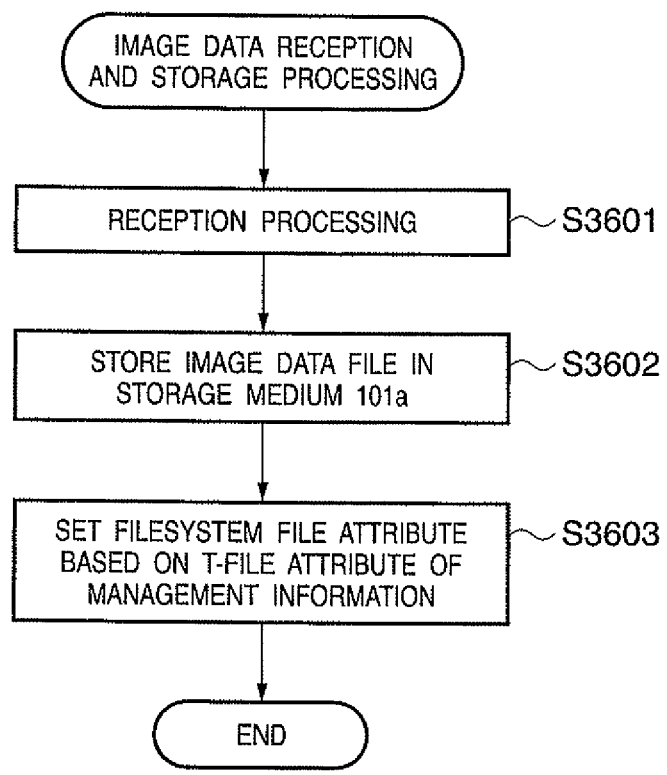
FIG. 37 is a flowchart for explaining an image data reception and storage processing sequence according to the third embodiment of the present invention.

The image data reception and storage processing for receiving and storing image data from the image processing apparatus 30100, which is executed in step S3304 in FIG. 34, will be described below with reference to the flowchart of FIG. 37.

In step S3601, reception processing is executed. This reception processing is implemented by the system controller 50a according to a protocol determined in advance by acquiring and executing a program stored in the memory 52a of the image processing apparatus 100. That is, image data and management information appended to the transferred image data, which are transmitted from the image processing apparatus 30100 are held in the memory 30a. Since this reception processing has contents which are known to those who are skilled in the art, no more explanation will be particularly given.

In step S3602, the received image data stored in the memory 30a is stored in the storage medium 101a using the control method of FILESYSTEM A. Since details of the storage processing have already been explained, a description thereof will be omitted. Upon executing the same processing on the image processing apparatus 30100 side, image data is stored in the storage medium 101b using the control method of filesystem B.

In step S3603, the FILESYSTEM file attribute 3102 is determined and set based on the T-file attribute of the management information appended to the received image data. After that, the processing ends.

As has been described above using FIG. 36, if image data includes the internal data file attribute 3103c, since the T-file attribute is always "T-PROTECT", the FILESYSTEM file attribute 3102 is also set to "T-PROTECT". In case of image data which does not include any internal data file attribute 3103c, since the filesystem file attribute of the image processing apparatus 30100 is set to a T-file attribute, the FILESYSTEM file attribute 3102 corresponding to it is set.

In this way, a connection apparatus other than the storage medium is connected to the interface and connector used to receive the storage medium, and image data files 3103 can be exchanged between the storage media 101a and 101b which have different file systems to be controlled by the respective apparatuses. In this transfer processing, the internal data file attribute 3103c can be inherited with the same contents independently of the file systems.

At this time, when the FILESYSTEM file attribute is set to "PROTECT" and the filesystem file attribute is set to "protect", even when an image data file is read out from the storage medium 101a or 101b by another apparatus such as a PC or the like, the readout file is handled as a "protect" file. Hence, since the program on the personal computer cannot apply any edit processing or the like to the image data file 3103, file destruction due to misinterpretation of the image data file structure can be prevented.

Furthermore, the image processing apparatus which has acquired an image data file from the storage medium 101a or 101b can display or edit the image data file based on the contents of the internal data file attribute 3103c even though the FILESYSTEM or filesystem file attribute 3102 or 3105 is "PROTECT" or "protect". If management data does not include any internal data file attribute 3103c, an image data file can be handled based on the FILESYSTEM or filesystem file attribute 3102 or 3105.

In this embodiment, the image processing apparatus with the same arrangement is connected. Alternatively, this embodiment can also be applied to a case wherein an external connection apparatus having a file system such as a personal computer or the like is connected.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (a DVD-ROM, a DVD-R and a DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-104801 filed on Mar. 31, 2005 and Japanese Patent Application No. 2006-092339 filed on Mar. 29, 2006, which are hereby incorporated by reference herein in its entirety.

What is claimed is:

1. An image processing apparatus comprising:
a generation unit constructed to generate an image data file;
a first attribute setting unit constructed to set first attribute information for determining whether an alteration of the image data file is inhibited or not;
a second attribute setting unit constructed to set second attribute information for determining whether an alteration of the image data file is inhibited or not, wherein the second attribute information is stored in a storage area different from the one for the first attribute information;
a storing unit constructed to store the image data file generated by the generation unit in a storage device; and
a determination unit constructed to determine that, when the first attribute information has such an attribute that does not inhibit the alteration of the image data file, the alteration of the image data file is not inhibited, even if the second attribute information has such an attribute that inhibits the alteration of the image data file,
wherein the first attribute information is stored in the image data file in the storage device,
wherein the storage device stores respective second attribute information for each image data file stored in the storage device in a respective area corresponding to each image data file in the storage device, which a file system handles, and
wherein when the storing unit stores the image data file generated by said generation unit, the first attribute information has such an attribute that does not inhibit the alteration of the image data file and the second attribute information has such an attribute that inhibits the alteration of the image data file.

2. The apparatus according to claim 1, further comprising:
a display unit constructed to display image data written in the storage device; and
an attribute determination unit constructed to determine the attribute of the image data file based on the first attribute information when it is determined that the first attribute information is stored in the image data file, and determine the attribute of the image data file based on the second attribute information when it is determined that the first attribute information is not stored in the image data file,
wherein said display unit displays the image data in correspondence with the attribute of the image data file determined by said attribute determination unit.

3. The apparatus according to claim 1, further comprising:
a readout unit constructed to readout the image data file from the storage device; and
a second determination unit constructed to determine whether the image data file readout by the readout unit can be altered or not,
wherein the second determination unit determines whether the alteration of the image data file is inhibited or not based on the first attribute information when the image data file stores the first attribute information, and determines whether the alteration of the image data file is inhibited or not based on the second attribute information when the image data file does not store the first attribute information.

4. The apparatus according to claim 1, wherein in a case that the first attribute information includes such an attribute that does not inhibit the alteration of the image data file, and the second attribute information includes such an attribute that inhibits the alteration of the image data file, the second attribute setting unit changes the attribute in the second attribute information to such an attribute that does not inhibit the alteration of the image data file, when the image data file is going to be edited.

5. The apparatus according to claim 4, wherein the second attribute setting unit changes the attribute of the second attribute information to an attribute which inhibits the alteration of the image data file, after the edit of the image data file.

6. The apparatus according to claim 1, wherein when the storing unit stores the generated image data file in the storage device, the first attribute setting unit sets the first attribute information stored in the image data file to an attribute that does not inhibit the alteration of the image data file, and the second attribute setting unit sets the second attribute information stored in the area in the storage device to an attribute that inhibits the alteration of the image data file.

7. The apparatus according to claim 1, wherein the storage device is detachable.

8. An image processing method executed by an image processing apparatus, comprising:
a generation step of generating an image data file;
a first attribute setting step of setting first attribute information for determining whether an alteration of the image data file is inhibited or not;
a second attribute setting step of setting second attribute information for determining whether an alteration of the image data file is inhibited or not, which is stored in a storage area different from the one for the first attribute information;
a storing step of storing the image data file generated by the generation unit in a storage device; and
a determination step of determining that, when the first attribute information has such an attribute that does not inhibit the alteration of the image data file, the alteration of the image data file is not inhibited, even if the second attribute information has such an attribute that inhibits the alteration of the image data file,
wherein the first attribute information is stored in the image data file stored in the storage device,
wherein the storage device stores respective second attribute information for each image data file stored in the storage device in a respective area corresponding to each image data file in the storage device, which a file system handles, and
wherein when the generated image data file is stored in the storage device in the storing step, the first attribute information has such an attribute that does not inhibit the alteration of the image data file and the second attribute information has such an attribute that inhibits the alteration of the image data file.

9. The method according to claim 8, wherein when the generated image data file is stored in the storage device, the first attribute information stored in the image data file is set to an attribute that does not inhibit the alteration of the image data file, and the second attribute information stored in the area in the storage device is set to an attribute that inhibits the alteration of the image data file.

10. The method according to claim 8, wherein the storage device is detachable.

11. A non-transitory computer-readable storage medium retrievably storing a computer-executable program, said computer-executable program being executable by a computer so as to control the computer to execute an image processing method, said image processing method comprising:
a generation step of generating an image data file;
a first attribute setting step of setting first attribute information for determining whether an alteration of the image data file is inhibited or not;
a second attribute setting step of setting second attribute information for determining whether an alteration of the image data file is inhibited or not, which is stored in a storage area different from the one for the first attribute information;
a storing step of storing the image data file generated by the generation unit in a storage device; and
a determination step of determining that, when the first attribute information has such an attribute that does not inhibit the alteration of the image data file, the alteration of the image data file is not inhibited, even if the second attribute information has such an attribute that inhibits the alteration of the image data file,
wherein the first attribute information is stored in the image data file stored in the storage device,
wherein the storage device stores respective second attribute information for each image data file stored in the storage device in a respective area corresponding to each image data file in the storage device, which a file system handles, and
wherein when the generated image data file is stored in the storage device in the storing step, the first attribute information has such an attribute that does not inhibit the alteration of the image data file and the second attribute information has such an attribute that inhibits the alteration of the image data file.

12. The non-transitory computer-readable storage medium according to claim 11, wherein when the generated image data file is stored in the storage device, the first attribute information stored in the image data file is set to an attribute that does not inhibit the alteration of the image data file, and the second attribute information stored in the area in the storage device is set to an attribute that inhibits the alteration of the image data file.

13. The non-transitory computer-readable storage medium according to claim 11, wherein the storage device is detachable.

* * * * *